United States Patent
Misawa et al.

(10) Patent No.: US 6,809,764 B1
(45) Date of Patent: *Oct. 26, 2004

(54) SOLID-STATE ELECTRONIC IMAGE SENSING DEVICE WITH HIGH SUBSAMPLING EFFICIENCY AND METHOD OF READING A VIDEO SIGNAL OUT OF THE SAME

(75) Inventors: Takeshi Misawa, Asaka (JP); Kazuya Oda, Asaka (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/570,733

(22) Filed: May 12, 2000

Related U.S. Application Data

(63) Continuation-in-part of application No. 09/492,093, filed on Jan. 27, 2000.

(30) Foreign Application Priority Data

May 12, 1999 (JP) .......................................... 11-131856

(51) Int. Cl.⁷ .......................... H04N 9/083; H04N 3/14; H04N 5/335; H01L 27/00
(52) U.S. Cl. ....................... 348/272; 348/280; 348/312; 250/208.1
(58) Field of Search ................................ 348/272, 275, 348/280, 294, 296, 311, 312, 317, 319, 320, 322, 315, 333.11, 273; 250/208.1

(56) References Cited

U.S. PATENT DOCUMENTS

| | | | | |
|---|---|---|---|---|
| 4,876,590 A | * | 10/1989 | Parulski ................. | 348/333.11 |
| 5,177,614 A | * | 1/1993 | Kawaoka et al. ........... | 348/319 |
| 5,251,036 A | * | 10/1993 | Kawaoka et al. ........... | 348/311 |
| 5,668,597 A | * | 9/1997 | Parulski et al. ............. | 348/315 |
| 6,118,481 A | * | 9/2000 | Hamada ..................... | 348/317 |
| 6,342,921 B1 | | 1/2002 | Yamaguchi et al. | |
| 6,423,959 B1 | * | 7/2002 | Ikeda et al. ................. | 348/322 |
| 6,426,493 B1 | * | 7/2002 | Oda ........................... | 348/322 |
| 6,583,818 B1 | * | 6/2003 | Toma ......................... | 348/312 |
| 6,677,998 B1 | * | 1/2004 | Misawa ...................... | 348/312 |
| 6,707,494 B1 | * | 3/2004 | Misawa et al. .............. | 348/273 |
| 2001/0043276 A1 | * | 11/2001 | Ueno ......................... | 348/322 |
| 2001/0048477 A1 | * | 12/2001 | Misawa ...................... | 348/272 |

FOREIGN PATENT DOCUMENTS

| | | |
|---|---|---|
| JP | B2606148 | 2/1985 |
| JP | B2-2660592 | 6/1997 |
| JP | B2-2660594 | 6/1997 |
| JP | B2-2721603 | 11/1997 |

* cited by examiner

*Primary Examiner*—Wendy R. Garber
*Assistant Examiner*—John M Villecco
(74) *Attorney, Agent, or Firm*—Birch, Stewart, Kolasch & Birch, LLP

(57) ABSTRACT

A solid-state electronic image sensing device applicable to a digital camera includes signal lines for feeding transfer gate pulses to transfer gates. The signal lines on an "N+1", an "N+5" and an "N+13" row are connected together while the signal lines on an "N+3", an "N+7", an "N+11" and an "N+15" row are connected together. Likewise, the signal lines on an "N+4", an "N+8", an "N+12" and an "N+14" row are connected together. Further, the signal lines on an "N+6", an "N+10" and an "N+14" row are connected together. Six kinds of signal lines, i.e., the above signal lines and two independent signal lines on an "N+2" and an "N+9" row each are connected to a particular transfer gate via an electrode formed between one of photosensitive cells arranged in the row direction and associated one of vertical transfer paths. Vertical drive signals each are simultaneously fed to preselected signal lines in order to transfer signal charges from the photosensitive cells.

35 Claims, 71 Drawing Sheets

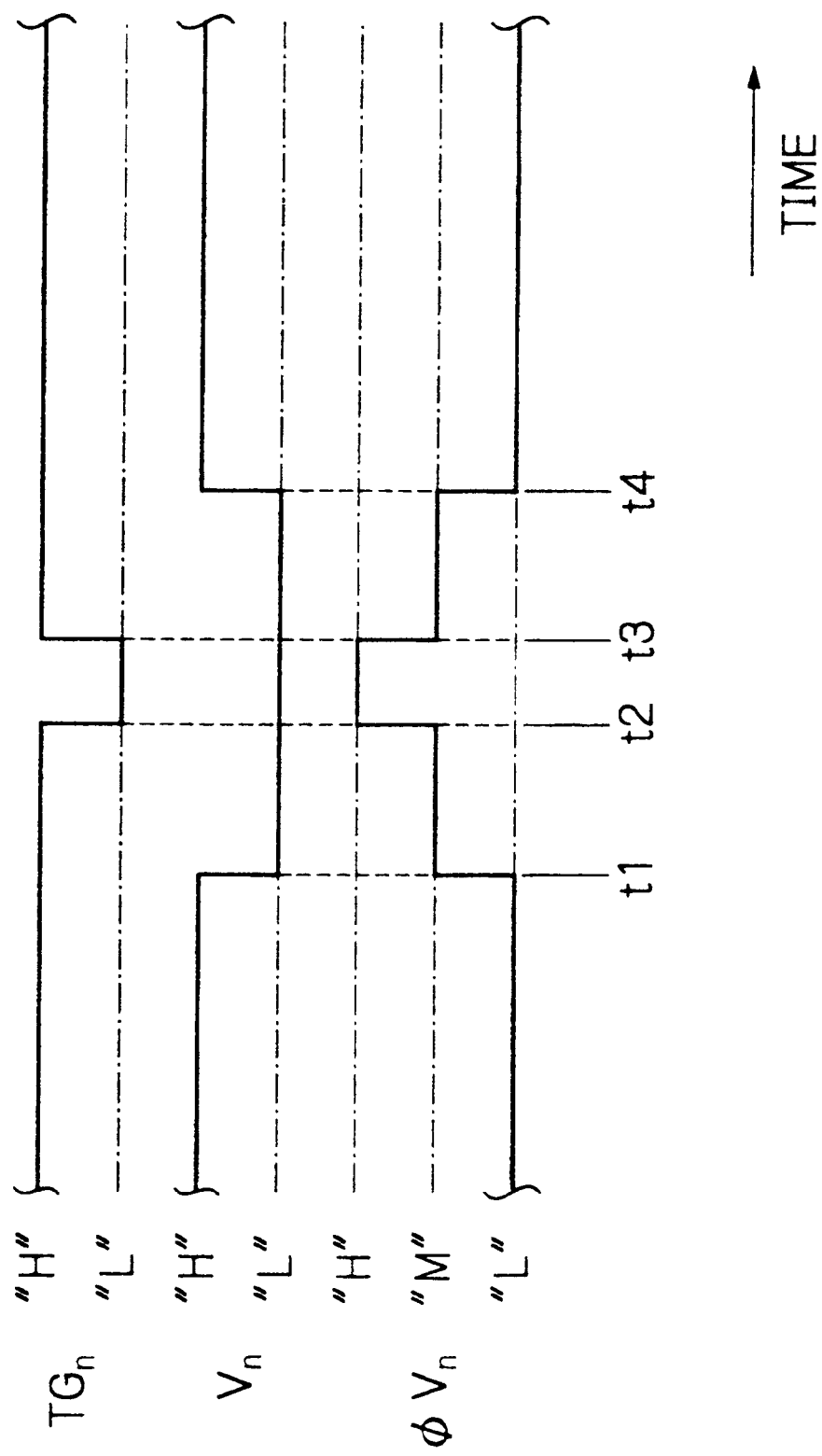

Fig. 4

| | VERTICAL TRANSFER ELECTRODE | VERTICAL DRIVE SIGNALS $\phi V_n$ | |
|---|---|---|---|
| | | 1ST FIELD | 2ND FIELD |
| "N+1" ROW | E1b | ○ | |
| ("m+1" ROW) | E2 | | |
| "N+2" ROW | E3a | | ○ |
| ("m+2" ROW) | E4 | | |
| "N+3" ROW | E5 | ○ | |
| ("m+3" ROW) | E6 | | |
| "N+4" ROW | E7 | | ○ |
| ("m+4" ROW) | E8 | | |
| "N+5" ROW | E1b | ○ | |
| ("m+1" ROW) | E2 | | |
| "N+6" ROW | E3b | | ○ |
| ("m+2" ROW) | E4 | | |
| "N+7" ROW | E5 | ○ | |
| ("m+3" ROW) | E6 | | |
| "N+8" ROW | E7 | | ○ |
| ("m+4" ROW) | E8 | | |
| "N+9" ROW | E1a | ○ | |
| ("m+1" ROW) | E2 | | |
| "N+10" ROW | E3b | | ○ |
| ("m+2" ROW) | E4 | | |
| "N+11" ROW | E5 | ○ | |
| ("m+3" ROW) | E6 | | |
| "N+12" ROW | E7 | | ○ |
| ("m+4" ROW) | E8 | | |
| "N+13" ROW | E1b | ○ | |
| ("m+1" ROW) | E2 | | |
| "N+14" ROW | E3b | | ○ |
| ("m+2" ROW) | E4 | | |
| "N+15" ROW | E5 | ○ | |
| ("m+3" ROW) | E6 | | |
| "N+16" ROW | E7 | | ○ |
| ("m+4" ROW) | E8 | | |

1ST FIELD

2ND FIELD

Fig. 12

| | VERTICAL TRANSFER ELECTRODE | VERTICAL DRIVE SIGNALS $\phi V_n$ | |
|---|---|---|---|
| | | 1ST FIELD | 2ND FIELD |
| "N+1" ROW | E1b | O | |
| ("m+1" ROW) | E2 | | |
| "N+2" ROW | E3a | O | |
| ("m+2" ROW) | E4 | | |
| "N+3" ROW | E5 | | O |
| ("m+3" ROW) | E6 | | |
| "N+4" ROW | E7 | | O |
| ("m+4" ROW) | E8 | | |
| "N+5" ROW | E1b | O | |
| ("m+1" ROW) | E2 | | |
| "N+6" ROW | E3b | O | |
| ("m+2" ROW) | E4 | | |
| "N+7" ROW | E5 | | O |
| ("m+3" ROW) | E6 | | |
| "N+8" ROW | E7 | | O |
| ("m+4" ROW) | E8 | | |
| "N+9" ROW | E1a | O | |
| ("m+1" ROW) | E2 | | |
| "N+10" ROW | E3b | O | |
| ("m+2" ROW) | E4 | | |
| "N+11" ROW | E5 | | O |
| ("m+3" ROW) | E6 | | |
| "N+12" ROW | E7 | | O |
| ("m+4" ROW) | E8 | | |
| "N+13" ROW | E1b | O | |
| ("m+1" ROW) | E2 | | |
| "N+14" ROW | E3b | O | |
| ("m+2" ROW) | E4 | | |
| "N+15" ROW | E5 | | O |
| ("m+3" ROW) | E6 | | |
| "N+16" ROW | E7 | | O |
| ("m+4" ROW) | E8 | | |

1ST FIELD

2ND FIELD

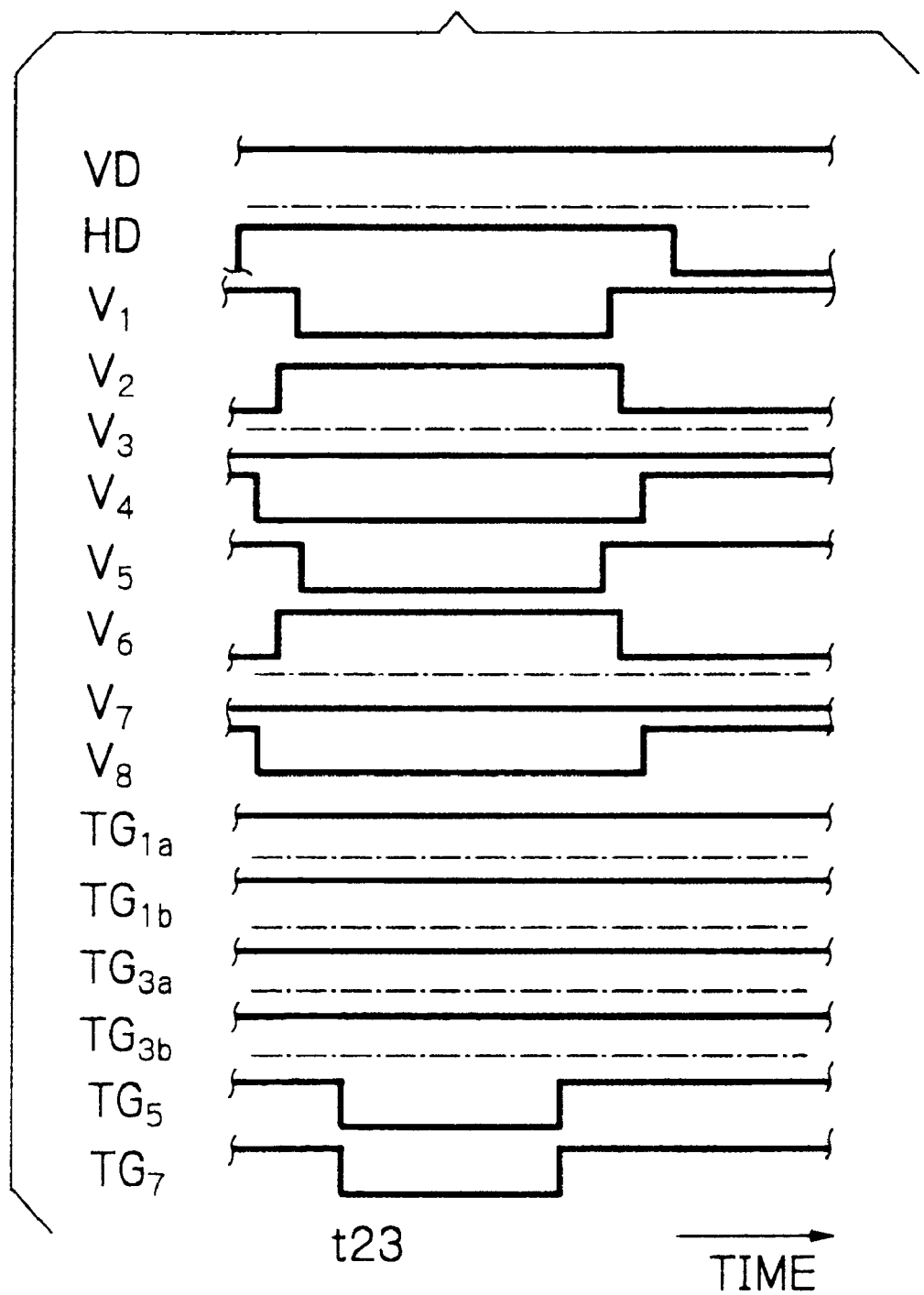

Fig. 20

| | VERTICAL TRANSFER ELECTRODE | VERTICAL DRIVE SIGNALS $\phi V_n$ |
|---|---|---|
| "N+1" ROW | E1b | |
| ("m+1" ROW) | E2 | |
| "N+2" ROW | E3a | |
| ("m+2" ROW) | E4 | |
| "N+3" ROW | E5 | ○ |
| ("m+3" ROW) | E6 | |
| "N+4" ROW | E7 | ○ |
| ("m+4" ROW) | E8 | |
| "N+5" ROW | E1b | |
| ("m+1" ROW) | E2 | |
| "N+6" ROW | E3b | |
| ("m+2" ROW) | E4 | |
| "N+7" ROW | E5 | ○ |
| ("m+3" ROW) | E6 | |
| "N+8" ROW | E7 | ○ |
| ("m+4" ROW) | E8 | |
| "N+9" ROW | E1a | |
| ("m+1" ROW) | E2 | |
| "N+10" ROW | E3b | |
| ("m+2" ROW) | E4 | |
| "N+11" ROW | E5 | ○ |
| ("m+3" ROW) | E6 | |
| "N+12" ROW | E7 | ○ |
| ("m+4" ROW) | E8 | |
| "N+13" ROW | E1b | |
| ("m+1" ROW) | E2 | |
| "N+14" ROW | E3b | |
| ("m+2" ROW) | E4 | |
| "N+15" ROW | E5 | ○ |
| ("m+3" ROW) | E6 | |
| "N+16" ROW | E7 | ○ |
| ("m+4" ROW) | E8 | |

Fig. 22

| | VERTICAL TRANSFER ELECTRODE | VERTICAL DRIVE SIGNALS $\phi V_n$ |
|---|---|---|
| "N+1" ROW | E1b | ○ |
| ("m+1" ROW) | E2 | |
| "N+2" ROW | E3a | ○ |
| ("m+2" ROW) | E4 | |
| "N+3" ROW | E5 | |
| ("m+3" ROW) | E6 | |
| "N+4" ROW | E7 | |
| ("m+4" ROW) | E8 | |
| "N+5" ROW | E1b | ○ |
| ("m+1" ROW) | E2 | |
| "N+6" ROW | E3b | ○ |
| ("m+2" ROW) | E4 | |
| "N+7" ROW | E5 | |
| ("m+3" ROW) | E6 | |
| "N+8" ROW | E7 | |
| ("m+4" ROW) | E8 | |
| "N+9" ROW | E1a | ○ |
| ("m+1" ROW) | E2 | |
| "N+10" ROW | E3b | ○ |
| ("m+2" ROW) | E4 | |
| "N+11" ROW | E5 | |
| ("m+3" ROW) | E6 | |
| "N+12" ROW | E7 | |
| ("m+4" ROW) | E8 | |
| "N+13" ROW | E1b | ○ |
| ("m+1" ROW) | E2 | |
| "N+14" ROW | E3b | ○ |
| ("m+2" ROW) | E4 | |
| "N+15" ROW | E5 | |
| ("m+3" ROW) | E6 | |
| "N+16" ROW | E7 | |
| ("m+4" ROW) | E8 | |

Fig. 24

| VERTICAL TRANSFER ELECTRODE | | VERTICAL DRIVE SIGNALS $\phi V_n$ | | | |
|---|---|---|---|---|---|
| | | 1ST FIELD | 2ND FIELD | 3RD FIELD | 4TH FIELD |
| "N+1" ROW | E1b | ○ | | | |
| ("m+1" ROW) | E2 | | | | |
| "N+2" ROW | E3a | | ○ | | |
| ("m+2" ROW) | E4 | | | | |
| "N+3" ROW | E5 | | | ○ | |
| ("m+3" ROW) | E6 | | | | |
| "N+4" ROW | E7 | | | | ○ |
| ("m+4" ROW) | E8 | | | | |
| "N+5" ROW | E1b | ○ | | | |
| ("m+1" ROW) | E2 | | | | |
| "N+6" ROW | E3b | | ○ | | |
| ("m+2" ROW) | E4 | | | | |
| "N+7" ROW | E5 | | | ○ | |
| ("m+3" ROW) | E6 | | | | |
| "N+8" ROW | E7 | | | | ○ |
| ("m+4" ROW) | E8 | | | | |
| "N+9" ROW | E1a | ○ | | | |
| ("m+1" ROW) | E2 | | | | |
| "N+10" ROW | E3b | | ○ | | |
| ("m+2" ROW) | E4 | | | | |
| "N+11" ROW | E5 | | | ○ | |
| ("m+3" ROW) | E6 | | | | |
| "N+12" ROW | E7 | | | | ○ |
| ("m+4" ROW) | E8 | | | | |
| "N+13" ROW | E1b | ○ | | | |
| ("m+1" ROW) | E2 | | | | |
| "N+14" ROW | E3b | | ○ | | |
| ("m+2" ROW) | E4 | | | | |
| "N+15" ROW | E5 | | | ○ | |
| ("m+3" ROW) | E6 | | | | |
| "N+16" ROW | E7 | | | | ○ |
| ("m+4" ROW) | E8 | | | | |

1ST FIELD

4TH FIELD

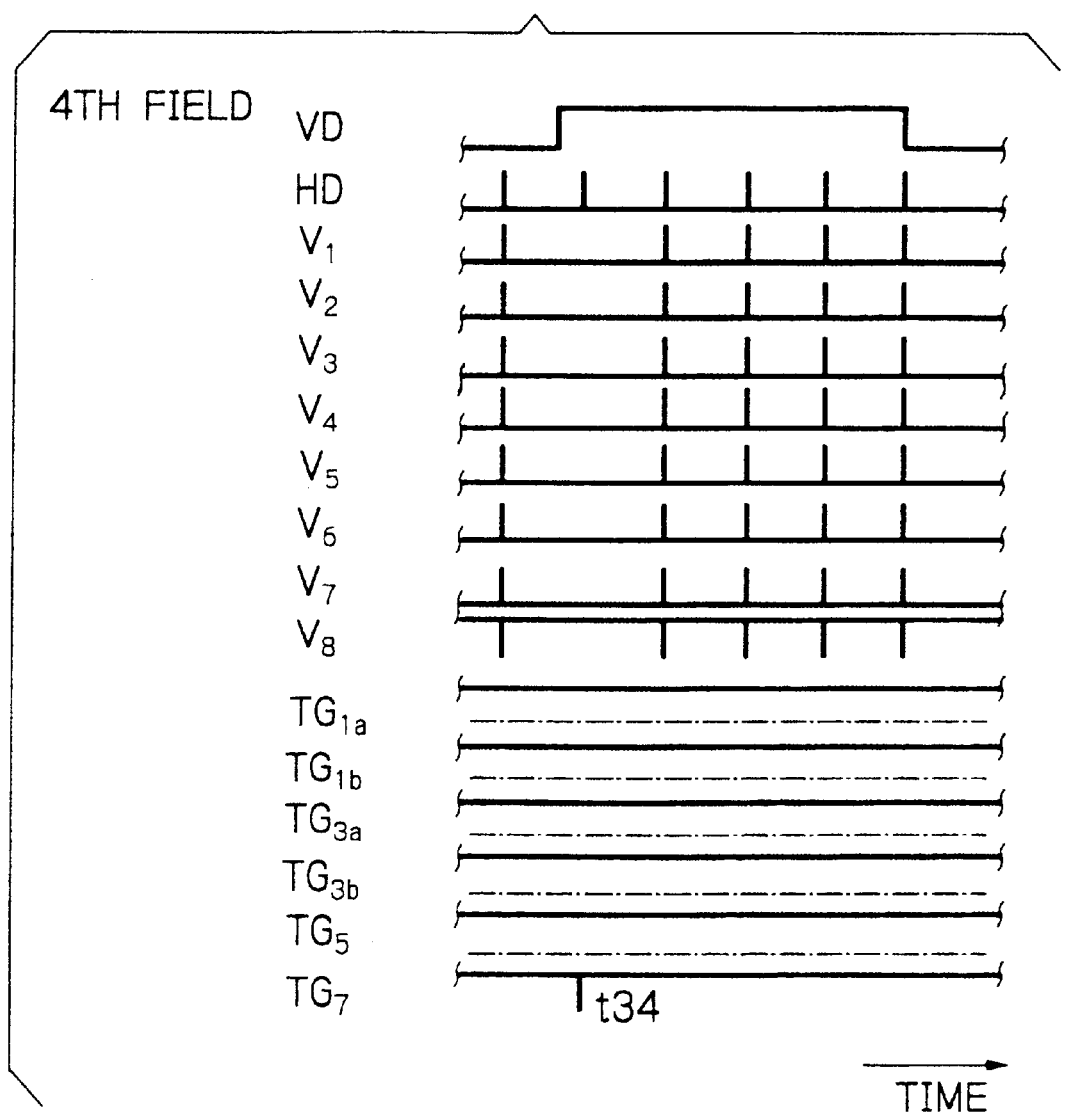

Fig. 33

| | VERTICAL TRANSFER ELECTRODE | VERTICAL DRIVE SIGNALS $\phi V_n$ | |
|---|---|---|---|
| | | 1ST FIELD | 2ND FIELD |
| "N+1" ROW | E1b | | |
| ("m+1" ROW) | E2 | | |
| "N+2" ROW | E3a | | |
| ("m+2" ROW) | E4 | | |
| "N+3" ROW | E5 | ○ | |
| ("m+3" ROW) | E6 | | |
| "N+4" ROW | E7 | | ○ |
| ("m+4" ROW) | E8 | | |
| "N+5" ROW | E1b | | |
| ("m+1" ROW) | E2 | | |
| "N+6" ROW | E3b | | |
| ("m+2" ROW) | E4 | | |
| "N+7" ROW | E5 | ○ | |
| ("m+3" ROW) | E6 | | |
| "N+8" ROW | E7 | | ○ |
| ("m+4" ROW) | E8 | | |
| "N+9" ROW | E1a | | |
| ("m+1" ROW) | E2 | | |
| "N+10" ROW | E3b | | |
| ("m+2" ROW) | E4 | | |
| "N+11" ROW | E5 | ○ | |
| ("m+3" ROW) | E6 | | |
| "N+12" ROW | E7 | | ○ |
| ("m+4" ROW) | E8 | | |
| "N+13" ROW | E1b | | |
| ("m+1" ROW) | E2 | | |
| "N+14" ROW | E3b | | |
| ("m+2" ROW) | E4 | | |
| "N+15" ROW | E5 | ○ | |
| ("m+3" ROW) | E6 | | |
| "N+16" ROW | E7 | | ○ |
| ("m+4" ROW) | E8 | | |

Fig. 34

| VERTICAL TRANSFER ELECTRODE | | VERTICAL DRIVE SIGNALS $\phi V_n$ | |
|---|---|---|---|
| | | 1ST FIELD | 2ND FIELD |
| "N+1" ROW | E1b | O | |
| ("m+1" ROW) | E2 | | |
| "N+2" ROW | E3a | | |
| ("m+2" ROW) | E4 | | |
| "N+3" ROW | E5 | | |
| ("m+3" ROW) | E6 | | |
| "N+4" ROW | E7 | | O |
| ("m+4" ROW) | E8 | | |
| "N+5" ROW | E1b | O | |
| ("m+1" ROW) | E2 | | |
| "N+6" ROW | E3b | | |
| ("m+2" ROW) | E4 | | |
| "N+7" ROW | E5 | | |
| ("m+3" ROW) | E6 | | |
| "N+8" ROW | E7 | | O |
| ("m+4" ROW) | E8 | | |
| "N+9" ROW | E1a | O | |
| ("m+1" ROW) | E2 | | |
| "N+10" ROW | E3b | | |
| ("m+2" ROW) | E4 | | |
| "N+11" ROW | E5 | | |
| ("m+3" ROW) | E6 | | |
| "N+12" ROW | E7 | | O |
| ("m+4" ROW) | E8 | | |
| "N+13" ROW | E1b | O | |
| ("m+1" ROW) | E2 | | |
| "N+14" ROW | E3b | | |
| ("m+2" ROW) | E4 | | |
| "N+15" ROW | E5 | | |
| ("m+3" ROW) | E6 | | |
| "N+16" ROW | E7 | | O |
| ("m+4" ROW) | E8 | | |

Fig. 35

| | VERTICAL TRANSFER ELECTRODE | VERTICAL DRIVE SIGNALS $\phi V_n$ |
|---|---|---|
| "N+1" ROW | E1b | |
| ("m+1" ROW) | E2 | |
| "N+2" ROW | E3a | ◯ |
| ("m+2" ROW) | E4 | |
| "N+3" ROW | E5 | |
| ("m+3" ROW) | E6 | |
| "N+4" ROW | E7 | |
| ("m+4" ROW) | E8 | |
| "N+5" ROW | E1b | |
| ("m+1" ROW) | E2 | |
| "N+6" ROW | E3b | |
| ("m+2" ROW) | E4 | |
| "N+7" ROW | E5 | |
| ("m+3" ROW) | E6 | |
| "N+8" ROW | E7 | |
| ("m+4" ROW) | E8 | |
| "N+9" ROW | E1a | ◯ |
| ("m+1" ROW) | E2 | |
| "N+10" ROW | E3b | |
| ("m+2" ROW) | E4 | |
| "N+11" ROW | E5 | |
| ("m+3" ROW) | E6 | |
| "N+12" ROW | E7 | |
| ("m+4" ROW) | E8 | |
| "N+13" ROW | E1b | |
| ("m+1" ROW) | E2 | |
| "N+14" ROW | E3b | |
| ("m+2" ROW) | E4 | |
| "N+15" ROW | E5 | |
| ("m+3" ROW) | E6 | |
| "N+16" ROW | E7 | |
| ("m+4" ROW) | E8 | |

Fig. 50A

| Fig.50 | | |
|---|---|---|
| Fig.50A | Fig.50B | Fig.50C |

| COLOR | POSITION | A | B | C | D | E | F |
|---|---|---|---|---|---|---|---|
| B | V1a | B | B |   | B |   | B |
| R | V3a |   | R |   | R |   |   |
| B | V5 |   |   |   |   |   |   |
| R | V7 |   |   |   |   |   |   |
| B | V1b |   |   | B |   |   |   |
| R | V3b | R |   | R |   |   |   |
| B | V5 |   |   |   |   |   |   |
| R | V7 |   |   |   |   |   |   |
| B | V1c | B | B |   |   | B |   |
| R | V3c |   | R |   |   | R | R |
| B | V5 |   |   |   |   |   |   |
| R | V7 |   |   |   |   |   |   |
| B | V1b |   |   | B |   |   |   |
| R | V3b | R |   | R |   |   |   |
| B | V5 |   |   |   |   |   |   |
| R | V7 |   |   |   |   |   |   |
| B | V1a | B | B |   | B |   | B |
| R | V3a |   | R |   | R |   |   |
| B | V5 |   |   |   |   |   |   |
| R | V7 |   |   |   |   |   |   |
| B | V1b |   |   | B |   |   |   |
| R | V3b | R |   | R |   |   |   |
| B | V5 |   |   |   |   |   |   |
| R | V7 |   |   |   |   |   |   |
| B | V1c | B | B |   |   | B |   |
| R | V3c |   | R |   |   | R | R |
| B | V5 |   |   |   |   |   |   |
| R | V7 |   |   |   |   |   |   |
| B | V1b |   |   | B |   |   |   |
| R | V3b | R |   | R |   |   |   |
| B | V5 |   |   |   |   |   |   |
| R | V7 |   |   |   |   |   |   |
| B | V1a | B | B |   | B |   | B |
| R | V3a |   | R |   | R |   |   |
| B | V5 |   |   |   |   |   |   |
| R | V7 |   |   |   |   |   |   |
| B | V1b |   |   | B |   |   |   |
| R | V3b | R |   | R |   |   |   |
| B | V5 |   |   |   |   |   |   |
| R | V7 |   |   |   |   |   |   |
| B | V1c | B | B |   |   | B |   |

Fig. 50B

| COLOR | POSITION | G | H | I |
|---|---|---|---|---|
| B | V1a | B | B | |
| R | V3a | | R | |
| B | V5 | | | |
| R | V7 | | | |
| B | V1b | | | B |
| R | V3b | R | | R |
| B | V5 | | | |
| R | V7 | | | |
| B | V1a | B | B | |
| R | V3a | | R | |
| B | V5 | | | |
| R | V7 | | | |
| B | V1b | | | B |
| R | V3b | R | | R |
| B | V5 | | | |
| R | V7 | | | |
| B | V1a | B | B | |
| R | V3a | | R | |
| B | V5 | | | |
| R | V7 | | | |
| B | V1b | | | B |
| R | V3b | R | | R |
| B | V5 | | | |
| R | V7 | | | |
| B | V1a | B | B | |
| R | V3a | | R | |
| B | V5 | | | |
| R | V7 | | | |
| B | V1b | | | B |
| R | V3b | R | | R |
| B | V5 | | | |
| R | V7 | | | |
| B | V1a | B | B | |
| R | V3a | | R | |
| B | V5 | | | |
| R | V7 | | | |
| B | V1b | | | B |
| R | V3b | R | | R |
| B | V5 | | | |
| R | V7 | | | |
| B | V1a | B | B | |

Fig. 50C

| COLOR | POSITION | J | POSITION | K |
|---|---|---|---|---|
| B | V1a | B | V1a | B |
| R | V3a | R | V3a | |
| B | V5 | | V5 | |
| R | V7 | | V7 | |
| B | V1b | | V1b | |
| R | V3b | | V3a | |
| B | V5 | | V5 | |
| R | V7 | | V7 | |
| B | V1b | | V1b | |
| R | V3b | | V3c | R |
| B | V5 | | V5 | |
| R | V7 | | V7 | |
| B | V1b | | V1b | |
| R | V3b | | V3a | |
| B | V5 | | V5 | |
| R | V7 | | V7 | |
| B | V1a | B | V1a | B |
| R | V3a | R | V3a | |
| B | V5 | | V5 | |
| R | V7 | | V7 | |
| B | V1b | | V1b | |
| R | V3b | | V3a | |
| B | V5 | | V5 | |
| R | V7 | | V7 | |
| B | V1b | | V1b | |
| R | V3b | | V3c | R |
| B | V5 | | V5 | |
| R | V7 | | V7 | |
| B | V1b | | V1b | |
| R | V3b | | V3a | |
| B | V5 | | V5 | |
| R | V7 | | V7 | |
| B | V1a | B | V1a | B |
| R | V3a | R | V3a | |
| B | V5 | | V5 | |
| R | V7 | | V7 | |
| B | V1b | | V1b | |
| R | V3b | | V3a | |
| B | V5 | | V5 | |
| R | V7 | | V7 | |
| B | V1b | | V1b | |

SOLID-STATE ELECTRONIC IMAGE SENSING DEVICE WITH HIGH SUBSAMPLING EFFICIENCY AND METHOD OF READING A VIDEO SIGNAL OUT OF THE SAME

This is a continuation-in-part of application Ser. No. 09/492,093 filed on Jan. 27, 2000.

BACKGROUND OF THE INVENTION

1. Field of the Invention

The present invention relates to a solid-state electronic image sensing device with high subsampling efficiency and a method of reading a video signal out of the same. More particularly, the present invention relates to a solid-state electronic image sensing device of the type including a plurality of photosensitive cells arranged in a row and a column direction, vertical transfer paths adjoining the photosensitive cells in the row direction and in which vertical transfer electrodes are formed, and transfer gates for transferring signal charges accumulated in the photosensitive cells to the vertical transfer paths, and a method of reading a video signal out of the same.

2. Description of the Background Art

In a digital still camera, for example, including a CCD (Charge Coupled Device) image sensor or similar solid-state electronic image sensing device, image data with high quality should only be produced for being recorded in a recording medium. When the digital still camera is operated in an AE (Automatic Exposure) or an AF (Automatic Focus) photometry mode or in a shoot mode, it is not necessary to display a subject to be picked up on a monitor in the form of high quality image data.

So long as the image sensing device has a relatively small number of pixels, e.g., about 640×480 pixels, it may be driven by a conventional drive system without regard to the operation mode of the camera, i.e., the AE or AF photometry mode, the shoot mode or a mode for recording of a video signal representative of a subject in a recording medium. Today, the digital still camera with the image sensing device implements image quality comparable with one achievable with a silver halide photosensitive type of film. The number of pixels of such a camera is further increasing to meet an increasing demand for higher image quality.

The increasing number of pixels of a solid-state image sensing device, however, brings about a problem that when the device is driven by the same system at all times, signal processing for AE, AF and display of an image on a monitor cannot be rapidly completed within a preselected period of time. This prevents image data representative of a subject to be rapidly recorded in a recording medium, so that the operator of the camera is apt to miss a chance to release the shutter.

To cope with the increasing number of pixels, Japanese Patent Publication No. 6148/1985 discloses a high resolution, reliable image pickup system needing no additional optics and therefore obviating the deterioration of dimensional specification and yield at the production stage (Prior Art Document 1 hereinafter). The image pickup system of Prior Art Document 1 includes a four-phase drive, frame transfer type solid-state image sensing device. Specifically, a potential well is formed beneath a particular electrode in each field so as to pick up an object and read an image signal representative of the subject. As a result, a four field, one frame image is formed. At the same time, the duration of signal storage is controlled in accordance with a difference between the valid areas of transfer electrodes.

Japanese Patent No. 2660592 proposes a high-definition still camera with a monitoring capability that allows the operator to set a view angle while watching a subject and release the shutter of the camera at any desired time (Prior Art Document 2 hereinafter). The camera is therefore capable of dealing with a still picture in the same manner as a moving picture, e.g., a moving picture recorded by a Video Cassette Recorder).

Japanese Patent No. 2660594, like Prior Art Document 2, discloses an electronic still camera capable of reading out a signal on a four-field basis (Prior Art Document 3 hereinafter). The camera of Prior Art Document 3 executes, after exposure, read-out of stored needless signal charges during a single field scanning period and then reads out pixel signals by field scanning so as to obviate smear components. Further, after reading out the needless charges, the camera resumes scanning a field not shifted and sequentially reads out pixel signals field by field. This is successful to uniform the influence of dark current on the field-by-field pixel signals. Consequently, there can be obviated flicker ascribable to, e.g., irregularity in field-by-field luminance at the time of reproduction.

Further, Japanese Patent No. 2721603 teaches a solid-state image sensing device and a method of driving it (Prior Art Document 4 hereinafter). Generally, when a solid-state image sensing device and a monitor for displaying a scene being picked up are noticeably different in vertical resolution, vertical flicker, for example, appears on the monitor and degrades motion resolution while extending a processing time. The loss of power is another problem to arise in such a situation. The image sensor disclosed in Prior Art Document 4 reads, at the time of monitoring, charges out of only two kinds of photoelectric transduction elements alternately and reads a single frame over a 2V period so as to enhance motion resolution and obviate vertical jitter. At the time of reproduction, the device of Prior Art document 4 reads charges out of only one kind of photoelectric transduction elements and sets up the same saturation charge as in a still picture shoot mode, thereby making it needless to boost a drive voltage. This solves the power loss problem.

As stated above, a procedure for reading signal charges out of a solid-state electronic image sensing device has recently been devised in various ways in order to subsample or otherwise deal with signal charges in a manner matching with AE, AF or monitoring of a subject.

The system disclosed in Prior Art Document 1, however, has the following problems left unsolved because it effects four-phase drive at all times. Specifically, when color filters are arranged in a so-called Bayer pattern for color image pickup, the four-phase drive fails to cause all of three primary colors R (red), G (green) and B (blue) to appear in a single field. Subsampling effected in this condition would prevent a color image from being adequately displayed. In addition, the drive system is limited to four-phase drive, as mentioned above.

The devices of Prior Art Documents 2 and 3 each read out signal charges out of a great number of pixels in four consecutive fields constituting a single frame. To monitor a scene to pick up, use is made of one-half of the resulting image data, i.e., two fields of image data. However, neither Prior Art Document 2 nor 3 is practicable without resorting to a period of time corresponding to four fields in actually reading out the image data for monitoring. More specifically, during AE or AF photometry requiring rapid processing, the same period of time as during usual read-out is necessary. Prior Art Documents 2 and 3 therefore make no contribution to rapid processing.

The device of Prior Art Document 4 executes subsampling by reading out signal charges of two fields and discarding signal charges of the other two fields. The maximum degree of sampling available with Prior Art 4 is therefore one-fourth, limiting the signal reading rate.

As stated above, while various schemes have been proposed to subsample a video signal to be output from a solid-state image sensing device for realizing rapid signal processing, it is difficult to increase the degree of subsampling therewith.

SUMMARY OF THE INVENTION

It is therefore an object of the present invention to provide a solid-state electronic image sensing device capable of increasing the degree of subsampling more than the conventional devices, and a method of reading a video signal thereoutof.

In accordance with the present invention, a solid-state electronic image sensing device includes a plurality of photosensitive cells arranged in a row direction and a column direction. Vertical transfer paths adjoin the photosensitive cells arranged in the row direction and having vertical transfer electrodes formed thereon. Transfer gates each intervene between one photosensitive cell and the vertical transfer path adjoining it for transferring a signal charge accumulated in the former to the latter. Specifically, the transfer gates are made up of a first group of transfer gates adjoining the photosensitive cells arranged on an "N+1", an "N+5" and an "N+13" row (N being a positive integer), a second group of transfer gates adjoining the photosensitive cells arranged on an "N+2" row, a third group of transfer gates adjoining the photosensitive cells arranged on an "N+3", an "N+7", an "N+11", and an "N+15" row, a fourth group of transfer gates adjoining the photosensitive cells arranged on an "N+4", an "N+8", an "N+12" and an "N+16" row, a fifth group of transfer gates adjoining the photosensitive cells arranged on an "N+6", an "N+10" and an "N+14" row, and a sixth group of transfer gates adjoining the photosensitive cells arranged on an "N+9" row. A particular gate pulse is simultaneously applied to each of the first group to the sixth group of transfer gates via a respective signal line.

Also, in accordance with the present invention, a method of reading out signal charges out of the a solid-state electronic image sensing device having the above configuration includes the steps of simultaneously applying gate pulses to a first group of transfer gates adjoining the photosensitive cells arranged on an "N+1", an "N+5" and an "N+13" row, simultaneously applying gate pulses to a second group of transfer gates adjoining the photosensitive cells arranged on an "N+2" row, simultaneously applying gate pulses to a third group of transfer gates adjoining the photosensitive cells arranged on an "N+3", an "N+7", an "N+11" and an "N+15" row, simultaneously applying gate pulses to a fourth group of transfer gates adjoining the photosensitive cells arranged on an "N+4", an "N+8", an "N+12" and an "N+16" row, simultaneously applying gate pulses to a fifth group of transfer gates adjoining the photosensitive cells arranged on an "N+6", an "N+10" and an "N+14" row, and simultaneously applying gate pulses to a sixth group of transfer gates adjoining the photosensitive cells arranged on an "N+9" row. As a result, signal charges are sequentially read out of the first group to the sixth group of transfer gates.

Further, in accordance with the present invention, a solid-state electronic image sensing device for picking up a scene includes a plurality of photosensitive cells arranged in a row direction and a column direction each for transforming incident light to a corresponding electric signal by photoelectric transduction. Vertical transfer paths adjoin the photosensitive cells for transferring in a vertical direction signal charges read out of the photosensitive cells or devices. Transfer gates each intervene between one photosensitive cell and the vertical transfer path adjoining it for transferring a signal charged accumulated in the former to the latter at a preselected timing. A horizontal transfer path sequentially transfers the signal charges in a horizontal direction. A drive signal generating circuit feeds vertical drive signals, which include transfer gate pulses for driving the transfer gate at a preselected timing, to the transfer gates to thereby transfer the signal charges from the vertical transfer paths to the horizontal transfer path. The vertical transfer paths each have vertical transfer devices each two of which are assigned to a single photosensitive cell for thereby preventing the signal charges read out of the photosensitive cells from being mixed together. The drive signal generating circuit generates the vertical drive signals regularly for reading out the signal charges out of the photosensitive cells at the interval of $2^{i+1}-1$ rows (i being a natural number) from preselected photosensitive cells of the same color as a first color, which is a characteristic as seen in the row direction, and reading out the signal charges out of the photosensitive cells at the interval of $2^{i+1}-1$ rows from preselected photosensitive cells of the same color as a second color, which is a characteristic as seen in the row direction. The vertical drive signals are fed at the above intervals via signal lines arranged in the image sensing device.

Moreover, a method of reading signal charges representative of a scene picked up out of a solid-state electronic image sensing device having the above configuration includes the steps of forming on each of the vertical transfer paths vertical transfer devices each two of which are assigned to a single photosensitive cell for thereby preventing the signal charges read out of the photosensitive cells from being mixed together, and causing the drive signal generating circuit to generate the vertical drive signals regularly for reading out the signal charges out of the photosensitive cells at the interval of $2^{i+1}-1$ rows from preselected photosensitive cells of the same color as a first color, which is a characteristic as seen in the row direction, and reading out the signal charges out of the photosensitive cells at the interval of $2^{i+1}-1$ rows from preselected photosensitive cells of the same color as a second color, which is a characteristic as seen in the row direction. The vertical drive signals are fed at the above intervals via signal lines arranged in the image sensing device.

BRIEF DESCRIPTION OF THE DRAWINGS

The objects and features of the present invention will become more apparent from the consideration of the following detailed description taken in conjunction with the accompanying drawings which:

FIG. 3 is a timing chart showing a relation between vertical drive signals fed to the image pickup section of FIG. 2 and transfer gate pulses and vertical drive timing signals;

FIG. 4 is a diagram showing a relation between vertical transfer electrodes included in the illustrative embodiment and the vertical drive signals including field gate pulses to be applied field by field;

FIG. 12 is a diagram showing a relation between the vertical transfer electrodes of FIG. 2 and the vertical drive signals applied to two lines at a time in each field;

FIG. 19 is a timing chart showing a relation between the horizontal synchronizing signal and the vertical drive timing signals and transfer gate pulses in the first field for implementing the relation of FIG. 12;

FIG. 20 is a diagram showing a relation between the vertical transfer electrodes of FIG. 2 and the vertical drive signals fed to the same two lines (second field) at a time field by field;

FIG. 22 is a table showing a relation between the vertical transfer electrodes of FIG. 2 and the vertical drive signals fed to the same two lines (first field) at a time field by field;

FIG. 24 is a diagram showing a relation between the vertical transfer electrodes of FIG. 2 and the vertical drive signals each being applied to particular one of four lines field by field;

FIG. 32 a timing chart showing, in an enlarged scale, a relation between the vertical synchronizing signal and the vertical drive timing signals and transfer gate pulses in the fourth field for implementing the relation of FIG. 24;

FIG. 33 is a diagram showing a relation between the vertical transfer electrodes of FIG. 2 and the vertical drive signals each being applied to particular one of two lines adjoining each other in a group of four lines field by field;

FIG. 34 is a diagram showing a relation between the vertical transfer electrodes of FIG. 2 and the vertical drive signals alternately applied to particular lines located at the ends of a group of four lines field by field;

FIG. 35 is a diagram showing a relation between the vertical transfer electrodes of FIG. 2 and the vertical drive signals each being applied to particular one of sixteen lines field by field;

FIGS. 50A through 50C are diagrams listing various patterns available with the alternative embodiment for reading signal charges, together with colors read out;

DESCRIPTION OF THE PREFERRED EMBODIMENTS

Figure 1:
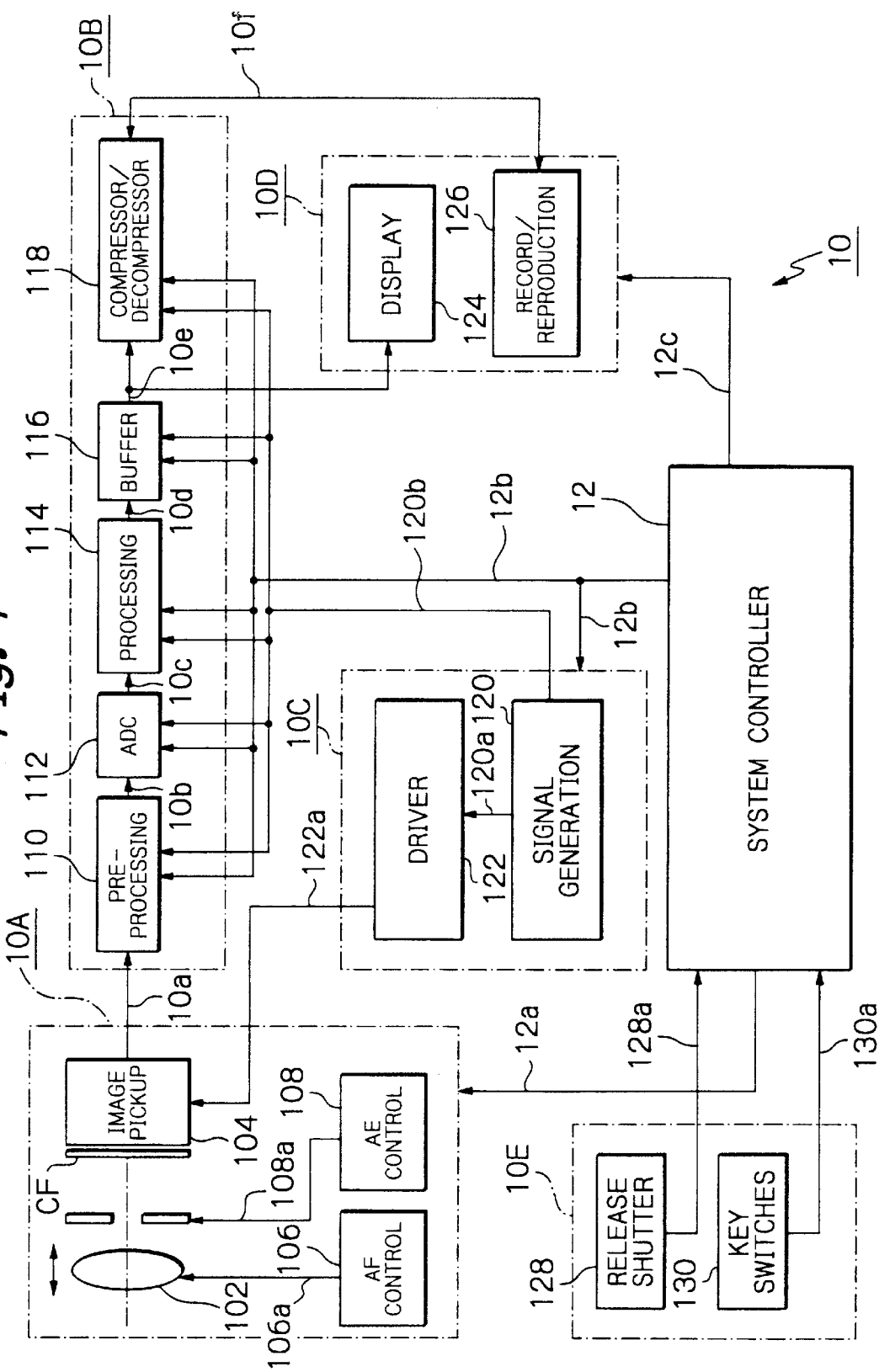
FIG. 1 is a block diagram schematically showing a digital still camera to which a solid-state electronic image sensing device of the present invention is applied.

Referring to FIG. 1 of the drawings, a digital still camera to which a solid-state electronic image sensing device of the present invention is applied is shown and generally designated by the reference numeral 10. It is to be noted that part of the camera 10 not relevant to the understanding of the present invention is not shown or described. Also, signals appearing in the camera 10 are designated by the same reference numerals as connection lines on which they appear.

As shown in FIG. 1, the camera 10 is generally made up of an image pickup section 10A, a signal processing section 10B, a drive signal generating section 10C, a signal output section 10D, a mode setting section 10E, and a system controller 12. The image pickup section 10A includes a lens 102, an image pickup 104, an AF control 106 including a focusing mechanism, and an AE control 108 including a diaphragm mechanism. The image pickup section 10A may additionally include a shutter mechanism, not shown, located at the light input side for fully screening incident light. The lens 102 focuses light incident thereto from a scene to the photosensitive array of the image pickup 104.

The image pickup 104 includes photosensitive cells or imaging devices 104a (see FIG. 2) arranged in rows and columns, i.e., bidimenisonally to constitute the photosensitive array. The photosensitive cells 10a each photoelectrically transforms light incident thereto to corresponding electric signals. A single color filter CF is positioned in front of the photosensitive cells 104a in the direction of light incidence for separating incident light into, e.g., three primary colors R, G and B. The color filter CF has a number of filter segments each corresponding to a particular photosensitive cell 104a. As a result, the R, G and B components of incident light each are input to a particular photosensitive cell 104a. Because the R, G and B segments of the color filter CF are arranged in a fixed pattern, they are labeled R, G and B in FIG. 2 within frames representative of the photosensitive areas of the photosensitive cells 104a. The specific R, G and B pattern shown in FIG. 2 is the so-called Bayer pattern.

The general configuration of the image pickup 104 and signal charge transfer to occur therein will be briefly described hereinafter. In the illustrative embodiment, the photosensitive cells 104a are implemented by CCDs and driven by drive signals 122a output from the drive signal generating section 10C, as will be described specifically later. As shown in FIG. 2, vertical transfer devices each adjoin a particular photosensitive cell 104a. A transfer gate 104b is formed between each photosensitive cell 10a and the vertical transfer element adjoining it, so that a signal charge accumulated in the device 104a can be read out without leaking. The transfer gates 104b transfer signal charges from the photosensitive cells 104a to vertical transfer paths 104c in response to transfer gate pulses or shift pulses TG, which will be described specifically later. The vertical transfer paths 104c each sequentially transfer the signal charges vertically, i.e., in the column direction toward a horizontal transfer path 104d. The horizontal transfer path 104d transfer the signal charges horizontally, i.e., in the row direction in response to a horizontal drive signal $\phi OH_n$. Consequently, the signal charges, labeled 10a, are delivered to the signal processing section 10B via an amplifier 104e.

Figure 2:
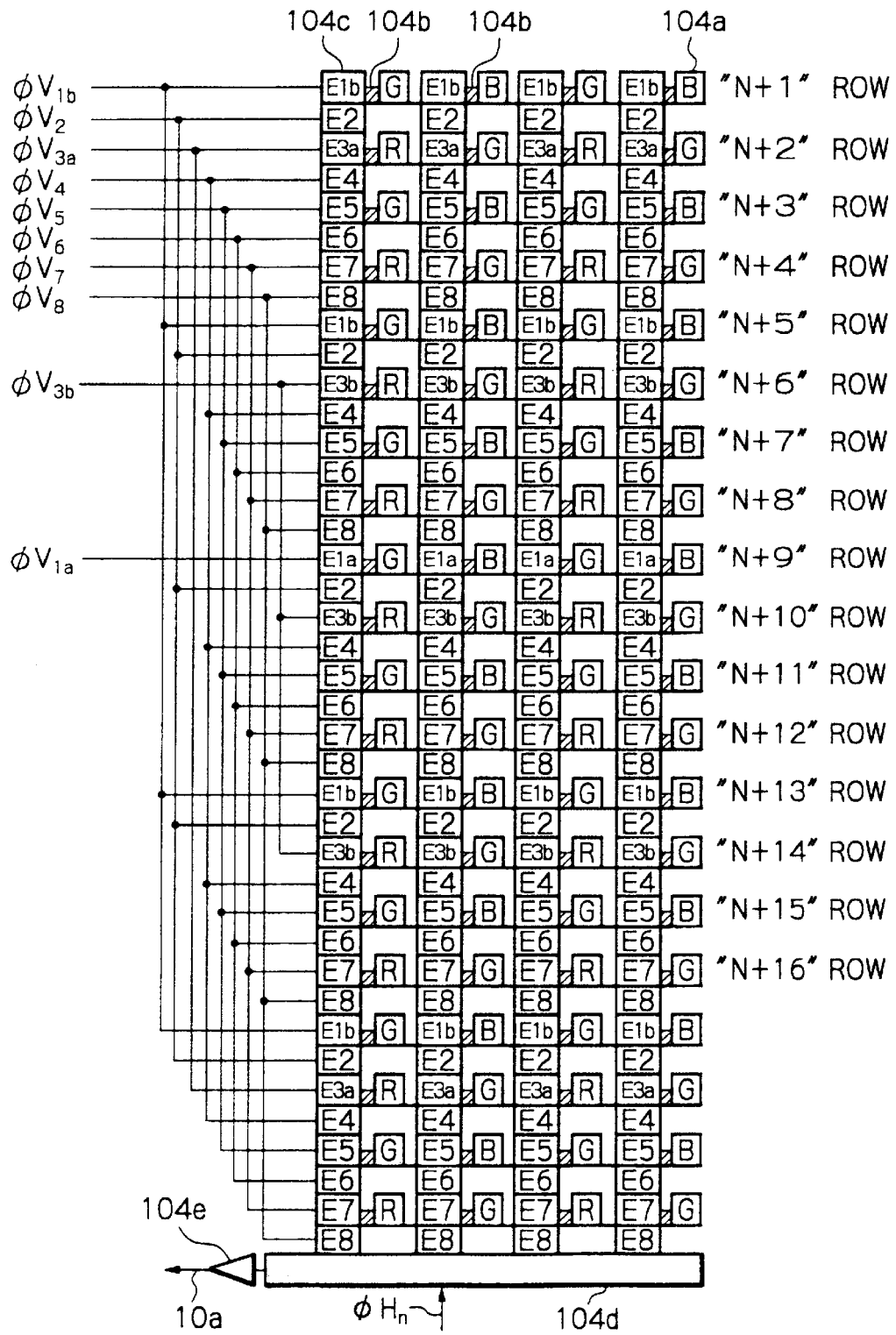
FIG. 2 is a diagram showing part of an image pickup section included in the camera of FIG. 1 and representative of a preferred embodiment of the present invention.

As shown in FIG. 2, in a preferred embodiment of the solid-state image sensing device in accordance with the present invention, a group of eight consecutive vertical transfer devices are cyclically arranged on each vertical transfer path 104c as a unit. The image pickup 104 is therefore driven on an eight-phase basis. The drive signals 122a mentioned earlier include ten different kinds of vertical drive signals $\phi V_{1a}$, $\phi V_{1b}$, $\phi V_2$, $\phi V_{3a}$, $V_{3b}$ and $\phi V_4$ through $\phi V_8$. These vertical signals are fed to the image pickup 104 independently of each other. This indicates that the image pickup 104 has ten different kinds of electrodes. Such a configuration usually allows all the pixels to be read out at the same time. The connection of the image pickup 104 will be described more specifically later.

The AF control 106 locates the lens 102 at an optimal position in accordance with a range between a desired subject and, the camera 10 via its focusing mechanism. Specifically, the system controller 12 calculates the above range, determines an amount of control based on the range, and sends a control signal 12a representative of the amount of control to the AF control 106. In response, the AF control 106 delivers a drive signal 106a to the focusing mechanism in order to drive it. The focusing mechanism therefore shifts the lens 102 to an optimal position.

The system controller 12 includes an exposure control section, not shown, for calculating the photometric value of a scene including a desired subject. The AE control 108 shifts its diaphragm mechanism under the control of the above exposure control section and thereby adjusts the amount of light to be incident to the image pickup 104. For photometry, the exposure control section uses part of the video signal 10a output from the image pickup 104. More specifically, the system controller 12 calculates an amount of exposure based on a photometric value and sends a control signal 12a to the AE control 108 . The control signal 12a controls the lens opening and shutter speed in such a manner as to set up the amount of exposure calculated. In response to the control signal 12a, the AE control 108 delivers a drive signal 108a to its diaphragm mechanism and shutter mechanism, effecting optimal exposure.

The image pickup 104 delivers the video signal 10a to the signal processing 10B. The camera 10 includes a strobe device, not shown, driven by the drive signal generating section 10C, as needed.

The signal processing section 10B includes a preprocessing 110, an analog-to-digital converter (ADC) 112, a processing 114, a buffer 116, and a compressor/decompressor 118. The preprocessing 110 executes a sequence of analog processing with the video signal 10a output from the image pickup 104. For example, the preprocessing 110 performs correlated double sampling (CDS) with the video signal 10a. In addition, the preprocessing 110 executes gamma correction with the video signal and delivers the resulting amplified signal 10b to the ADC 112.

The system controller 12 and a signal generation 120 respectively feed a control signal 12b and a timing signal 120b to the ADC 112. The ADC 112 samples and thereby quantizes the analog signal 10b output from the preprocessing 110 in accordance with the control signal 12b and timing signal 120b. As a result, the analog signal 10b is converted to a digital signal 10c. The digital signal 10c is input to the processing 114.

The processing 114 executes AE control, automatic white balance (AWB) adjustment, aperture correction and other conventional adjustment with the digital signal 10c. In the illustrative embodiment, the processing 114 further processes the adjusted digital signal 10c in a particular manner in each of two modes which may be set via a release shutter 128 included in the mode setting section 10E. The two modes may be a still picture shoot mode for writing a still picture picked up in a record/reproduction 126 included in the signal output section 10D and a photometry control mode for simply implementing AF of the image pickup section 10A. It is to be noted that gamma correction may be assigned to the processing 114 or even to the circuit following it.

More specifically, the processing 114 further processes the above processed signal in accordance with the control signal 12b fed form the system controller 12 on the basis of the mode selected. In the still picture shoot mode, the system controller 12 causes the processing 114 to execute preselected digital signal processing with the processed signal, e.g., to broaden the frequency band of a luminance signal. In the photometry control mode, considering the fact the signal 10c is a digital signal, the system controller 12 causes the processing 114 to read out the signal 10c at a higher rate than conventional while processing it.

Further, the system controller 12 causes the processing 114 to subsample image data in the vertical direction. This vertical subsampling (or thinning down) of image data is one of characteristic features of the present invention and allows the video signal 10a to be displayed on a display 124 included in the signal output section 10D. More specifically, the subsampled image data, labeled 10d, are delivered from the processing 114 to the display 124 via the buffer 116 so as to cope with an increase in the number of pixels. If desired, the processing 114 may produce luminance data Y and chrominance data C, i.e., (B–Y) and (R–Y) from the image data input thereto.

The buffer 116 amplifies the video signal 10d output from the processing 114 to a preselected amplitude. In addition, the buffer 116 serves to adjust time at the time of recording. The buffer 16 delivers an image 10e to the signal output section 10D or the compressor/decompressor 118 under the control of a record control circuit, not shown, included in the system controller 12.

Specifically, the image signal 10e representative of an image to be recorded is fed from the buffer 116 to the compressor/decompressor 118 under the control of the system controller 12. The compressor/decompressor 118 compresses the image signal 10e on the basis of the JPEG (Joint Photographic coding Experts Group) standard and writes the compressed image signal, labeled 10f, in the record/reproduction 126. In the event of reproduction, the compressor/decompressor 118 reads the compressed image signal 10f out of the record/reproduction 126 and expands the signal 10f for thereby reproducing the original image signal. The reproduced image signal appears on the display 124 as a picture.

In the drive signal generating section 10C, a system clock is generated to drive the digital still camera 10 by, e.g., the current broadcasting system, i.e., the NTSC (National Television System Committee) system or the PAL (Phase Alternation Line) system. The signal generation 120 generates synchronizing signals on the basis of the system clock and delivers them to the processing 114 as the previously mentioned timing signals 120b. The timing signals 120b are also delivered to the preprocessing 110, ADC 112, buffer 116 and compressor/decompressor 118 as sampling signals and a write/read clock.

More specifically, the signal generation 120 includes an oscillator for generating the system clock and a timing generating circuit for generating various timing signals based on the system clock, although not shown specifically. The timing signals, labeled 120a, include timing signals for reading signal charges out of the image pickup 104, e.g., vertical timing signals as signed to the vertical transfer paths, a horizontal timing signal as signed to the horizontal transfer path, and timing signals for effecting the field shift and line shift. The timing signals 120a are also fed to the AF control 106 and AE control 108 via signal lines, not shown in FIG. 1 specifically, for controlling their operations.

The vertical timing signals and horizontal timing signal output from the signal generation 120 together with the other synchronizing signals are applied to a driver 122 also included in the drive signal generating section 10C. Assume that the control signal 12b fed from the system controller 12 to the signal generation 120 is representative of the photometry control mode. Then, the signal generation 120 additionally feeds to the driver 122 a signal for raising the substrate voltage, i.e., overflow drain voltage for the R and B photosensitive cells, as needed. With this signal, it is possible to set up the same condition in the R and B photosensitive cells as when no signal charges are generated therein. Further, in the photometry control mode, the signal generation 120 generates transfer gate pulses for reading signal charges only out of the G photosensitive cells. When the photometry control mode is selected, the signal generation 120 selectively delivers such timing signals to the driver 122 in accordance with the control signal 12b output from the system controller 12.

Generally, to switch the signal reading rate, the driver 122 delivers particular vertical drive signals to the image pickup 104 in each mode. The vertical drive signals drive the image pickup 104 with respect to, e.g., the entire frame, only designated color or only designated color and designated region. Particularly, when the photometry control mode or a display mode is selected, the driver 122 feeds corresponding drive signals 122a to the image pickup 104 in order to switch the signal reading rate in the above fashion. The illustrative embodiment may include a level switch, not shown, for switching the drive signal level in accordance with the mode selected, if desired. The driver 122 may output three levels, namely H, M, and L levels of vertical drive signals $\phi V^n$ (see FIG. 3) by using the vertical timing signals and transfer gate pulses, as will be described specifically later.

In the signal output section 10D, the display 124 is implemented as a digital RGB input, VGA (Video Graphics Array) LCD (Liquid Crystal Display) monitor, a YC data display monitor or similar conventional monitor. Specifically, the image data 10e output from the buffer 116 or the image data read out of the record/reproduction 126 and expanded by the compressor/decompressor 118 is selectively fed to the display 124. For example, a scene being picked up by the camera 10 may be displayed on the display 124. Particularly, in the illustrative embodiment, a scene being picked up appears on the display 124 in the form of a subsampled picture, as will be described specifically later.

The record/reproduction 126 records the video signal fed thereto in a semiconductor memory applicable to, e.g., a memory card, an optical recording medium, or a Magnetooptical recording medium. In addition, the record/reproduction 126 is capable of reading a video signal recorded therein, so that the video signal can be displayed on the display 124. If the above recording medium is removable from the record/reproduction 126, it may be removed to reproduce a video signal recorded by another apparatus or to cause a printer to print an image stored therein.

In the illustrative embodiment, the release shutter 128 included in the mode setting section 10E has a first stroke or half-pressed position and a second stroke or full-pressed position. In the half-pressed position, the release shutter 128 sends a mode signal 128a indicative of the photometry control mode to the system controller 12. In the full-pressed position, the release shutter 128 sends another mode signal 128a different from the above mode signal 128a (e.g. different bit information). This mode signal 128a provides the system controller 12 with an image pickup timing while informing it of the selection of the still picture shoot mode. On the other hand, when the release shutter 128 is in a power-up state and when a switch, not shown, as signed to the display 124 is in an ON state, the system controller 12 causes the display 124 to display a scene in a movie mode.

Key switches 130 are also included in the mode setting section 10E, and each are as signed to a particular cursor key. The key switches 130 allow the operator to select, e.g., a desired item or a desired picture on the display 124. Information 130a selected on the key switches 130 is also input to the system controller 12.

The system controller 12 supervising the entire camera 10 includes a CPU (Central Processing Unit) not shown. The CPU determines a mode selected by referencing the signal 128a output from the release shutter 128. Also, the CPU controls, based on the information 130a received from the key switches 130, t he processing of the image signal to be executed in the camera 10. More specifically, the CPU controls the operation of the drive signal generating section 10C in accordance with the input signals 128a and 130a. The record control circuit included in the system controller 12, as mentioned earlier, controls the operations of the buffer 116 and record/reproduction 1 26 in accordance with the timing control signals 12b and 12c generated within the system controller 12.

Reference will be made to FIG. 2 for describing the e drive signals fed to the image pickup 104 and the connection of signal lines for feeding them. It is to be noted that the connection of signal lines is represented by destinations in FIG. 2. As shown, the image pickup 104 has photosensitive cells 104a implemented by photodiodes and arranged in rows and columns at preselected intervals. The color filter CF has filter segments each being positioned on the photosensitive surface of a particular photosensitive cell 104a. In the illustrative embodiment, the color segments are arranged in the Bayer arrangement, as mentioned earlier; a row of G and B filer segments alternating each other is followed by a row of R and G filter segments alternating with each other, as illustrated. Of course, the Bayer arrangement may be replaced with any other suitable arrangement.

Each vertical transfer path 104c for transferring signal charges vertically adjoins a particular column of photosensitive cells 104a, so that the number of vertical transfer paths 104C is equal to the number of columns of photosensitive cells 104a, as stated previously. Two CCDs for vertical transfer are formed between the photosensitive cells adjoining each other on each vertical transfer path 104c. The transfer gates 104b each are formed between one photosensitive cell 104a and the adjoining vertical transfer path 104c, transferring a signal charge from the former to the latter. Vertical transfer electrodes are formed on each vertical transfer path 104c for transferring the above signal charge vertically, i.e., in the column direction. More specifically, each of two CCDs assigned to a single photosensitive cell 104a, which forms a single pixel, is provided with a single vertical transfer electrode. The vertical drive signals $\phi V_n$ are applied to the vertical transfer electrodes for causing the signal charges to be vertically transferred along the vertical transfer paths 104c.

Correspondence between the photosensitive cells 104a and the vertical transfer electrodes is as follows:

devices 104a on "N+1" row—electrodes E1b and E2
devices 104a on "N+2" row—electrodes E3a and E4
devices 104a on "N+3" row—electrodes E5 and E6
devices 104a on "N+4" row—electrodes E7 and E8
devices 104a on "N+5" row—electrodes E1b and E2
devices 104a on "N+6" row—electrodes E3b and E4
devices 104a on "N+7" row—electrodes E5 and E6
devices 104a on "N+8" row—electrodes E7 and EB
devices 104a on "N+9" row—electrodes E1a and E2
devices 104a on "N+10" row—electrodes E3b and E4
devices 104a on "N+11" row—electrodes E5 and E6
devices 104a on "N+12" row—electrodes E7 and E8
devices 104a on "N+13" row—electrodes E1b and E2
devices 104a on "N+14" row—electrodes E3b and E4
devices 104a on "N+15" row—electrodes E5 and E6
devices 104a on "N+16" row—electrodes E7 and E8 where N is a positive integer.

In this manner, a group of eight vertical transfer electrodes E1b through E8 are cyclically formed on the vertical transfer paths 104c for the photosensitive cells 104a on the "N+1" row through the "N+16" row. In FIG. 2, the vertical transfer electrodes designated by the same reference numerals are connected to the same signal line to which a particular vertical drive signal is applied.

Signal lines extend from the driver 122 in such a manner as to deliver the vertical drive signals $\phi V^n$ and horizontal drive signal $\phi H^n$ to the above electrode arrangement. Specifically, the vertical drive signals $\phi V^{1b}$, $\phi V_2$, $\phi V_{3a}$, $V_4$, $\phi V_5$, $\phi V_6$, $\phi V_7$, $\phi V_8$, $\phi V_{3b}$ and $\phi V_{1a}$ are applied to the vertical transfer electrodes E1b, E2, E3a, E4, E5, E6, E7, E8, E3b and E1a, respectively.

More specifically, a transfer gate pulse $TG_{1b}$ is applied to the transfer gates 104b adjoining the photosensitive cells 104a on the "N+1", "N+5" and "N+13" rows at the same time. The vertical drive signal $\phi V_{1b}$ is applied to the portions of the vertical transfer paths 104c adjoining the photosensitive cells 104a on the above particular rows, i.e., the vertical transfer electrodes E1b. The relation between the line numbers assigned to the photosensitive cells 104a to which the same transfer gate pulse $TG_{1b}$ is applied is represented by a recurrence formula in which numbers $L_n$, $L_{n+1}$ and so forth are as signed to the above consecutive lines. That is, the relation is represented by the sum of geometric series $4 \cdot 2^{n-2}$ using the line number $L_n$, the first term a of 4 and the common ratio of 2:

$$L_{n+1} = L_n + 4 \cdot 2^{n-2}$$

where the suffix n is an integer, and the first term $L_0$ is assumed to be zero. It will therefore be seen that the same transfer gate pulse $TG_{1b}$ is applied to, among the sixteen lines, the lines numbered 1, 5 and 13.

The vertical transfer electrodes E2 on the vertical transfer paths 104c intervening between the "N+1" row and the "N+2" row are connected together with the vertical transfer electrodes of every 2+8n vertical transfer devices. The vertical drive signal $\phi V_2$ is applied to all of the vertical transfer electrodes E2. Stated another way, the electrodes E2 are formed beneath the vertical transfer devices at the intervals of three pixel lines. Likewise, the vertical transfer electrodes E4, E6 and E8 on the vertical transfer paths 104cbetween the pixel lines each are connected together at the intervals of eight vertical transfer devices. Specifically, every 4+8n vertical transfer devices E4, every 6+8n vertical transfer devices E6 and every 8+8n vertical transfer devices E8 each are connected together. The vertical drive signals $\phi V_4$, $\phi V_6$ and $\phi V_8$ are applied to the vertical transfer electrodes E4, E6 and E8, respectively.

The transfer gates 104b adjoining the photosensitive cells 104a on the "N+2" row are connected together with the other transfer gates 104b every 3+32n vertical transfer electrodes on the vertical transfer paths 104c, i.e., at the intervals of thirty-two vertical transfer electrodes. The vertical drive signal $\phi V_{3a}$ is applied to this group of vertical transfer electrodes.

A transfer gate pulse $TG_5$ is fed to the transfer gates 104b adjoining the photosensitive cells 104a on the "N+3", "N+7", "N+11" and "N+15" rows at the same time. The vertical transfer electrodes E5 adjoining these transfer gates 104b are connected to a common line every 5+8n electrodes or every $L_n$=3+4n rows where $L_n$ denotes a line number. The vertical drive signal $\phi V_5$ is applied to the vertical transfer electrodes E5.

Likewise, a transfer gate pulse $TG_7$ is applied to the transfer gates 104b adjoining the photosensitive cells 104aon the "N+4", "N+8", "N+12" and "N+16" rows. The vertical transfer electrodes E7 adjoining these transfer gates 104bare connected to a common line every 7+8n electrodes or $L_n$=4+4n rows. The vertical drive signal $\phi V_7$ is applied to the vertical transfer electrodes E7.

A transfer gate pulse $TG_{3b}$ is applied to the transfer gates 104b adjoining the photosensitive cells 104a on the "N+6", "N+10" and "N+14" rows at the same time. As for the timing, the transfer gate pulse $TG_{3b}$ is coincident with the previously mentioned transfer gate pulse $TG_{3a}$. The difference is that the vertical transfer electrodes $E_{3b}$ are connected together every 11+8n electrodes or Ln=6+4n lines. Consequently, despite that the transfer gate pulse $TG_{3b}$ is fed at the same timing as the transfer gate pulse $TG_{3a}$, it is fed to the above particular rows at a different timing from the "N+2" row. The vertical drive signal $\phi V_{3b}$ is applied to such vertical transfer paths 104c at the same time.

A transfer gate pulse $TG_{1a}$ is applied to the transfer gates 104b adjoining the photosensitive cells 104a on the "N+9" row. The transfer gate pulse $TG_{1a}$ is applied at the same timing as the transfer gate pulse $TG_{1b}$. With this connection, it is possible to deliver only the signal charges stored in the above photosensitive cells 104a, as needed.

The horizontal transfer path 104d is arranged at the bottoms or output ends of the vertical transfer paths 104c for transferring the signal charges output from the paths 104c in the horizontal direction. The horizontal drive signals $\phi H_n$ output from the driver 122 cause the horizontal transfer path 104d to transfer the signal charges horizontally.

The amplifier 104e amplifies the signal charges output from the horizontal transfer path 104d. The image pickup 104 transforms the resulting amplified signal, which is a current, to a voltage and delivers the voltage as a video signal representative of the image of a subject, although not shown specifically.

Reference will be made to FIG. 3 for describing the signals to be output from the drive signal generating section 10C. There are shown in FIG. 3 the transfer gate pulse $TG_n$ and vertical drive timing signal $V_n$ output from the signal generation 120 and the vertical drive signal $\phi V_n$ output from the driver 122. As shown, the transfer gate pulse $TG_n$ and vertical drive timing signal $V_n$ have two levels each, i.e., a high level (H) and a low level (L). On the other hand, the vertical drive signal $\phi V_n$ selectively takes three different levels, i.e., a H level, a medium level (M) and a L level in accordance with the signal level input to the driver 122.

More specifically, when the vertical drive timing signal $V_n$ falls from the H level to the L level at a time t1, the vertical drive signal $\phi V_n$ rises from the L level to the M level. While the vertical drive timing signal $V_n$ is in the L level, the transfer gate pulse $TG_n$ falls from the H level to the L level at a time t2. The vertical drive signal $\phi V_n$ then further rises to the H level. When the transfer gate pulse $TG_n$ rises from the L level to the H level at a time t3, the vertical drive signal $\phi V_n$ again falls to the M level. Finally, when the vertical drive timing signal $V_n$ again rises to the H level, the vertical drive signal $\phi V_n$ falls to the L level.

The above vertical drive signals $\phi V_n$ are applied to the vertical transfer electrodes formed on the vertical transfer paths 104c. When the vertical drive signal $\phi V_n$ is in the H level, the transfer gates 104b are turned on. As a result, signal charges accumulated in the photosensitive cells 104a each are transferred to the adjoining vertical transfer path 104c. When the vertical drive signal $\phi V_n$ is in the M level, the vertical transfer path 104c transfers the signal charge in accordance with the depth of the potential well formed therein. In this manner, the transfer gate pulses $TG_n$ and vertical drive timing signals $V_n$ cause signals charges to be transferred from the photosensitive cells 104a to the vertical transfer paths 104c and then transferred along the vertical transfer paths 104c.

Eight different specific procedures are available with the illustrative embodiment for reading the video signal out of the image pickup 104 shown in FIG. 2, as will be described hereinafter.

Figure 5:
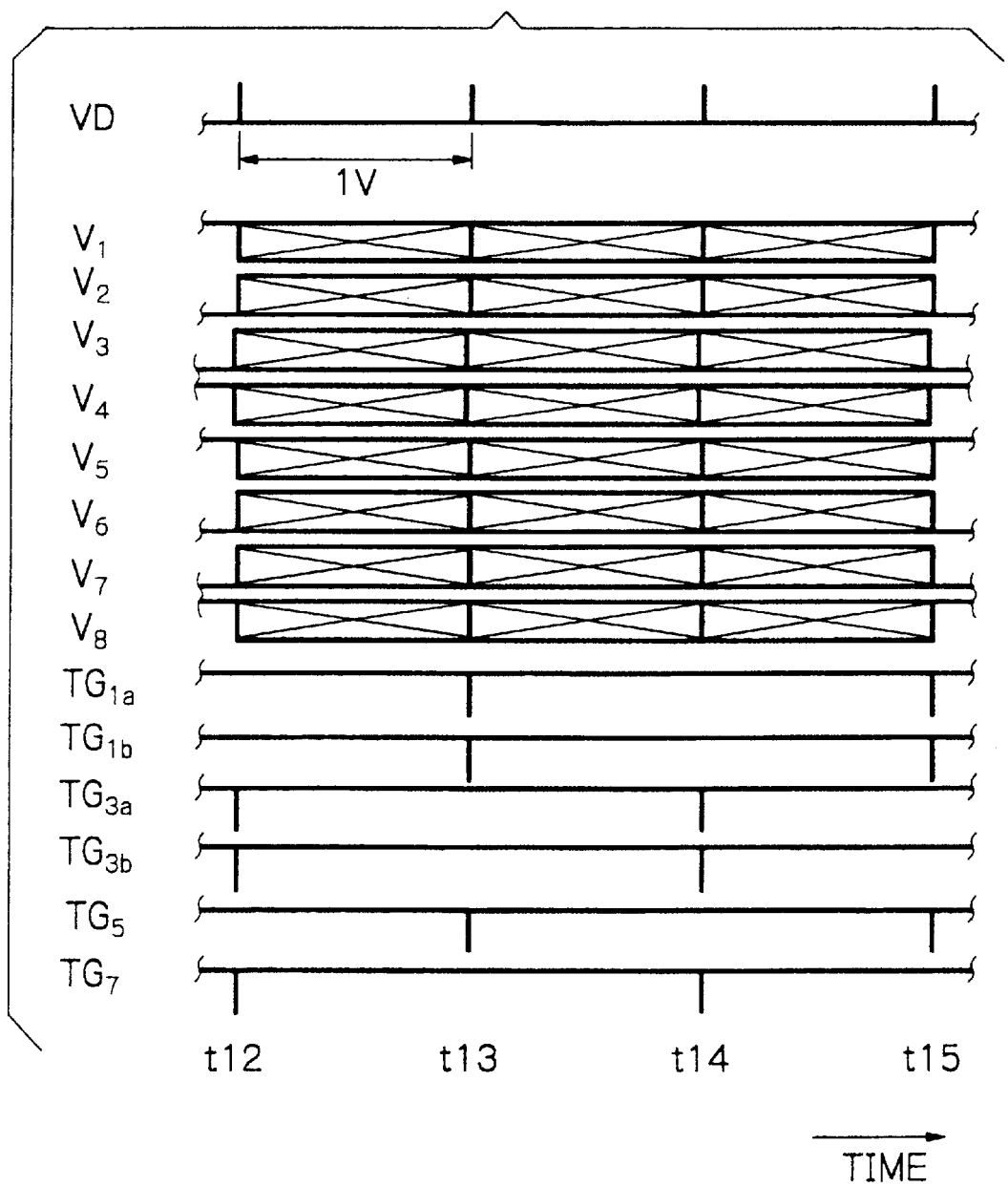
FIG. 5 is a timing chart showing a relation between a vertical synchronizing signal and the vertical drive timing signals and transfer gate pulses for implementing the relation shown in FIG. 4.

As shown in FIG. 4, in a first procedure, signal charges are read out of the photosensitive cells 104a on the odd rows and the photosensitive cells 104a on the even rows in a first field and a second field, respectively. Stated another way, the image pickup 104 is scanned by interlacing every other pixel line. A relation between the vertical transfer electrodes and the vertical drive signals $\phi V_n$ to be applied thereto for effecting this procedure is also shown in FIG. 4. FIG. 5 shows a relation between a vertical synchronizing signal VD, the vertical drive timing signals $\phi V_n$ and the transfer gate pulses $TG_n$ for implementing the relation of FIG. 4. As shown, transfer gate pulses $TG_{1a}$, $TG_{1b}$ and $TG_5$ are applied to the transfer gates 104b on, e.g., the odd rows to thereby turn them on. In this case, transfer gate pulses $TG_{3a}$, $TG_{3b}$ and $TG_7$ are applied to the transfer gates 104b on the even rows to thereby turn them on. It should be noted that the application timing is shifted by one field (see, e.g., times t12 and t14).

Figure 6:
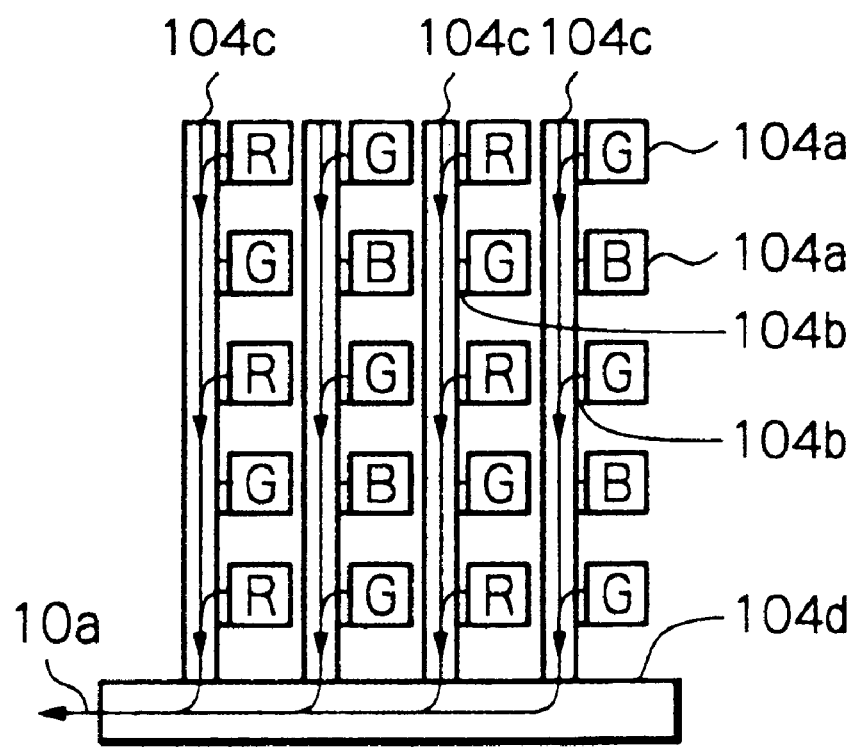
FIG. 6 is a diagram showing part of the arrangement of FIG. 2 and demonstrating signal read-out effected in a first field.
Figure 7:
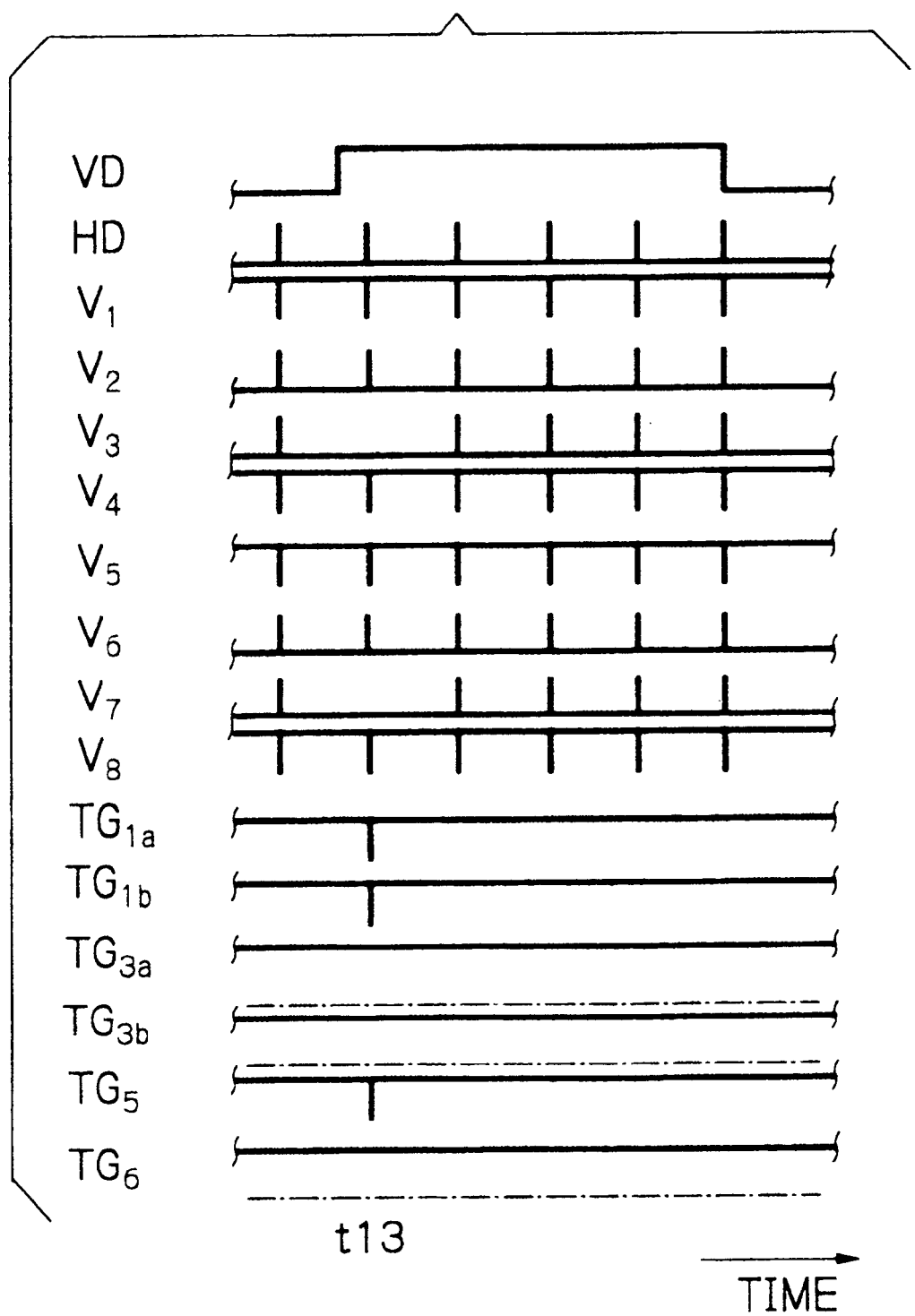
FIG. 7 is a timing chart showing, in an enlarged scale, a relation between the vertical synchronizing signal and the vertical drive timing signals and transfer gate pulses in the first field for implementing the relation of FIG. 4.
Figure 8:
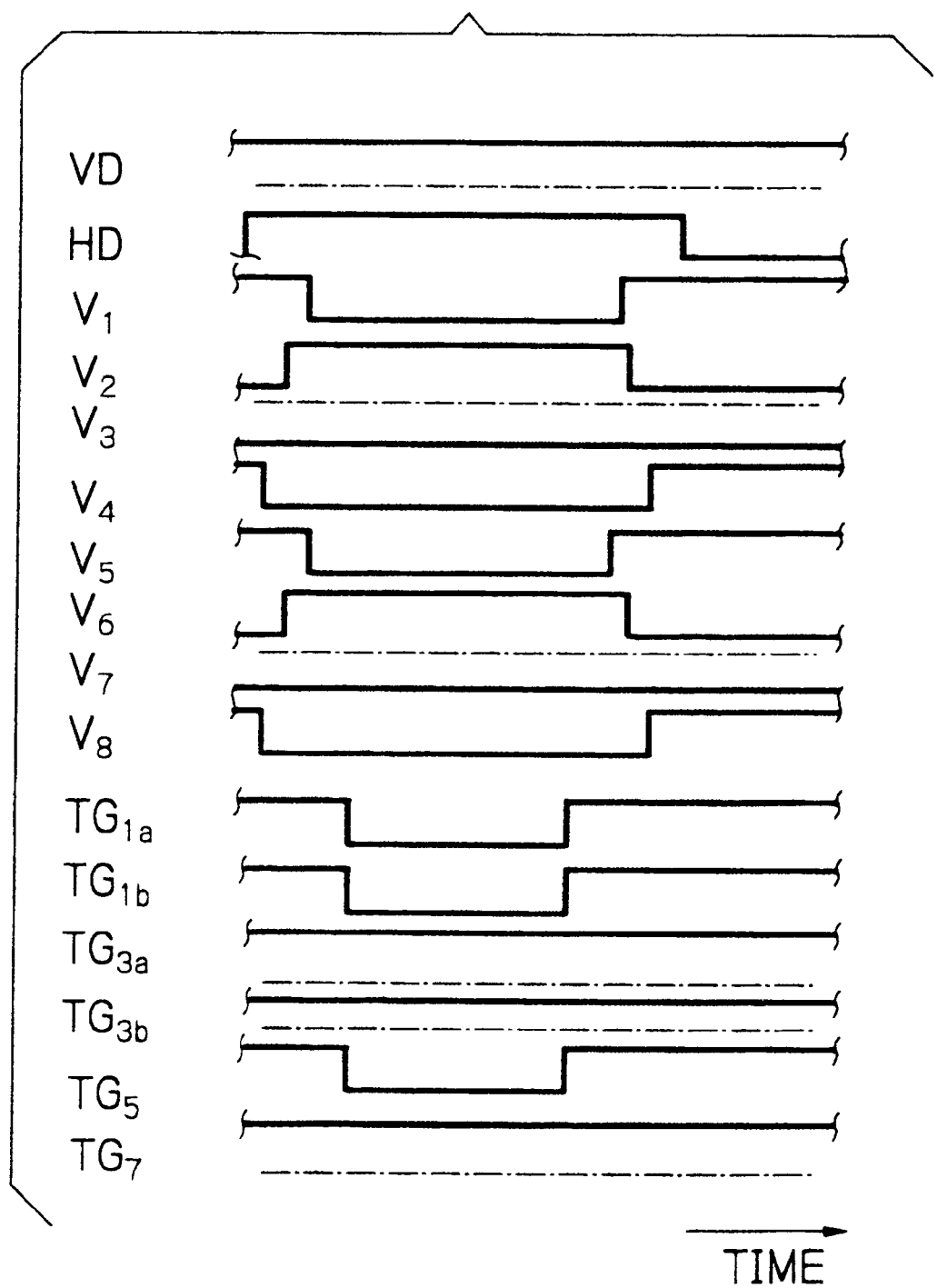
FIG. 8 is a timing chart showing, in an enlarged scale, a relation between a horizontal synchronizing signal and the vertical drive-timing signals and transfer gate pulses for implementing the relation of FIG. 4.

The first procedure will be described more specifically with reference to FIG. 6. FIG. 6 shows part of the image pickup 104 and demonstrates how only signal charges accumulated in the photosensitive cells 104a on the odd rows are read out in the first field. In this case, as shown in FIG. 7, a horizontal synchronizing signal HD, the vertical drive timing signals $V_n$ and transfer gate pulses $TG_n$ each are shorter in duration than the vertical synchronizing signal VD. FIG. 8 shows part of the timing chart of FIG. 7 around a time t13 in an enlarged scale. As shown, vertical drive timing signals $V_1$ through $V_8$ transfer gate pulses $TG_{1a}$, $TG_{1b}$, $TG_{3a}$, $TG_3b$, $TG_5$ and $TG_7$ are applied to the driver 122, FIG. 1.

More specifically, in the first field, the transfer gate pulses $TG_{1a}$, $TG_{1b}$ and $TG_5$ are respectively fed to the vertical transfer electrodes E1a, E1b and E5 in synchronism with the vertical synchronizing signal VD that rises at the time t13. The vertical drive signals based on the vertical drive timing signals $V_n$ and transfer gate pulses $TG_{1a}$, $TG_{1b}$ and $TG_5$, as stated earlier, are respectively applied to the vertical transfer electrodes $E_{1a}$, E1b and E5 in the H level, forming potential wells in the vertical transfer paths 104c. As a result, signal charges stored therein are transferred.

The eight-phase vertical drive signals $\phi V_n$ are fed to the vertical transfer electrodes of the vertical transfer paths 104c so as to transfer the signal charges toward the horizontal transfer path 104d along the vertical transfer paths 104c. Subsequently, the signal charges are transferred along the horizontal transfer path 104d and then output as a video signal constituting the first field.

Figure 9:
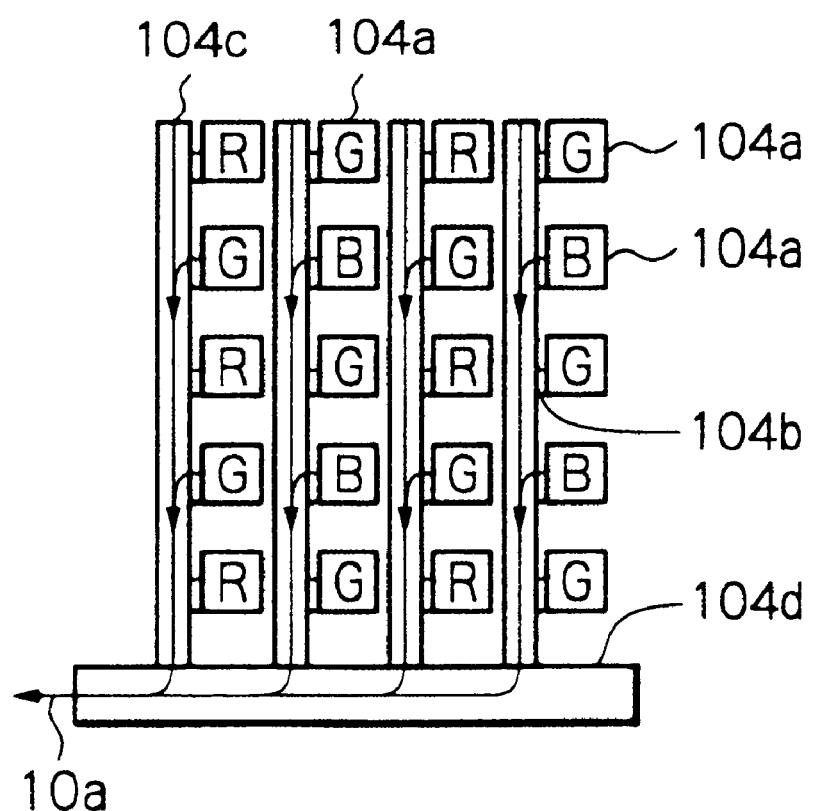
FIG. 9 is a diagram showing part of the arrangement of FIG. 2 and demonstrating signal read-out effected in a second field.
Figure 10:
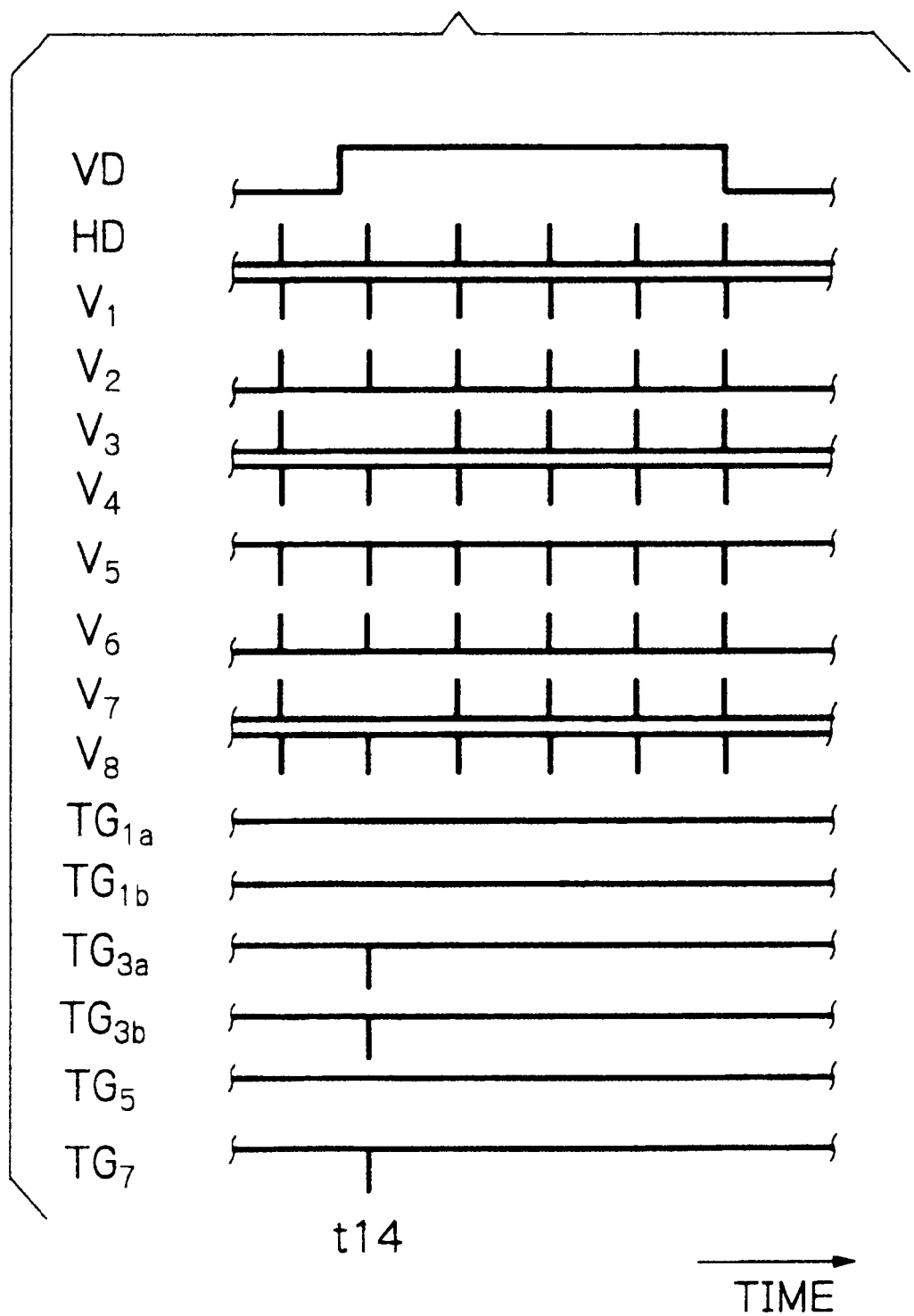
FIG. 10 is a timing chart showing, in an enlarged scale, a relation between the vertical synchronizing signal and the vertical drive timing signals and transfer gate pulses in the second field for implementing the relation of FIG. 4.
Figure 11:
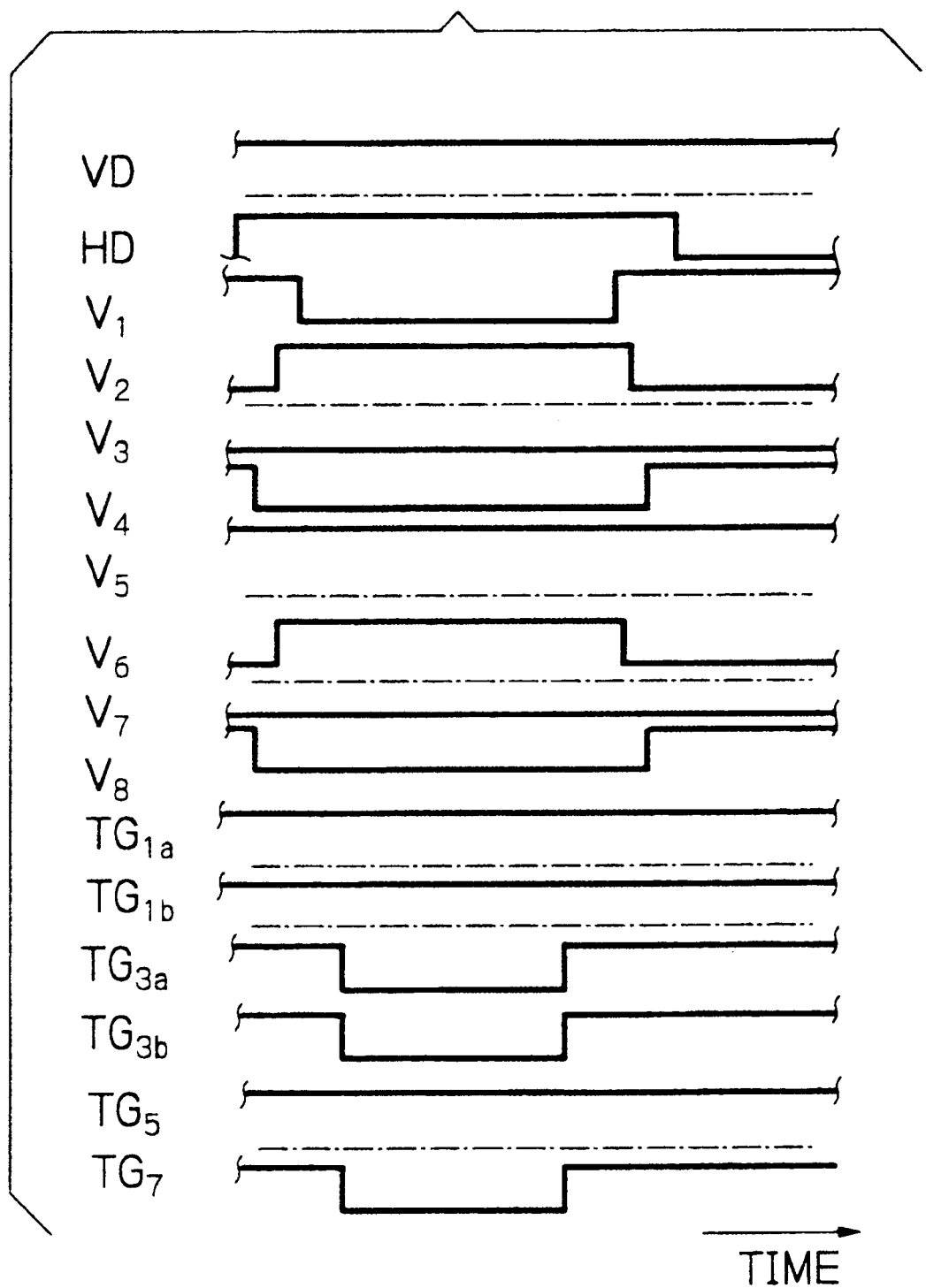
FIG. 11 is a timing chart showing, in an enlarged scale, a relation between the horizontal synchronizing signal and the vertical drive timing signals and transfer gate pulses for implementing the relation of FIG. 4.

FIGS. 9 through 11 demonstrate the other drive relating to the second field. As shown in FIG. 9, signal charges are read out of the photosensitive cells 104a shifted from the photosensitive cells 104a shown in FIG. 6 by one line. The signal read-out lines shown in FIG. 9 correspond to the photosensitive cells 104a on the odd rows. FIG. 10 demonstrates the drive specifically while FIG. 11 shows part of FIG. 10 around a time t1 in an enlarged scale. As shown, in the second field, the transfer gate pulses $TG_{3a}$, $TG_{3b}$ and $TG_7$ are respectively fed to the vertical transfer electrodes E3a, E3b and E7 in synchronism with the vertical synchronizing signal VD that rises at the time t14. As a result, at the time t14, signal charges stored in the photosensitive cells 104c on the even rows are transferred to the vertical transfer paths 104c. The vertical drive signals $\phi V^n$ are applied to the vertical transfer electrodes formed on the vertical transfer paths 104c, causing the signal charges transferred to the vertical transfer paths 104c to be further transferred in the vertical direction. Subsequently, the signal charges are transferred along the horizontal transfer path 104d and then output as a video signal constituting the second field.

As stated above, the transfer gate pulses are alternately applied to the vertical transfer electrodes E1a, E1b and E5 and vertical transfer electrodes E3a, E3b and E7 field by field, causing signal charges to be read out by interlacing. As for each of the first and second fields, the above interlacing is identical with reading a video signal output from the image pickup 104 by halving the number of lines vertically. The first procedure described above is therefore conventional.

Referring to FIGS. 12 through 19, a second procedure for reading a video signal out of the image pickup 104 will be described. FIG. 12 shows a relation between the vertical transfer electrodes and the vertical drive signals $\phi V_n$ applied thereto. As FIG. 12 indicates, the second procedure is such that signal charges are read out of the photosensitive cells 104a on the "m+1" and "m+2" rows and the photosensitive cells 104a of the "m+3" and "m+4" rows in the first field and second field, respectively. That is signal charges are read out of two consecutive lines in each field.

Figure 13:
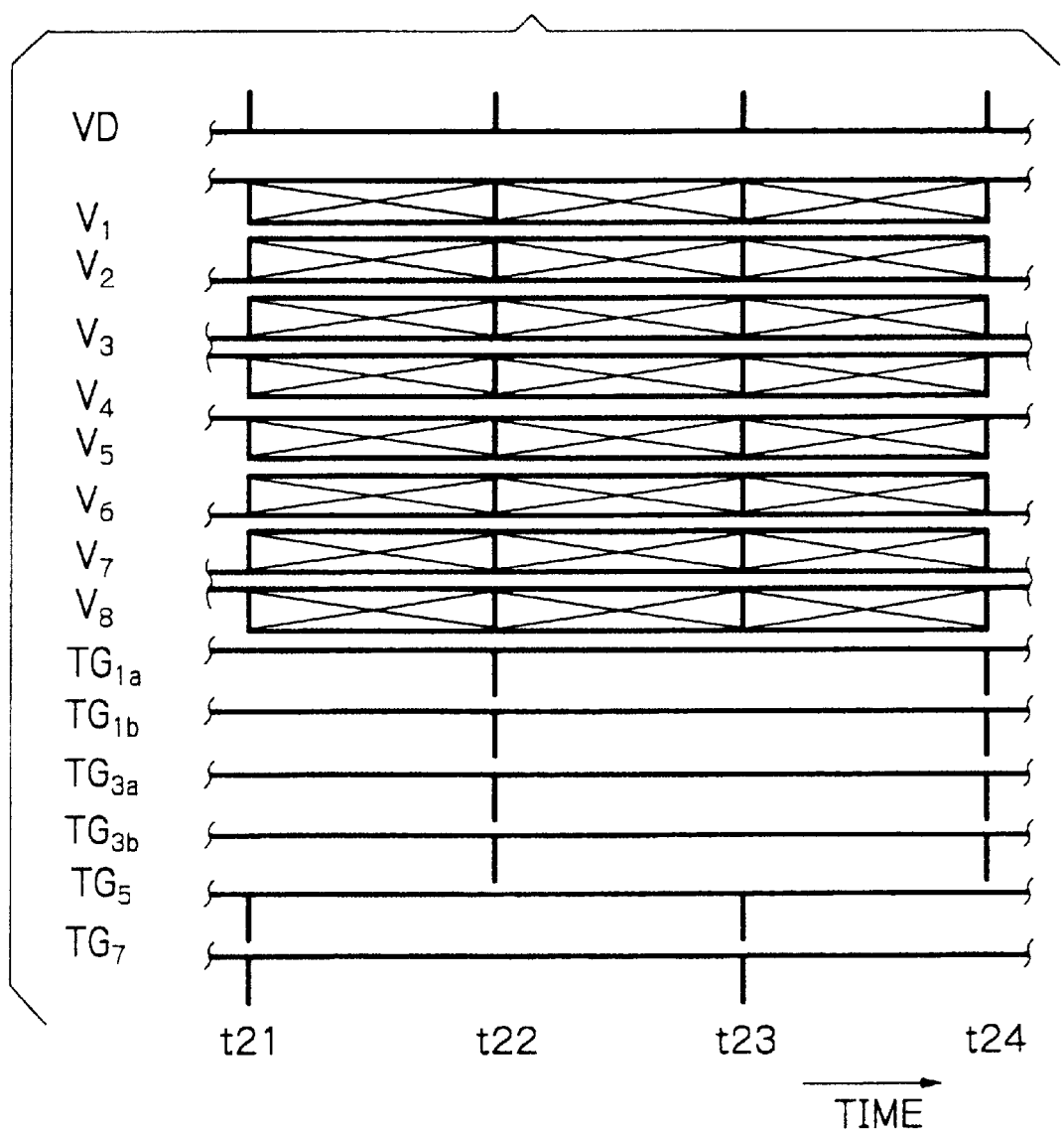
FIG. 13 is timing chart showing a relation between the vertical synchronizing signal and the vertical drive timing signals and transfer gate pulses for implementing the relation shown in FIG. 12.

FIG. 13 is a timing chart representative of the above relation in terms of the vertical synchronizing signal VD, vertical drive timing signals $V_n$, and transfer gate pulses TG$_n$. It will be seen that to read two lines out of the photosensitive cells 104a in each field by interlacing, a group of transfer gate pulses TG$_{1a}$, TG$_{1b}$, TG$_{3a}$ and TG$_{3b}$ and a group of transfer gate pulses TG$_5$ and TG$_7$ each are fed at a particular timing.

Figure 14:
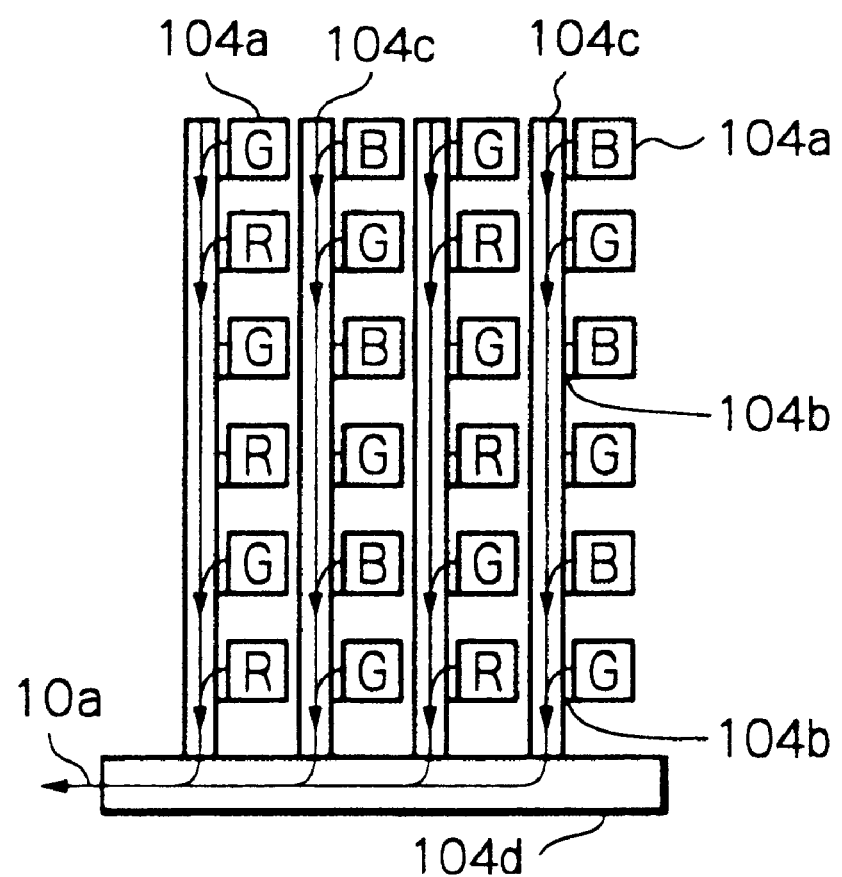
FIG. 14 is a diagram showing part of the arrangement of FIG. 2 and demonstrating signal read-out effected in a first field of FIG. 12.
Figure 15:
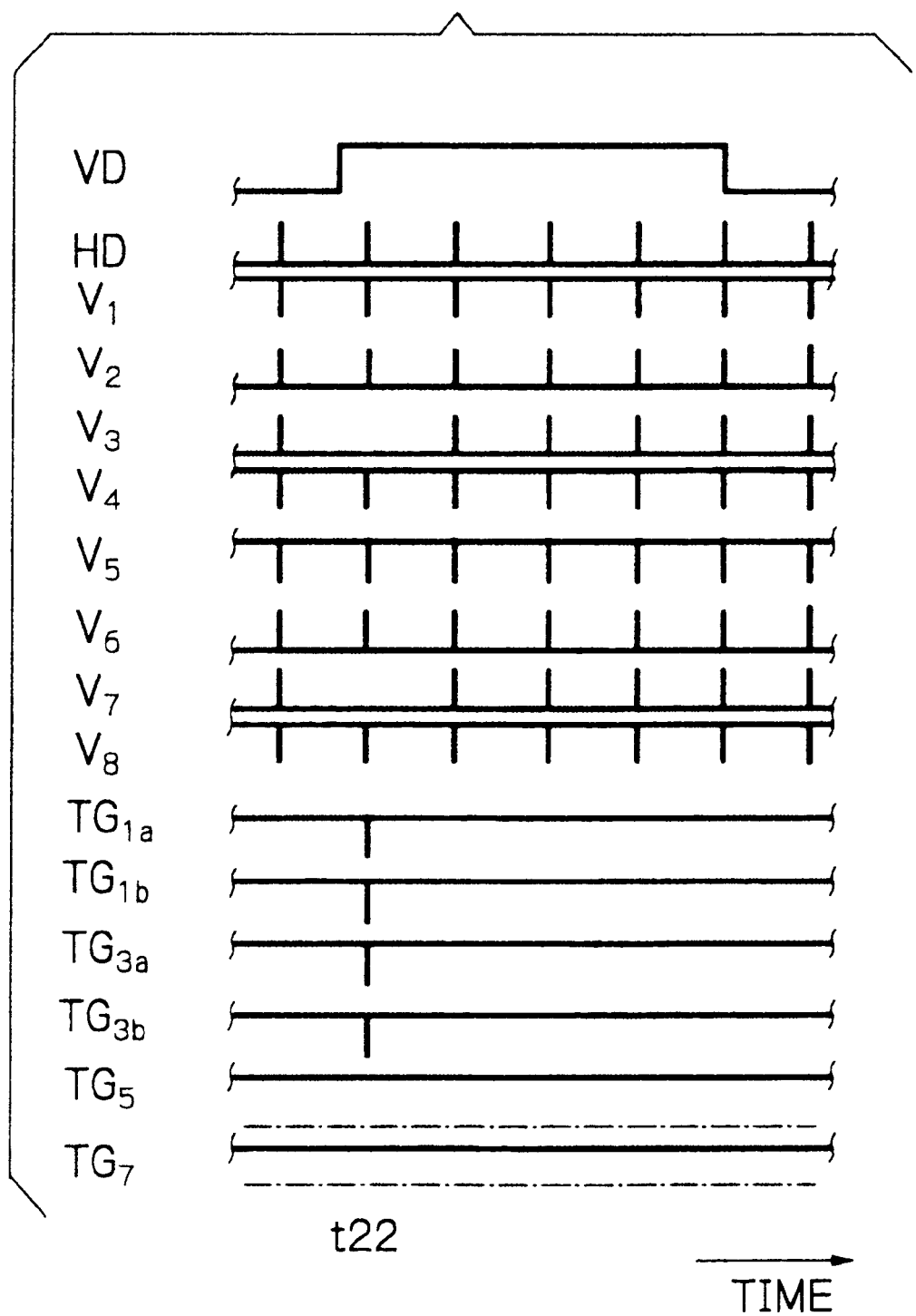
FIG. 15 is a timing chart showing, in an enlarged scale, a relation between the vertical synchronizing signal and the vertical drive timing signals and transfer gate pulses in the first field for implementing the relation of FIG. 12.

FIG. 14 shows part of the image pickup 104 for demonstrating the relation between the lines read out in the first field.

Figure 16:
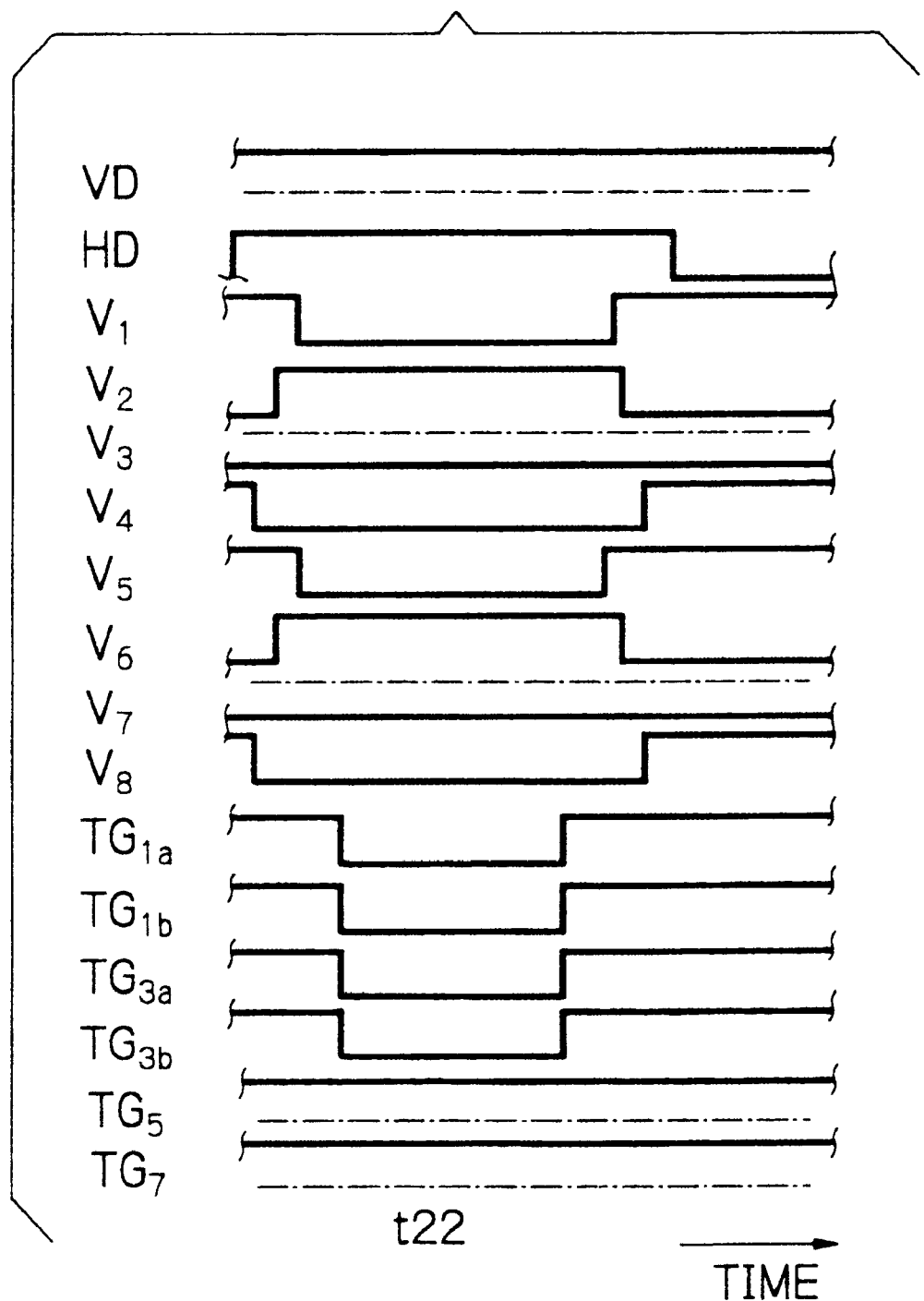
FIG. 16 is a timing chart showing, in an enlarged scale, a relation between the horizontal synchronizing signal and the vertical drive timing signals and transfer gate pulses for implementing the relation of FIG. 12.

As shown in FIG. 13, assume that signal charges are read out of the "m+1" and "m+2" rows of the image pickup 104 in the first field. Then, at a time t22, the transfer gate pulses TG$_{1a}$, TG$_{1b}$, TG$_{3a}$ and TG$_{3b}$ are respectively fed to the vertical transfer electrodes E1a, E1b, E3a and E3b via the driver 122 in synchronism with the vertical synchronizing signal VD (see also FIG. 15). FIG. 16 shows part of FIG. 15 around the time t22 in an enlarged scale. As shown, the vertical drive signals $\phi V_{1a}$, $\phi V_{1b}$, $\phi V_{3a}$ and $\phi V_{3b}$ are respectively fed to the vertical transfer electrodes E1a, E1b, E3a and E3b in the high level.

When the above vertical drive signals $\phi V_{1a}$, $\phi V_{1b}$, $\phi V_{3a}$ and $\phi V_{3b}$ are respectively applied to the vertical transfer electrodes E1a, E1b, E3a and E3b at the time t22, signal charges stored in the "m+1" and "m+2" rows, FIG. 12, are transferred to the vertical transfer paths 104c. The eight-phase vertical drive signals applied to the vertical transfer paths 104c cause the signal charges to be further transferred to the horizontal transfer path 104d via the vertical transfer paths 104c. Subsequently, the signal charges are transferred along the horizontal transfer path 104d in accordance with the horizontal drive pulses $\phi H_n$ and then output as a video signal constituting the first field.

Figure 17:
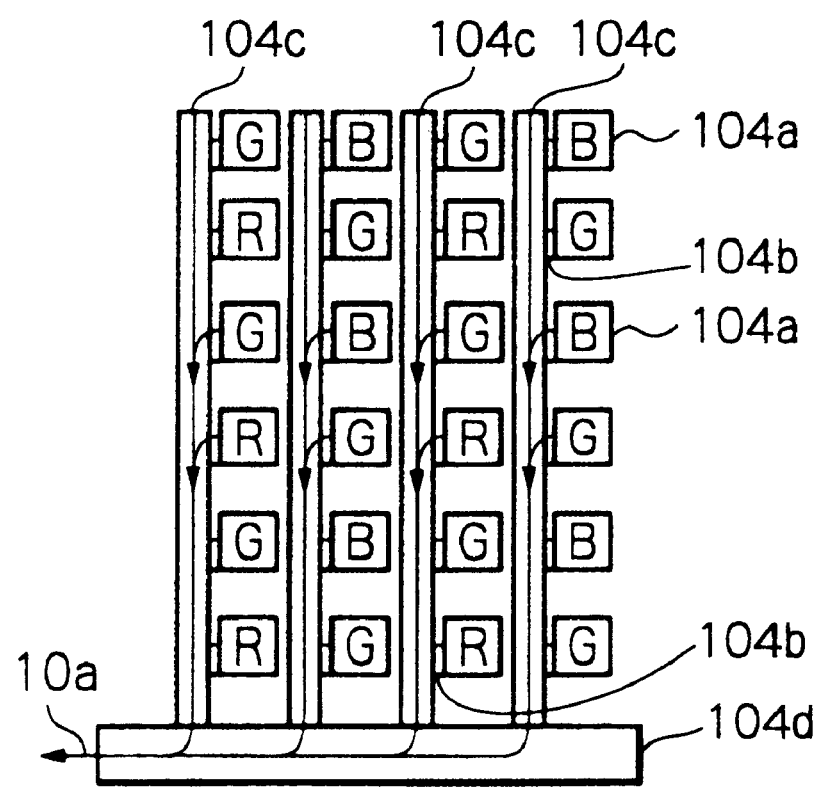
FIG. 17 is a diagram showing part of the arrangement of FIG. 2 and demonstrating signal read-out effected in a second field of FIG. 12.

FIG. 17 shows how signal charges are read out of the image pickup 104 in the second field. As shown, in the second field, signal charges are simultaneously read out of two consecutive lines other than the two lines shown in FIG. 14. For example, as shown in FIG. 18, the vertical timing signals V$_n$ and transfer gate pulses TG$_n$ are fed to the driver 122 in order to read signal charges out of the photosensitive cells 104a on the "m+3" and "m+4" rows, FIG. 12.

Figure 18:
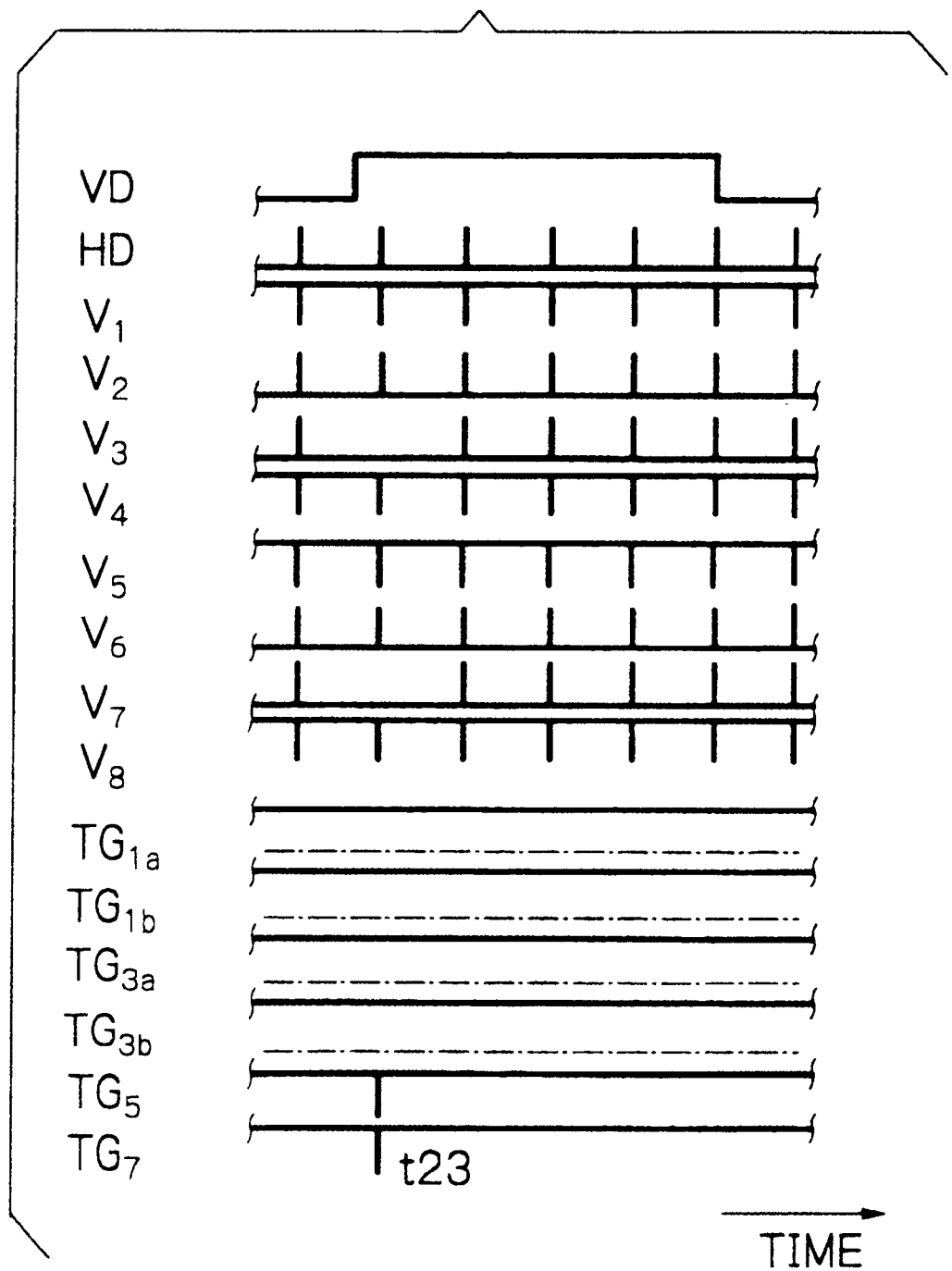
FIG. 18 is a timing chart showing, in an enlarged scale, a relation between the vertical synchronizing signal and the vertical drive timing signals and transfer gate pulses in the second field for implementing the relation of FIG. 12.

FIG. 19 shows part of FIG. 18 around a time t23 in an enlarged scale. As shown, at the time t23, the vertical drive signals $\phi V_5$ and $\phi V_7$ including the transfer gate pulses TG$_5$ and TG$_7$ are respectively applied to the vertical transfer electrodes E5 and E7, FIG. 12, in synchronism with the vertical synchronizing signal VD. As a result, signal charges stored in the photosensitive cells 104a on the "m+3" and "m+4" rows are transferred to the vertical transfer paths 104c. Subsequently, the signal charges are transferred to the horizontal transfer path 104d by the vertical drive signals $\phi V_n$. The signal charges are then transferred along the horizontal transfer path 104d by the horizontal drive pulses $\phi H_n$ and output as a video signal constituting the second field.

In this case, the transfer gate pulses are alternately applied to the vertical transfer electrodes E1a, E1b, E3a and E3b and vertical transfer electrodes E5 and E7 field by field, causing signal charges to be read out of two consecutive lines at a time by interlacing. As for the amount of field-by-field information, the number of pixels is halved in the vertical direction, compared to a single frame. In this sense, the field information or image signal is subsampled to one-half. The second procedure reading out signals out of spatially adjoining lines, as stated above, can complete the set of three primary colors R, G and B and can therefore enhance the spatial correlation of an image more than the first procedure.

Figure 21:
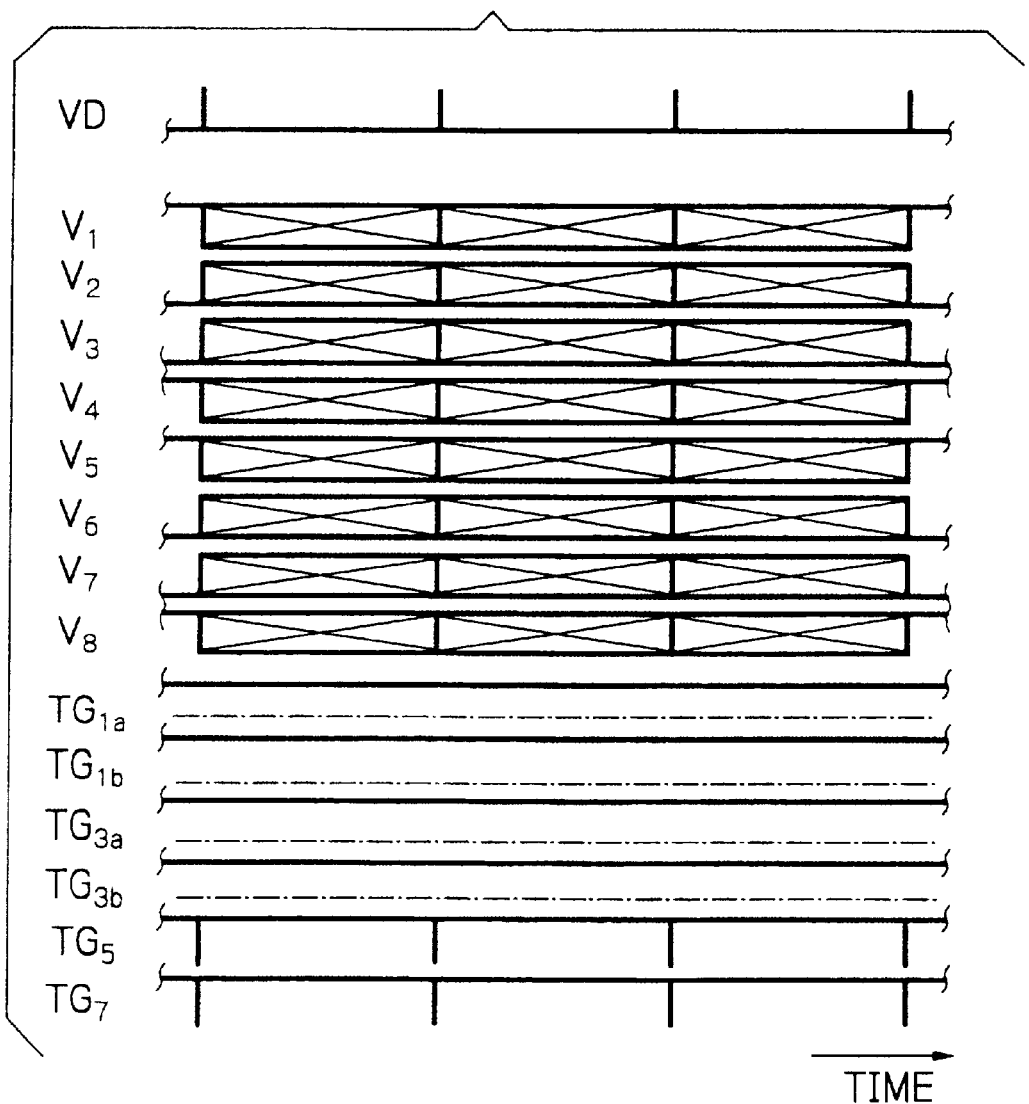
FIG. 21 is a timing chart showing a relation between the vertical synchronizing signal and the vertical drive timing signals and transfer gate pulses for implementing the relation of FIG. 20.

A third procedure for reading a signal out of the image pickup 104 will be described with reference to FIGS. 20 and 21. As shown in FIG. 20, signal charges are simultaneously read out of two lines, e.g., the photosensitive cells 104a on the "m+3" and "m+4" rows. The third procedure is therefore identical with part of the second procedure relating to the second field.

Specifically, in the third procedure, the vertical timing signals V$_n$ are applied to the driver 122 while two transfer gate pulses TG$_n$ (n=5 and 7) are fed to the driver 122 in every vertical synchronization period. When the driver 122 feeds the vertical drive signals $\phi V_n$, signal charges are transferred from the photosensitive cells 104a only to the vertical transfer paths 104c including the vertical transfer electrodes E5 and E7. Consequently, field information or image signal representative of only one-half of the pixel lines is read out in each of the two fields, i.e., the entire field information is subsampled to one-half. Third procedure can therefore reduce the number of pixels lines to one-half when the entire pixels are read out of the image pickup 104.

Figure 23:
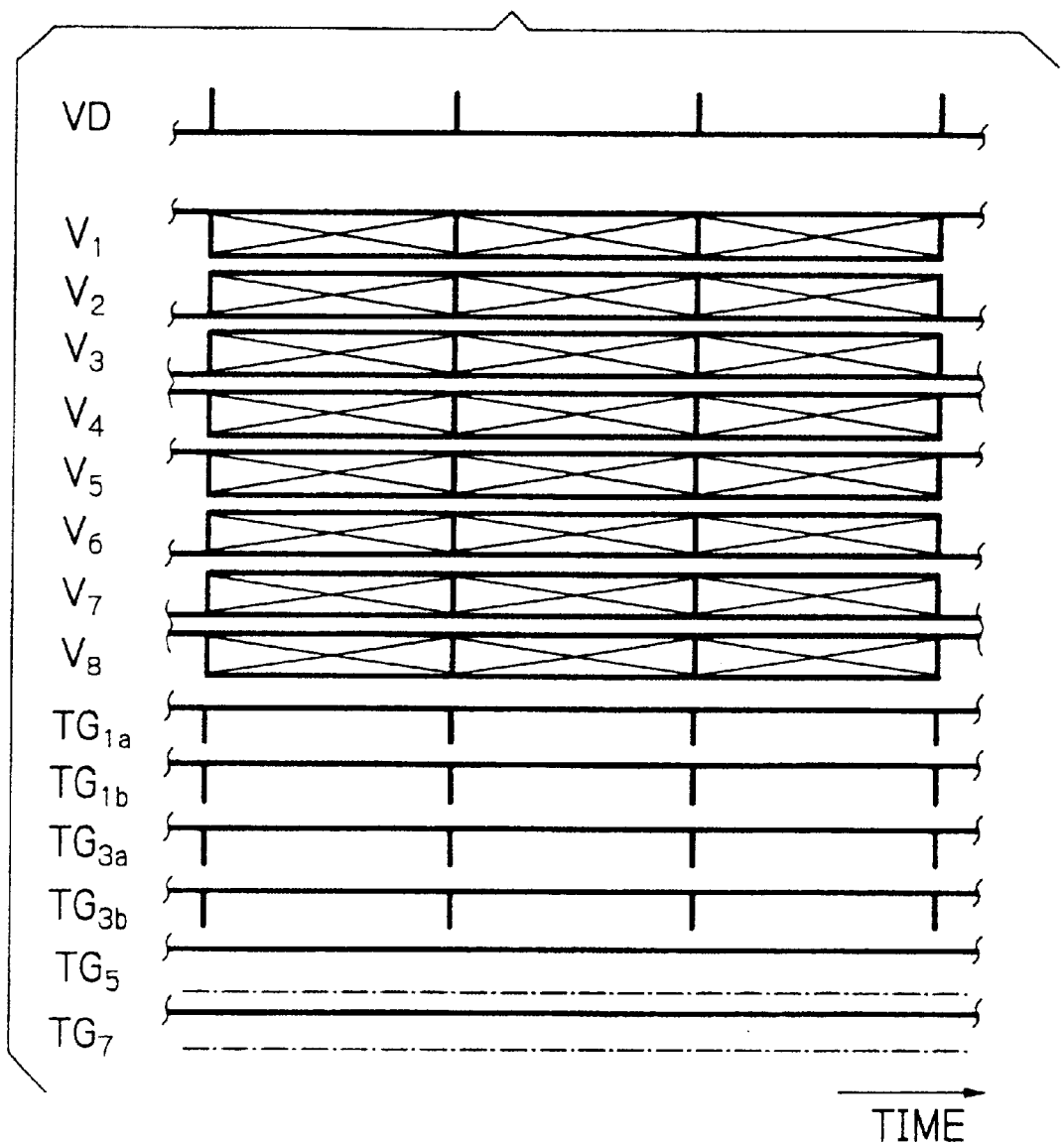
FIG. 23 is a timing chart showing a relation between the vertical synchronizing signal and the vertical drive timing signals and transfer gate pulses in each field for implementing the relation of FIG. 20.

FIGS. 22 and 23 show a fourth procedure for reading a signal out of the image pickup 104. As shown in FIG. 22, signal charges are simultaneously read out of two lines, e.g., the photosensitive cells 104a on the "m+1" and "m+2" rows. The fourth procedure is therefore identical with part of the second procedure relating to the first field.

Specifically, in the fourth procedure, the vertical timing signals V$_n$ are applied to the driver 122 while the transfer gate pulses TG$_n$ (n=1a, 1b, 3a and 3b)) are fed to the driver 122 in every vertical synchronization period. When the driver 122 feeds the vertical drive signals $\phi V_n$, signal charges are transferred from the photosensitive cells 104a only to the vertical transfer paths 104c including the vertical transfer electrodes E1a, E1b, E3a and E3b. Consequently, field information or image signal representative of only one-half of the pixel lines is read out in each of the two fields, i.e., the entire field information is subsampled to one-half. Fourth procedure can also reduce the number of pixels lines to one-half when the entire pixels are read out of the image pickup 104.

Referring to FIGS. 24 through 32, a fifth procedure for reading a signal out of the image pickup 104 will be described. As shown in FIG. 24, signal charges are read out of one line of photosensitive cells 104a in each of a first to a fourth field and prevented from overlapping each other thereby. Specifically, assume that the "m+1" to "m+4" rows are read out in four consecutive fields. Then signal charges are read out of the photosensitive cells 104a on the "m+1" row in the first field while signal charges are read out of the photosensitive cells 104a on the "m+2" row in the second field. Likewise, signal charges are read out of the photosensitive cells 104a on the "m+3" row and the photosensitive cells 104a on the "m+4" row in the third and fourth fields, respectively.

Figure 25:
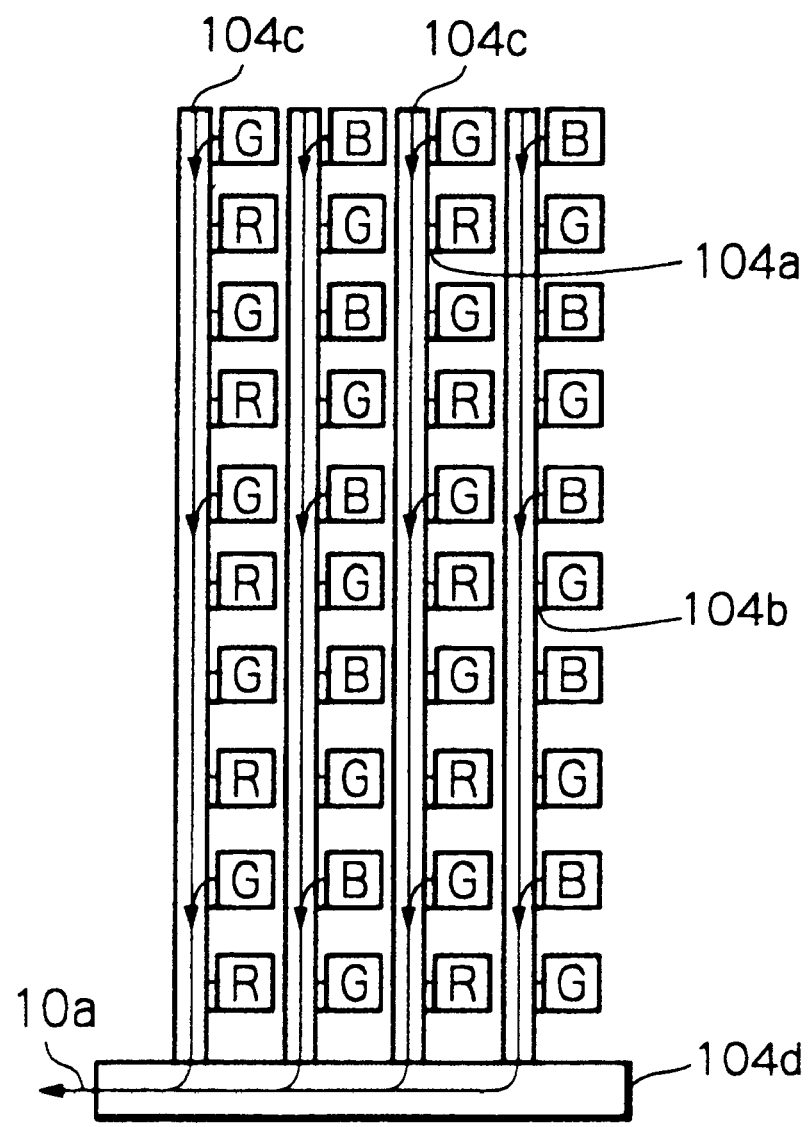
FIG. 25 is a diagram showing part of the arrangement of FIG. 2 and demonstrating signal read-out effected in a first field of FIG. 24.
Figure 26:
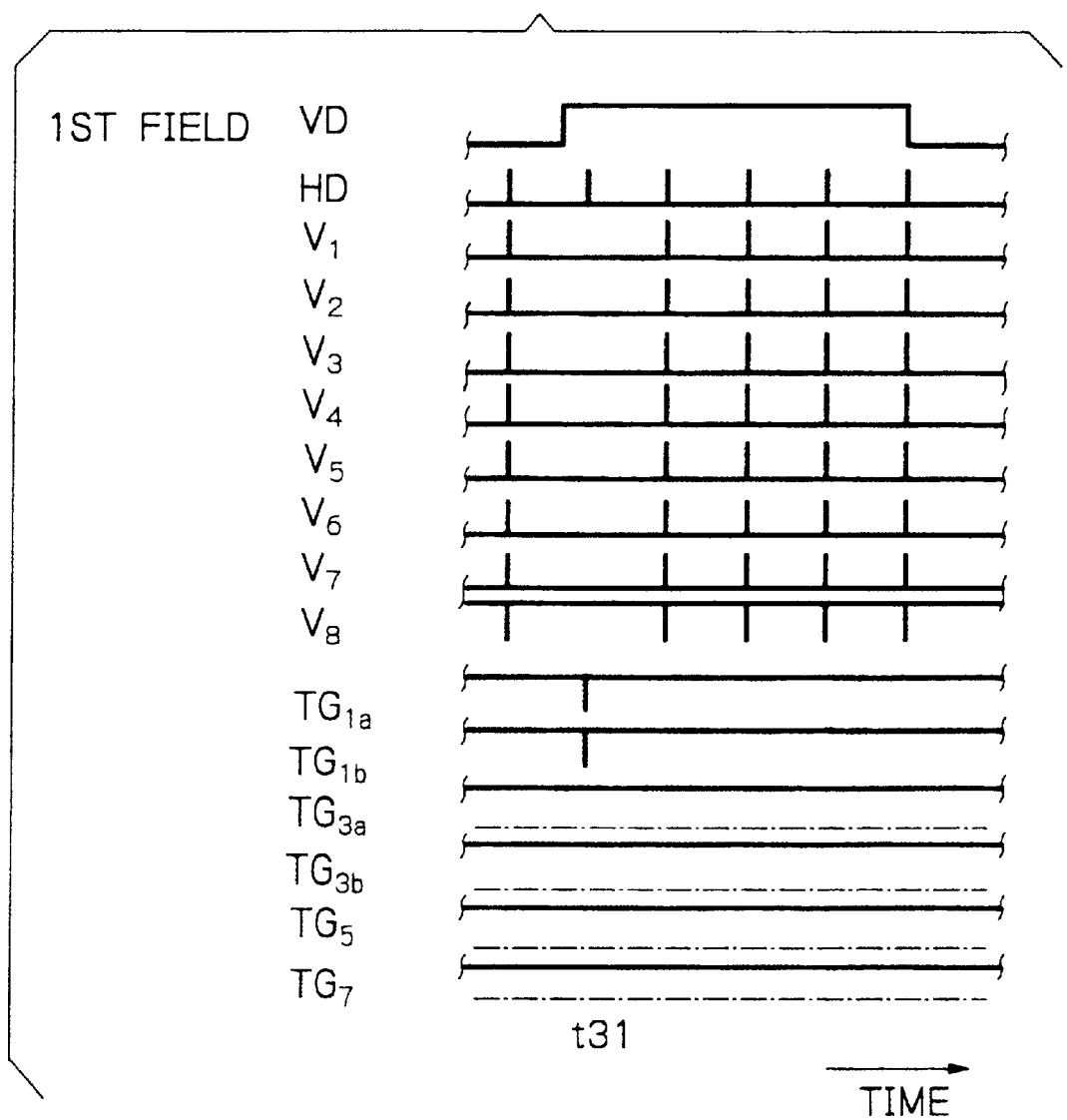
FIG. 26 is a timing chart showing, in an enlarged scale, a relation between the vertical synchronizing signal and the vertical drive timing signals and transfer gate pulses in the first field for implementing the relation of FIG. 24.

FIG. 25 demonstrates the above read-out of signal charges in the first field more specifically. As shown, in the first field, signal charges are read out of the "m+1" row or first line, "m+5" row or fourth line from the "m+1" row, and "m+9" row or fourth line from the "m+9" row (m+1 +4n where n is an integer). As shown in FIG. 26, to selectively read only one line existing at a preselected position by using the connection of signal lines in the image pickup 104, only the transfer gate pulses TG$_{1a}$ and TG$_{1b}$ are fed to the driver 122. In response, at a time t31, the driver 122 applies the vertical drive signals $\phi V_{1a}$ and $\phi V_{1b}$ with a level set to turn on the transfer gates to the vertical transfer electrodes E1$_a$ and E1b, respectively. As a result, signal charges stored in the photosensitive cells on the m+1+4n rows are transferred to the vertical transfer paths 104c.

Figure 27:
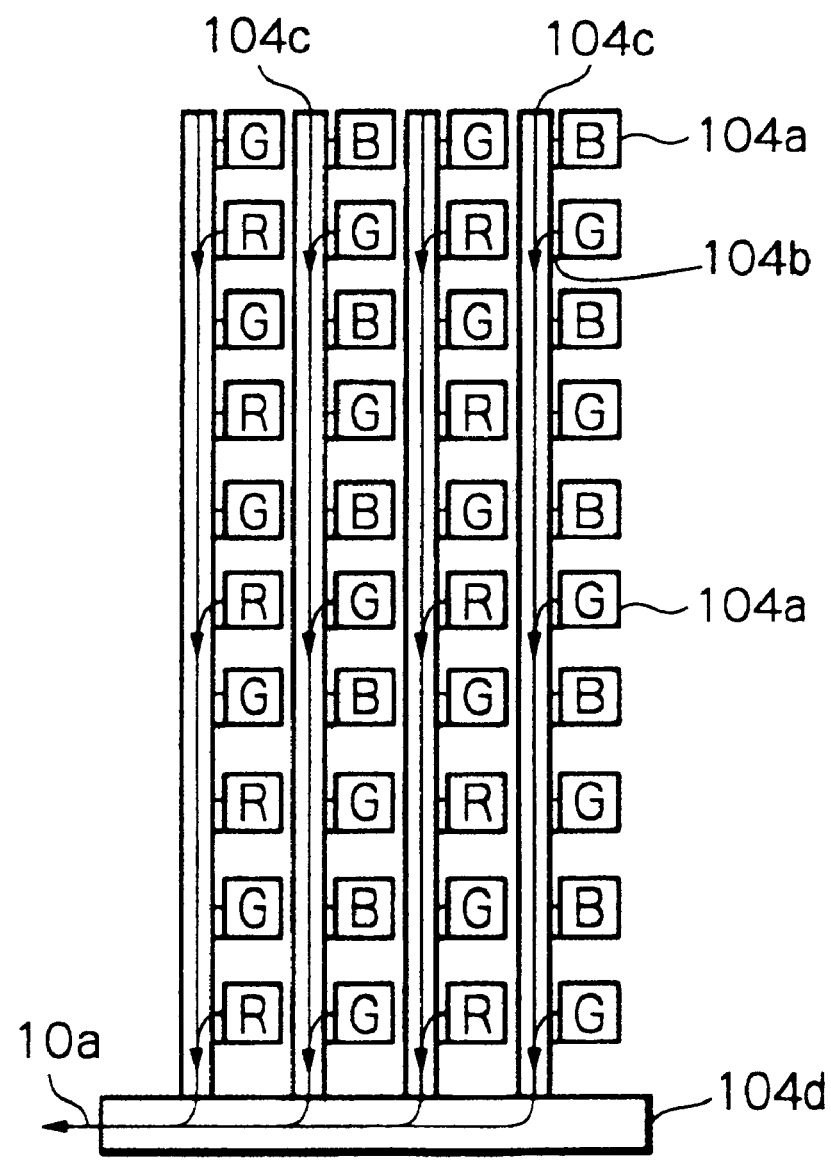
FIG. 27 is a diagram showing part of the arrangement of FIG. 2 and demonstrating signal read-out effected in a second field of FIG 24.
Figure 28:
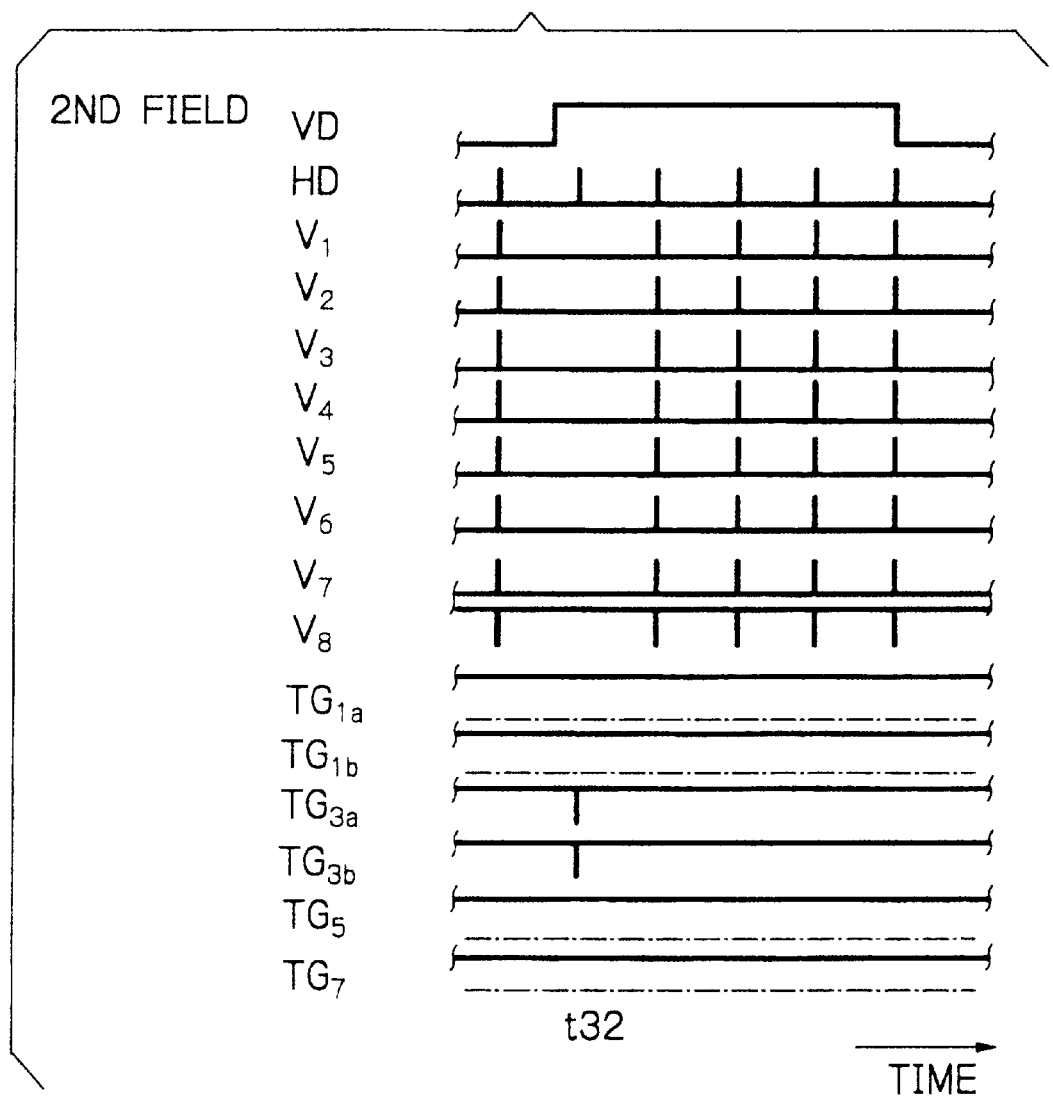
FIG. 28 is a timing chart showing, in an enlarged scale, a relation between the vertical synchronizing signal and the vertical drive timing signals and transfer gate pulses in the second field for implementing the relation of FIG. 24.

As shown in FIG. 27, in the second field, signal charges are read out of the "m+2" row or first line next to the "m+1" row, "m+6" row or fourth line from the "m+2" row, and "m+10" row or fourth line from the "m+6" row (m+2+4n where n is an integer). As shown in FIG. 28, to selectively read only one line existing at a preselected position by using the connection of signal lines in the image pickup 104, only the transfer gate pulses $TG_{3a}$ and $TG_{3b}$ are fed to the driver 122. In response, at a time t32 of the second field, the driver 122 applies the vertical drive signals $\phi V_{3a}$ and $\phi V_{3b}$ with a level set to turn on the transfer gates to the vertical transfer electrodes E3a and E3b. Consequently, signal charges stored in the photosensitive cells 104a on the m+2+4n rows are transferred to the vertical transfer paths 104c.

Figure 29:
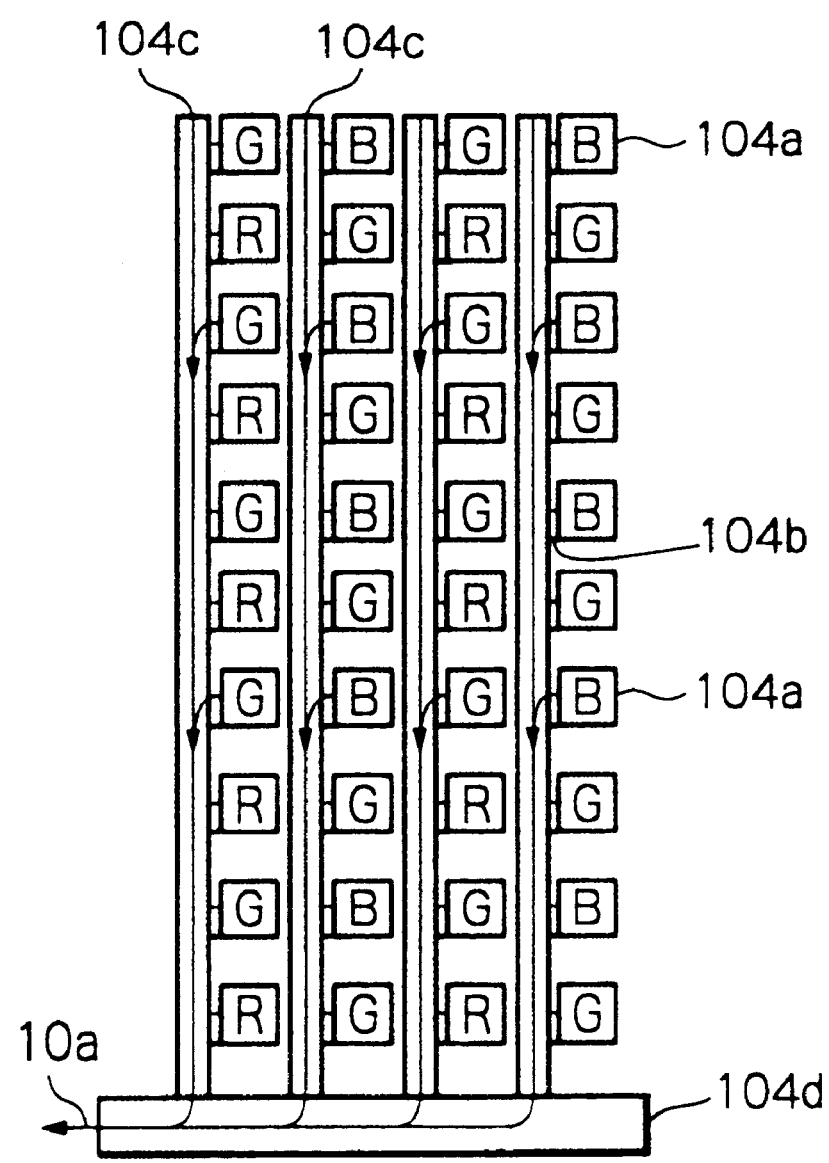
FIG. 29 is a diagram showing part of the arrangement of FIG. 2 and demonstrating signal read-out effected in a third field of FIG. 24.
Figure 30:
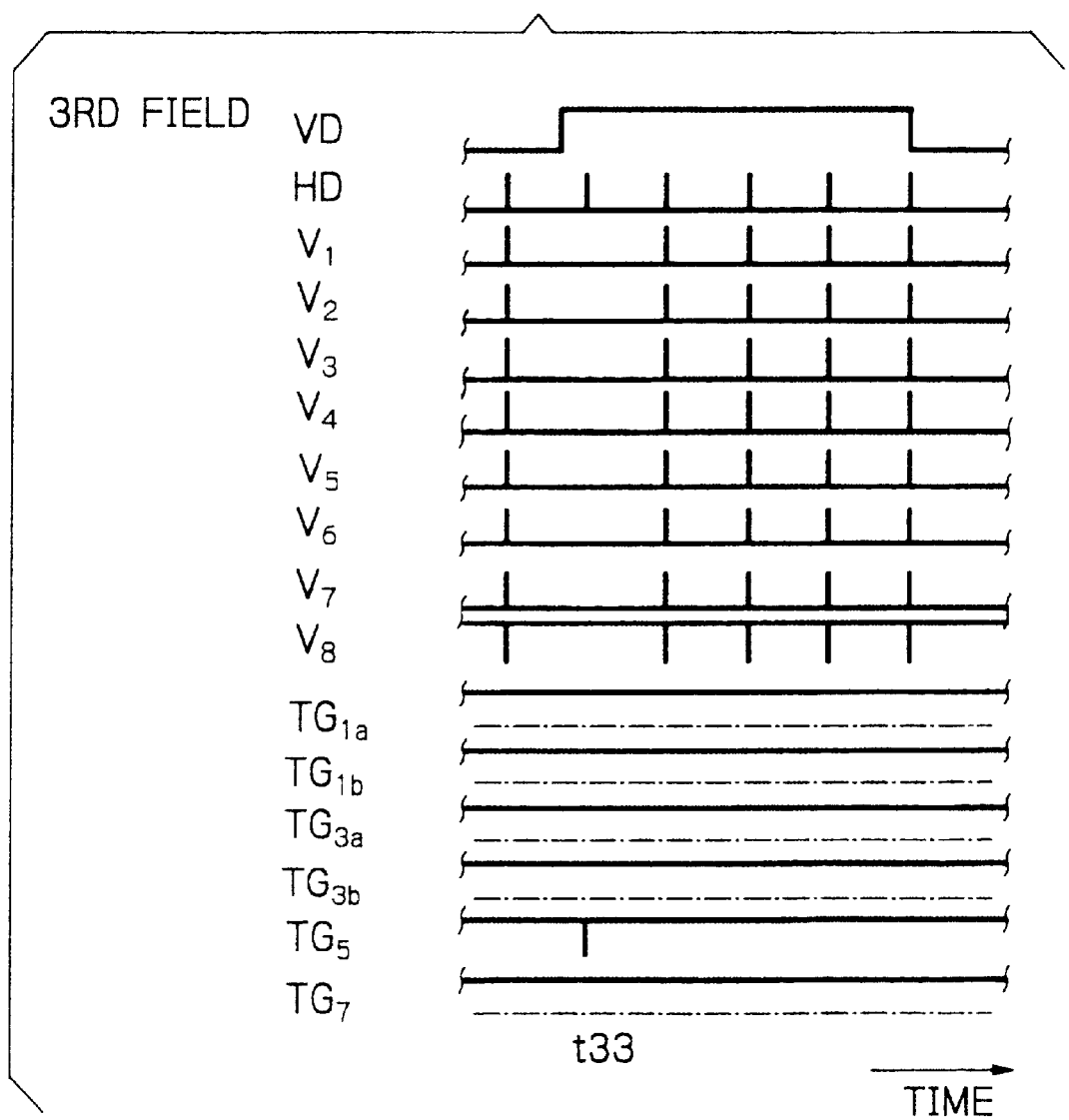
FIG. 30 is a timing chart showing, in an enlarged scale, a relation between the vertical synchronizing signal and the vertical drive timing signals and transfer gate pulses in the third field for implementing the relation of FIG. 24.

As shown in FIG. 29, in the third field, signal charges are read out of the "m+3" row or second line from the "m+1" row and "m+7" row or fourth line from the "m+3" row (m+3+4n where n is an integer). As shown in FIG. 30, to selectively read only one line existing at a preselected position by using the connection of signal lines in the image pickup 104, only the transfer gate pulse $TG_5$ is fed to the driver 122. In response, at a time t33 of the third field, the driver 122 applies the vertical drive signal $\phi V_5$ with a level set to turn on the transfer gates to the vertical transfer electrodes E5. Consequently, signal charges stored in the photosensitive cells 104a on the m+3+4n rows are transferred to the vertical transfer paths 104c.

Figure 31:
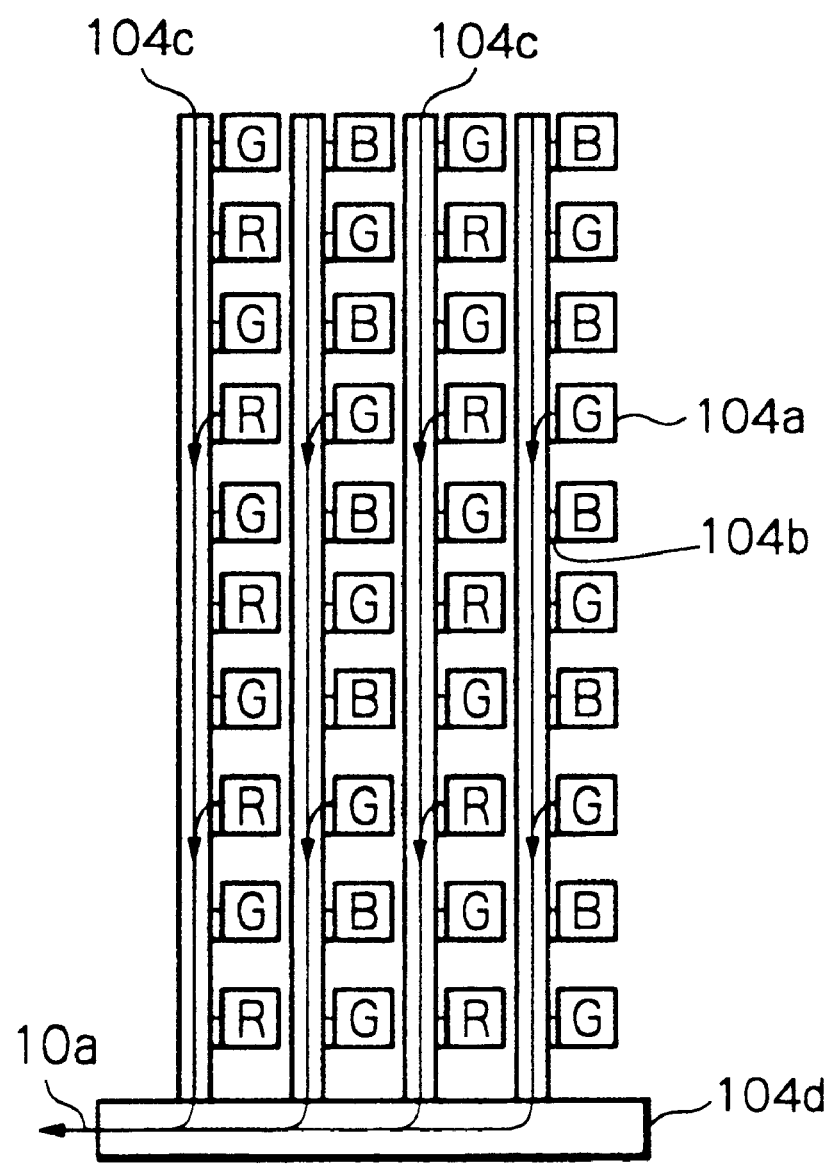
FIG. 31 is a diagram showing part of the arrangement of FIG. 2 and demonstrating signal read-out effected in a fourth field of FIG. 24.

As shown in FIG. 31, in the fourth or last field, signal charges are read out of the "m+4" row or third line from the "m+1" row and "m+8" row or fourth line from the "m+4" row (m+4+4n where n is an integer). As shown in FIG. 32, to selectively read only one line existing at a preselected position by using the connection of signal lines in the image pickup 104, only the transfer gate pulse $TG_7$ is fed to the driver 122. In response, at a time t34 of the fourth field, the driver 122 applies the vertical drive signal $\phi V_7$ with a level set to turn on the transfer gates to the vertical transfer electrodes E7. Consequently, signal charges stored in the photosensitive cells 104a on the m+4 +4n rows are transferred to the vertical transfer paths 104c.

As stated above, the fifth procedure selectively reads out only one-fourth of field information or image signal representative of one-half of all the pixel lines in each of four consecutive fields. This kind of connection readily implements four-field interlace scanning only if the setting is 'switched over.

FIG. 33 shows a sixth procedure for reading a signal out of the image pickup 104. As shown, the total number of lines out of which signal charges are read in two fields is one-half of the number of lines shown in FIG. 4 (subsampling to one-half). Stated another way, the image signal is subsampled to one-fourth as to the number of lines in each field with respect to the total number of lines. In practice, the vertical drive signals $\phi V_5$ and $\phi V_7$ may be respectively applied to the vertical transfer electrodes E5 and E7 in the first and second fields, respectively. The vertical drive signals $\phi V_5$ and $\phi V_7$ include the transfer gate pulses $TG_5$ and $TG_7$, respectively.

FIG. 34 shows a seventh procedure for reading a signal out of the image pickup 104. As shown, the total number of lines out of which signal charges are read in two fields is one-half of the number of lines shown in FIG. 4 (subsampling to one-half), as in the sixth procedure. Stated another way, the image signal is subsampled to one-fourth as to the number of lines in each field. In the seventh procedure, the vertical drive signals $\phi V_{1a}$ and $\phi V_{1b}$ may be respectively applied to the vertical transfer electrodes E1a and E1b in the first field. The vertical drive signals $\phi V_{1a}$ and $\phi V_{1b}$ include the transfer gate pulses $TG_{1a}$ and $TG_{1b}$, respectively. The vertical drive signal $\phi V_7$ including the transfer gate pulse $TG_7$ may be applied to the vertical transfer electrodes E7 in the second field, as in the sixth procedure.

In the sixth and seventh procedures, the field-by-field signal is only a GB signal or an RG signal because of the Bayer arrangement of the color filter segments. To implement color display, signal processing for outputting the three primary colors R, G and B may be executed in the following stage.

Figure 36:
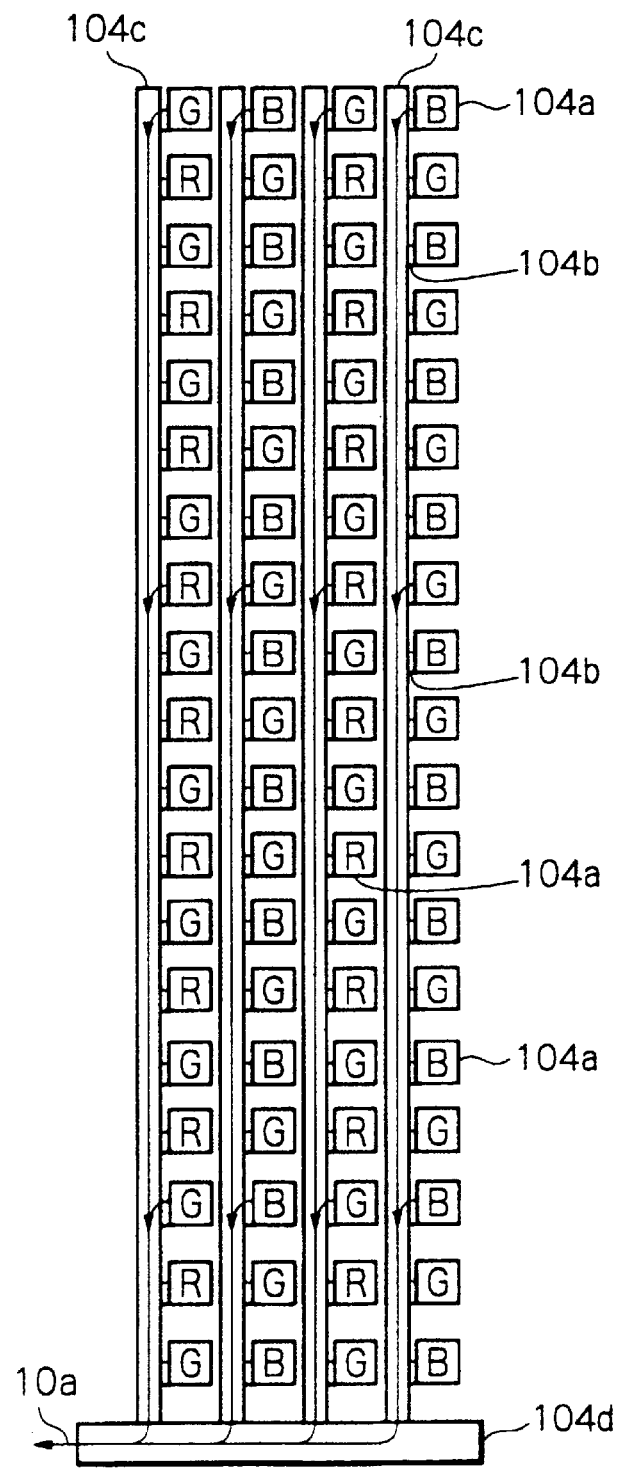
FIG. 36 is a diagram showing part of the arrangement of FIG. 2 and demonstrating signal read-out effected in a field of FIG. 35.
Figure 37:
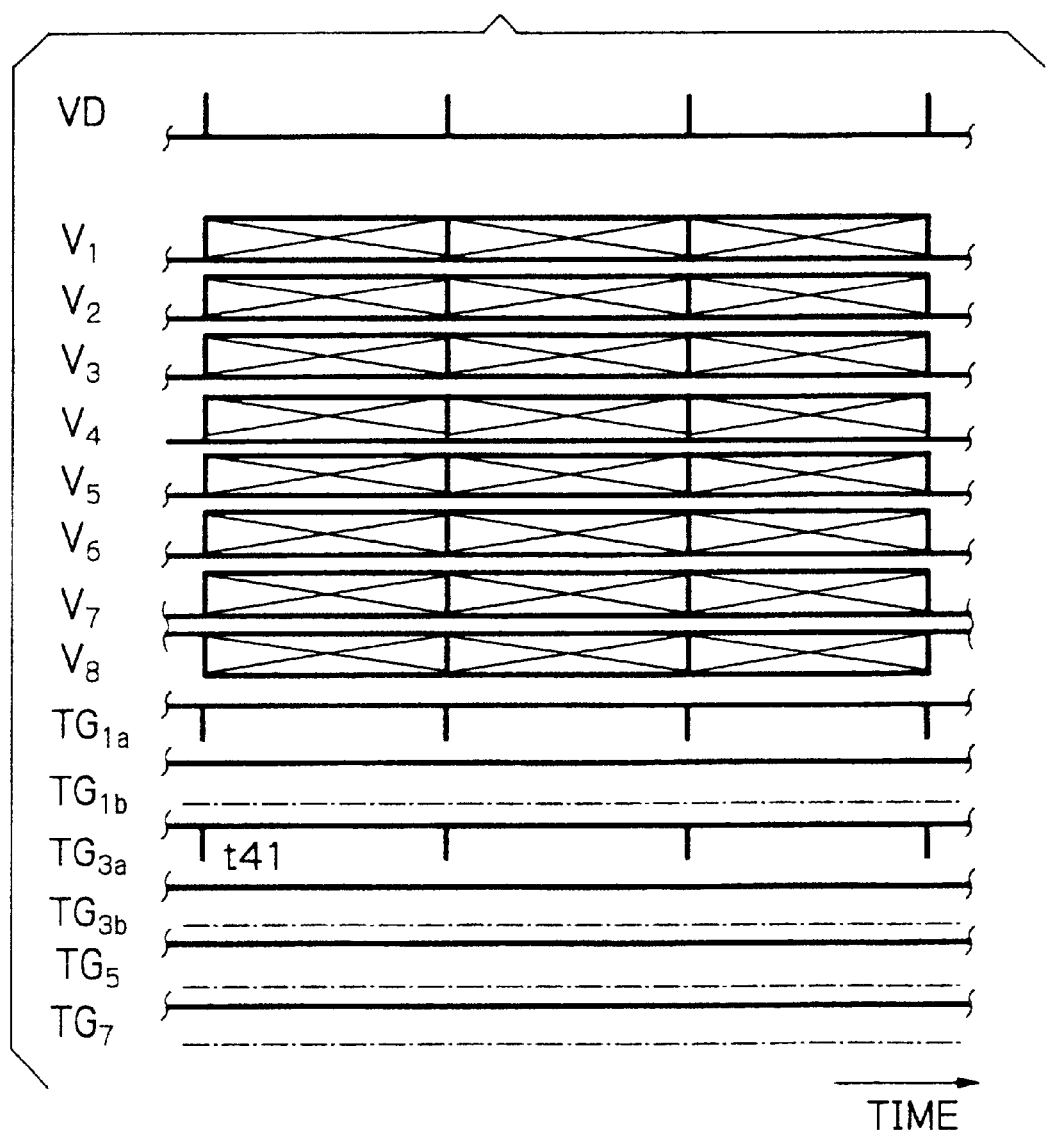
FIG. 37 is a timing chart showing a relation between the vertical synchronizing signal and the vertical drive timing signals and transfer gate pulses for implementing the relation of FIG. 35.

An eighth procedure for reading a signal out of the image pickup 104 will be described with reference to FIGS. 35 through 38. As shown in FIG. 35, the eighth procedure reads signal charges out of only two of the total number of lines, i.e., sixteen lines. Stated another way, the eighth procedure reads only one-eighth of the total number of lines during the period of a single field (subsampling to one-eighth). FIG. 36 shows a positional relation between the read-out lines that is derived from spatial balance regarding the GB and RG lines read line by line out of sixteen lines, i.e., resolution and the previously stated connection of signal lines in the image pickup 104. The vertical drive signals $\phi V_{3a}$ and $\phi V_{1a}$ applied only to the vertical transfer electrodes E3a and E1a, respectively, include the transfer gate pulses $TG_{3a}$ and $TG_{1a}$, respectively. FIG. 37 is a timing chart showing that the transfer gate pulses $TG_{3a}$ and $TG_{1a}$ are fed to the driver 122 every field.

Figure 38:
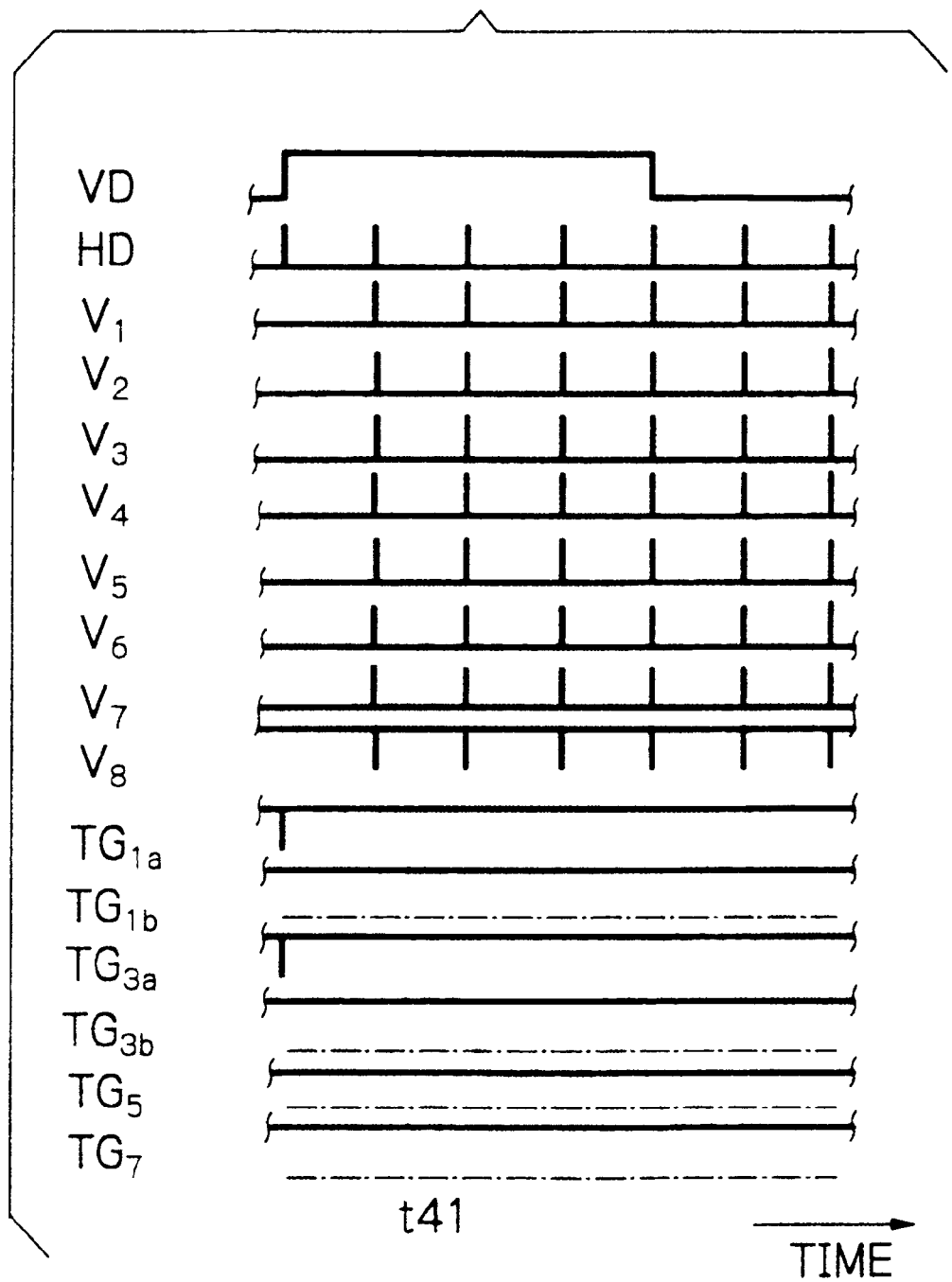
FIG. 38 is a timing chart showing, in an enlarged scale, a relation between the vertical synchronizing signal and a horizontal synchronizing signal and the vertical drive timing signals and transfer gate pulses for implementing the relation of FIG. 35.

FIG. 38 shows part of FIG. 37 around a time t41 in an enlarged scale. As shown, The transfer gate pulses $TG_{3a}$ and $TG_{1a}$ are fed at a preselected timing in synchronism with the vertical synchronizing signal VD and horizontal synchronizing signal HD. If the vertical transfer electrodes are adequately connected in consideration of the read-out of signal charges only from desired lines in the Bayer arrangement, there can be readily implemented subsampling to one-eighth in the vertical direction that has been difficult to practice with the conventional image sensing devices.

As stated above, the illustrative embodiment is capable of selectively executing subsampling to one-half, to one-fourth or to one-eighth in the vertical direction. This can be done if the image pickup 104 is constructed in consideration of the connection of signal lines connecting ten electrodes and is driven by eight-phase drive. The illustrative embodiment is, of course, capable of reading out all of the pixels, as needed.

Figure 39:
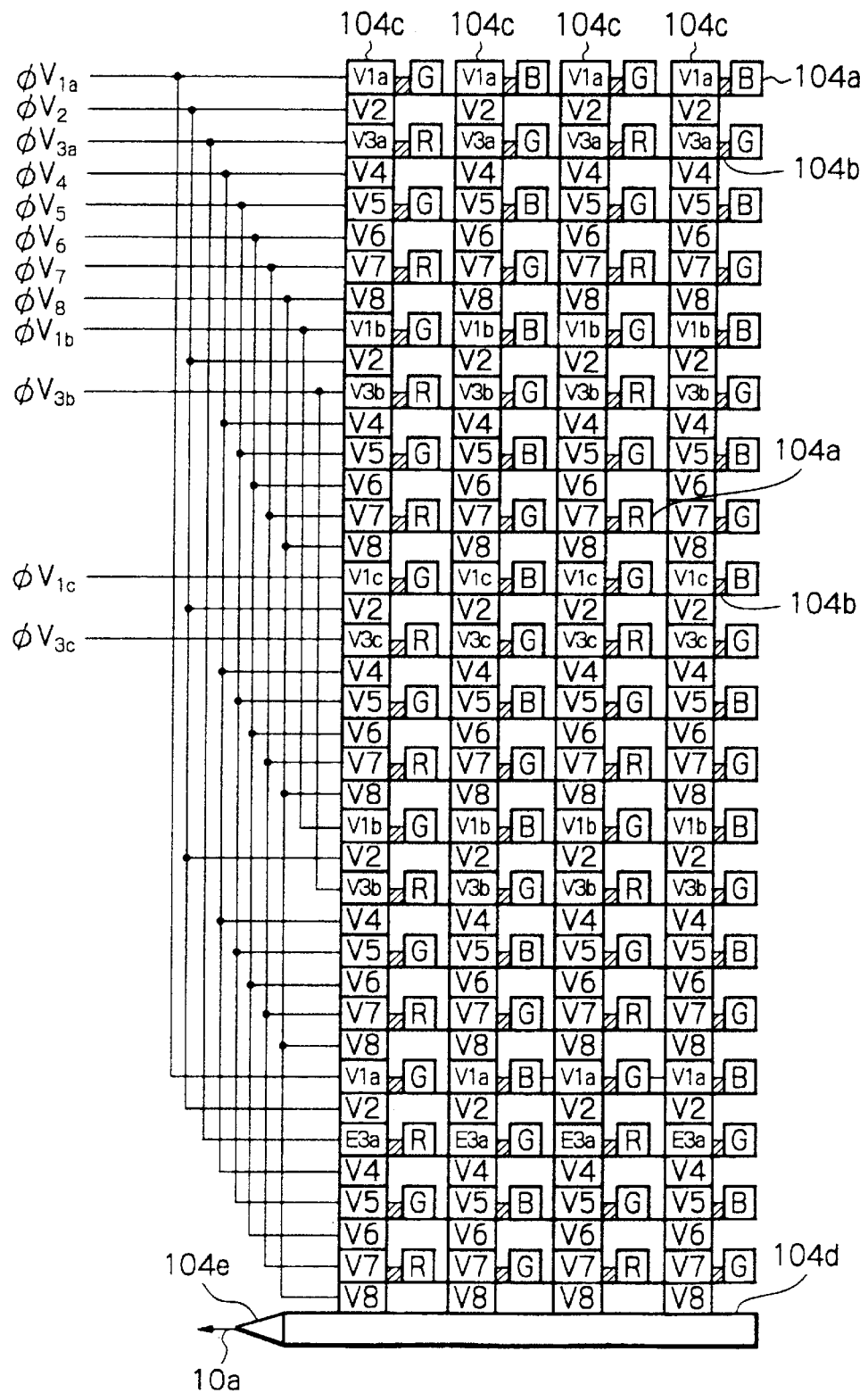
FIG. 39 is a diagram showing part of the image pickup section of FIG. 1 and representative of an alternative embodiment of the present invention.
Figure 40:
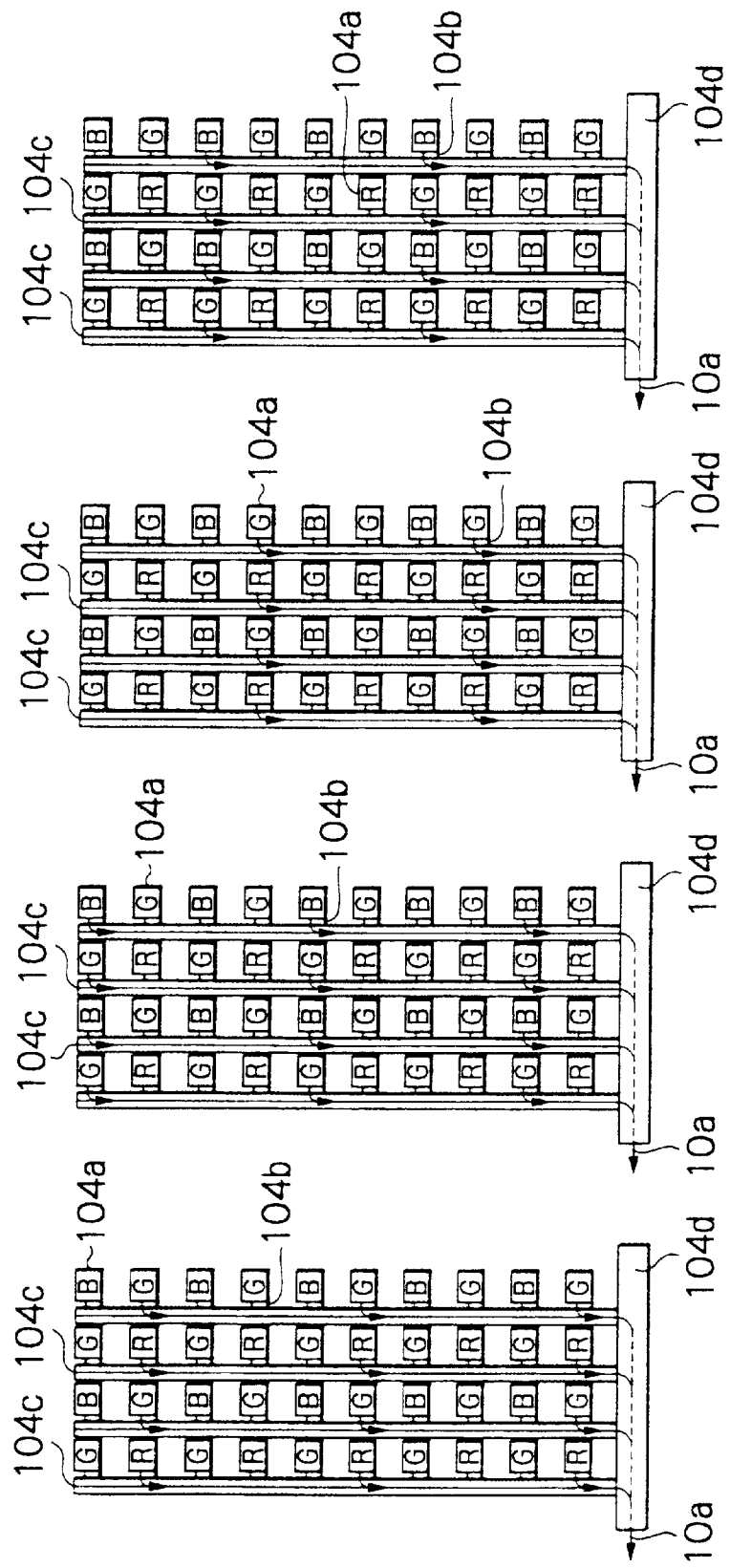
FIGS. 40A through 40D are diagrams showing part of the image pickup of FIG. 39 and demonstrating signal read-out effected in four consecutive fields by interlacing.

An alternative embodiment of the image pickup device in accordance with the present invention will be described hereinafter. This embodiment differs from the previous embodiment mainly in that it implements the connection of the image pickup 104 with twelve electrodes. The illustrative embodiment is implemented as a digital still camera sharing the same basic configuration as the camera 10 shown in FIG. 1 and including the image pickup 104. As shown in FIG. 39, in the illustrative embodiment, the connection of the vertical transfer electrodes 104c to which the vertical drive signals $\phi V_n$ are applied is different from the connection of the previous embodiment.

Specifically, vertical drive electrodes are formed on the vertical transfer paths 104c for receiving the vertical drive signals $\phi V_n$. While the previous embodiment has used reference numerals based on the electrodes of the vertical transfer paths 104c, as shown in FIG. 2, this embodiment uses reference numerals based on the individual CCD or vertical transfer device arranged on the paths 104c. In the image pickup 104, two CCDs are vertically arranged for a single pixel in order to prevent signal charges read out of adjoining pixels from being mixed together. In the configuration shown in FIG. 39, a group of thirty-two CCDs are cyclically arranged and connected by a repeated signal line pattern, so that signal charges can be read out by connection that will be described specifically hereinafter.

Assume that the first line shown in FIG. 39 is the first row, and that a variable n (corresponding to a variable j used in appended claims) is an integer. Vertical transfer devices V1$a$ to which the vertical drive signal $\phi V_{1a}$ is applied are arranged only on the first line of the thirty-two consecutive lines. That is, the vertical transfer devices $V_{1a}$ appear on every 1+32 rows and are connected together. Vertical transfer devices V2 to which the vertical drive signal $\phi V_2$ is applied appear on every 2+8n rows and are connected together. Vertical transfer devices V3$a$ to which the vertical drive signal $\phi V_{3a}$ is applied also appear only once in a single cycle, i.e., very 3+32n rows and are connected together.

Vertical transfer devices V4 through V8 to which the vertical drive signals $\phi V_4$ through $\phi V_8$ are respectively applied appear on every 4+8n rows, every 5+8n rows, every 6+8n rows, every 7+8n rows and every 8+8n rows, respectively. The devices V4 through V8 are connected such that a particular drive signal is applied to each group of devices. Vertical transfer devices V1$b$ and V3$b$ to which the vertical drive signals $\phi V_{1b}$ and $\phi V_{3b}$ are respectively applied appear on every 9+16n rows and every 11+16n rows, respectively, and each is connected together. The 9+16n row and 11+16n row are respectively 5+8n and 6+8n in terms of lines. Further, 17+32n vertical transfer devices V1$c$ to which the vertical drive signal $\phi V_{1c}$ is applied and 19+32n vertical transfer devices V3$c$ to which the vertical drive signal $\phi V_{3c}$ each are connected together. The devices V1$c$ and V3$c$ therefore each appear only once in a single cycle. The devices V1$c$ and V3$c$ are located around the center of a single cycle.

In the connection of signal lines shown in FIG. 39, the same pattern repeatedly appears more than in the connection of the previous embodiment. This is successful to obviate complicated connection.

The image pickup 104 with the above connection is driven by interlacing in order to read signal charges while subsampling them to one-fourth field by field. Specifically, as shown in FIGS. 40A through 40D, a group of four lines are read out during four consecutive fields. For this purpose, the pixels from which signal charges should be read out are grouped by field. The transfer gate pulses TG$_n$ define such a signal reading procedure.

Figure 41:
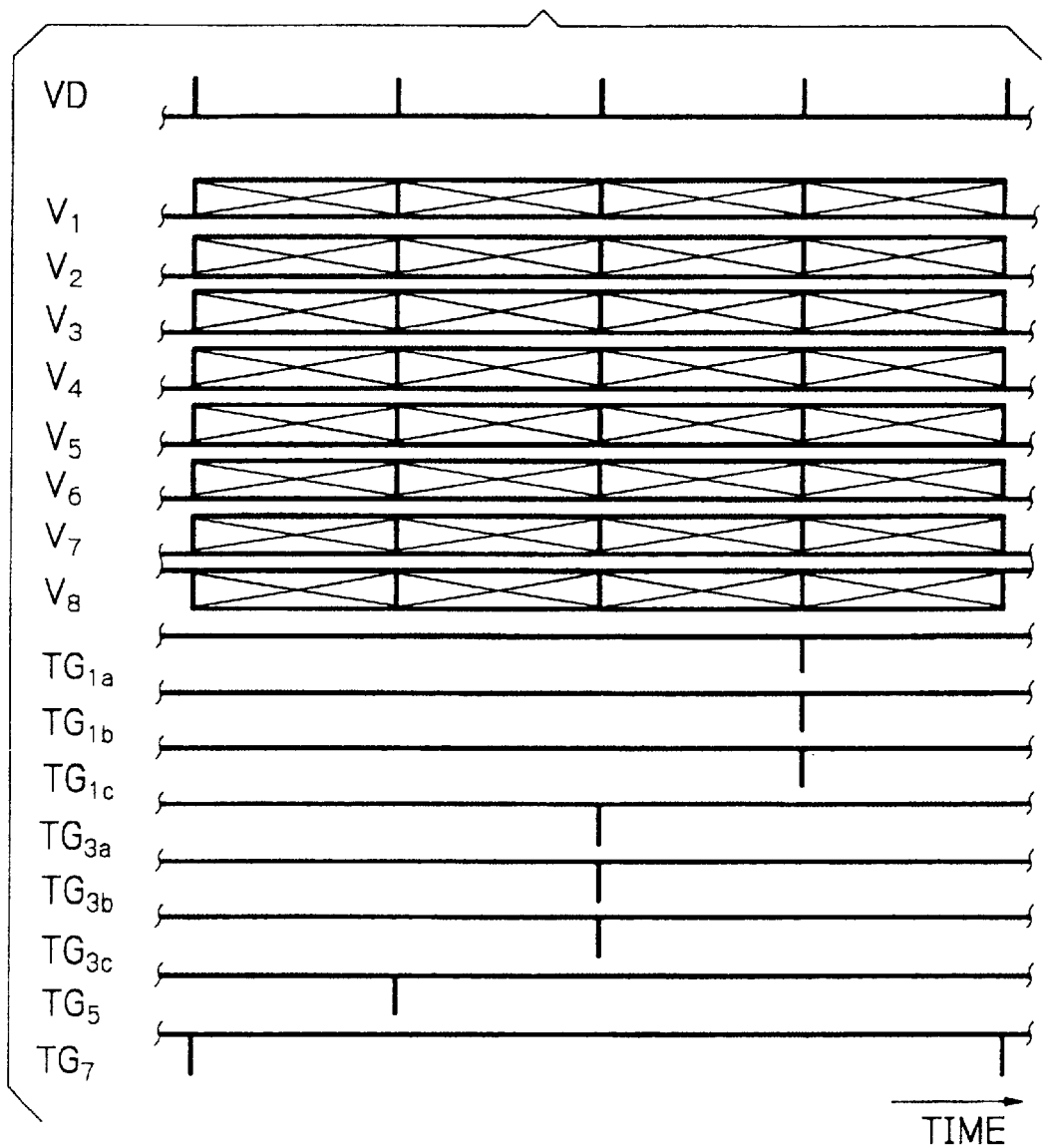
FIG. 41 is a timing chart showing a relation between vertical drive signals shown in FIG. 39 and the transfer gate pulses and vertical drive timing signals.

As shown in FIG. 41, transfer gate pulses TG$_{1a}$ through TG$_{1c}$, TG$_{3a}$ through TG$_{3c}$, TG$_5$ and TG$_7$ are fed in synchronism with the vertical synchronizing signal VD. The illustrative embodiment has two additional electrodes and therefore uses two additional transfer gate pulses, compared to the previous embodiment. Specifically, the transfer gate pulse TG$_7$ is fed in synchronism with the first vertical synchronizing signal VD. The transfer gate pulse TG$_5$ is fed in synchronism with the next vertical synchronizing signal VD. Further, the transfer gate pulses TG$_{1a}$ through TG$_{1c}$ are fed at the same time in synchronism with the third vertical synchronizing signal VD. As the suffixes indicate, the transfer gate pulses TG$_{1a}$ through TG$_{1c}$ simply differ from each other as to the destination due to the connection of signal lines. Finally, the transfer gate pulses TG$_{3a}$ through TG$_{3c}$ are fed at the same time in synchronism with the fourth vertical synchronizing signal VD.

Figure 42:
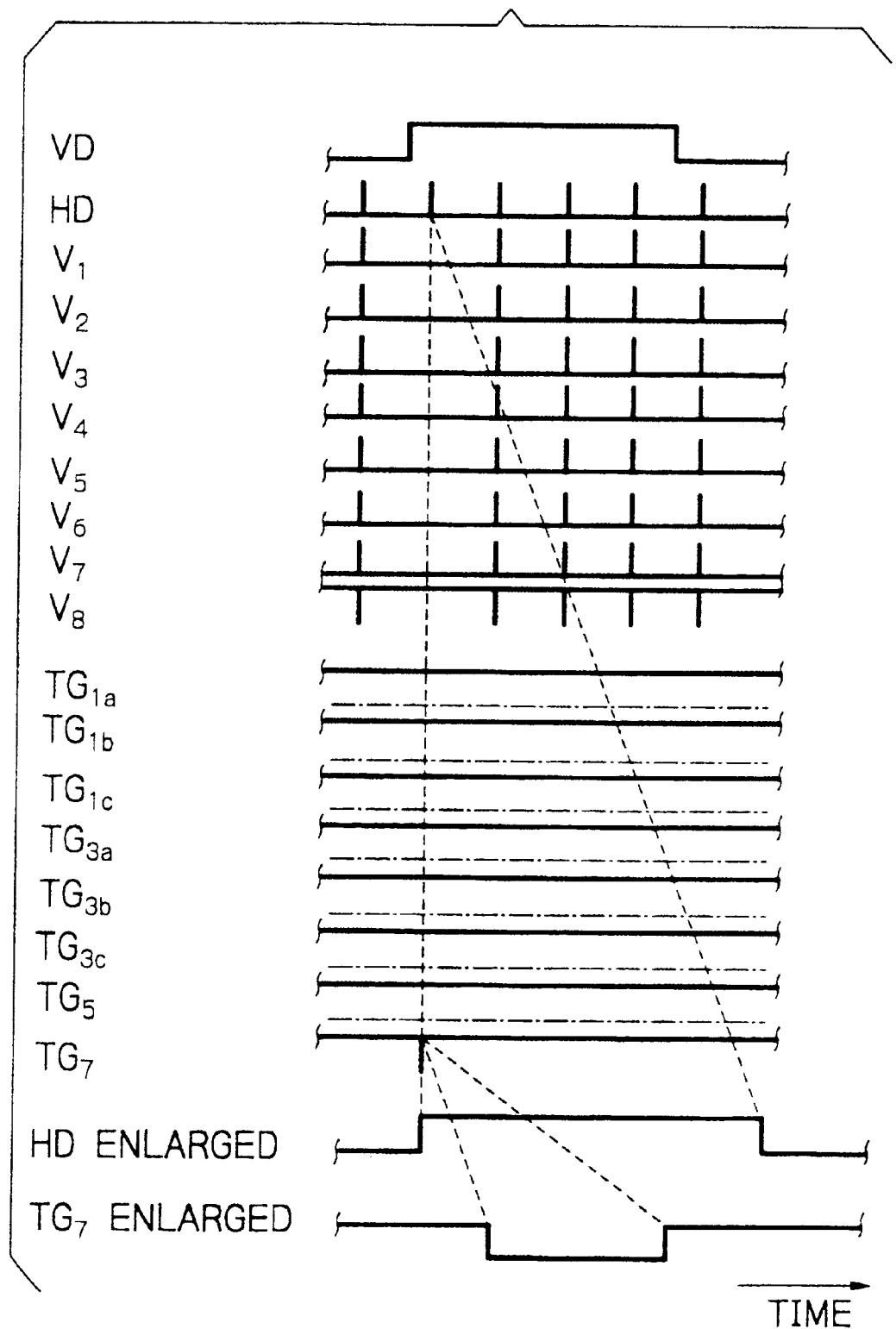
FIG. 42 is a timing chart showing a relation between the vertical synchronizing signal and horizontal synchronizing signal of FIG. 39 and the vertical drive timing signals and transfer gate pulses in a first field.
Figure 43:
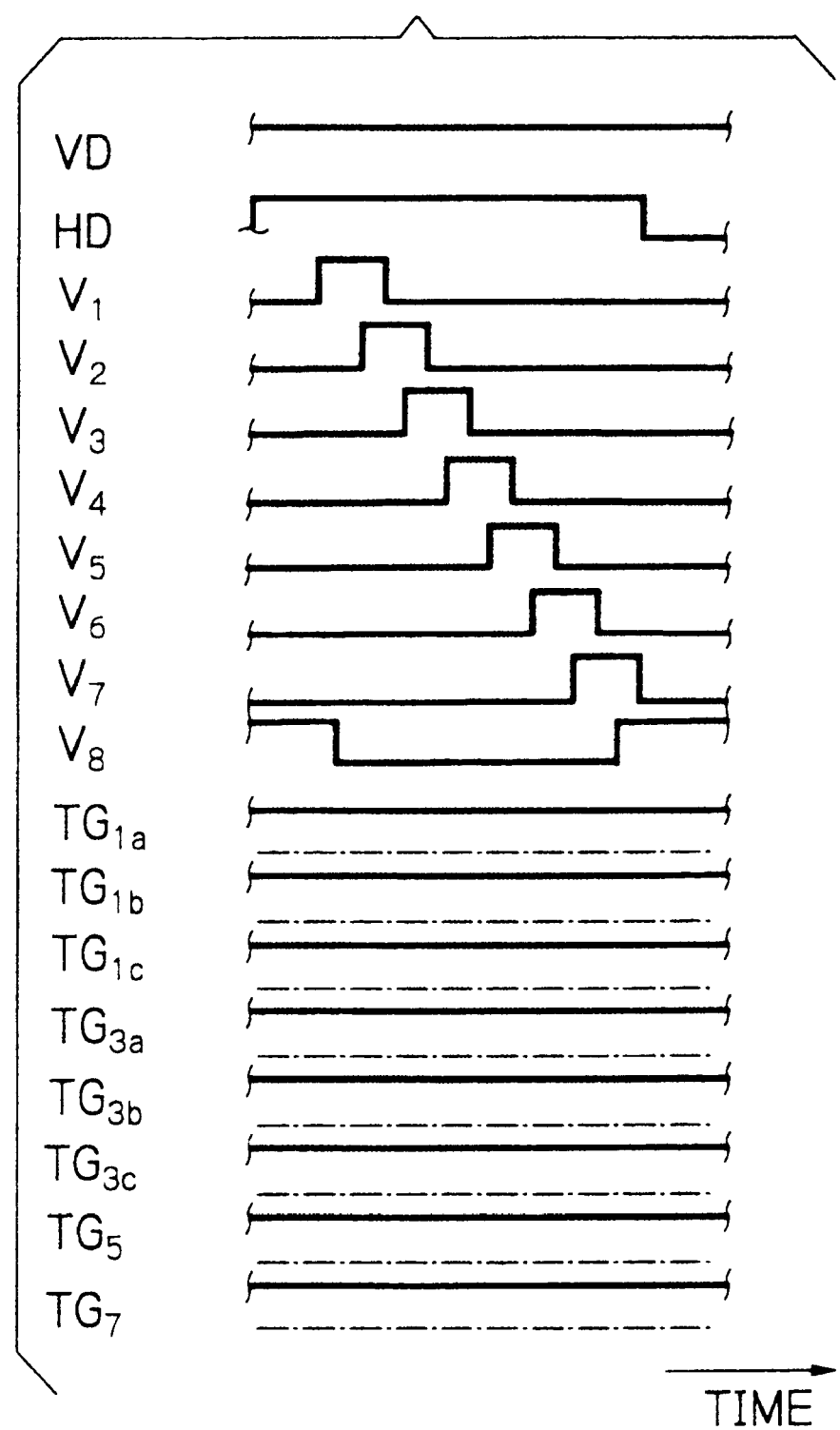
FIG. 43 is a timing chart showing the vertical drive timing signals and transfer gate pulses for driving the image pickup of FIG. 38 with eight phases.

As shown in FIG. 42, only the transfer gate pulse TG$_7$ is fed in the first field. As shown in an enlarged scale at the bottom of FIG. 42, the transfer gate pulse TG$_7$ remains in the low level for a preselected period of time at the intermediate portion of the horizontal synchronizing signal HD. Referring again to FIG. 3, when the transfer gate pulse TG$_n$ and vertical drive timing signal V$_n$ are simultaneously applied to the driver 122 in the L level, the driver 122 causes the vertical drive signal $\phi V_n$ to rise to the H level. As a result, signal charges are read out of only the vertical transfer devices to which the H-level vertical drive signal $\phi V_n$ is applied. When the vertical drive signal $\phi V_n$ is in the M level, the above signal charges are sequentially transferred by the eight-phase drive timing signals V$_n$ shown in FIG. 43.

Figure 44:
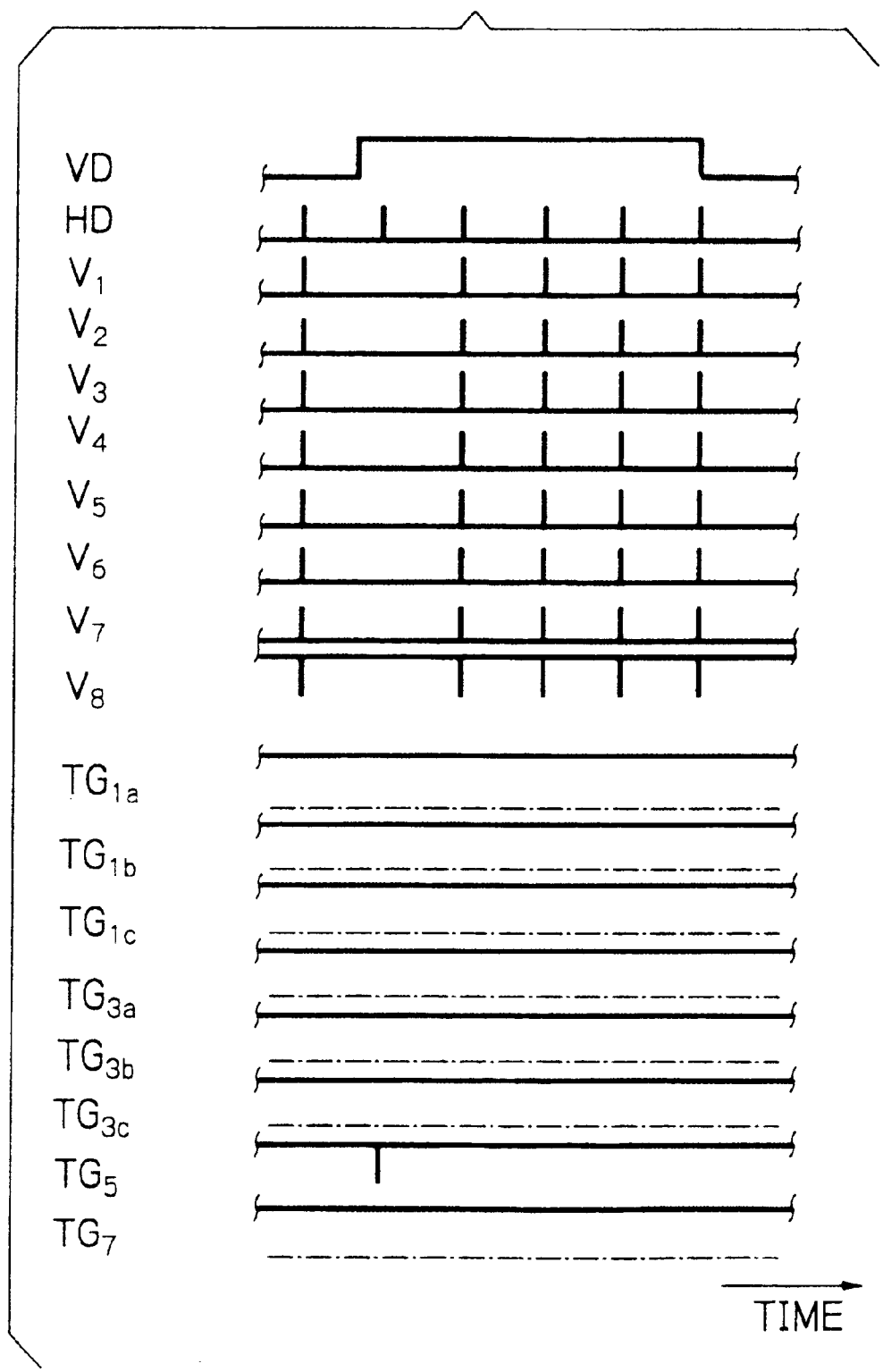
FIG. 44 is a timing chart showing part of FIG. 41 relating to a second field.
Figure 45A:
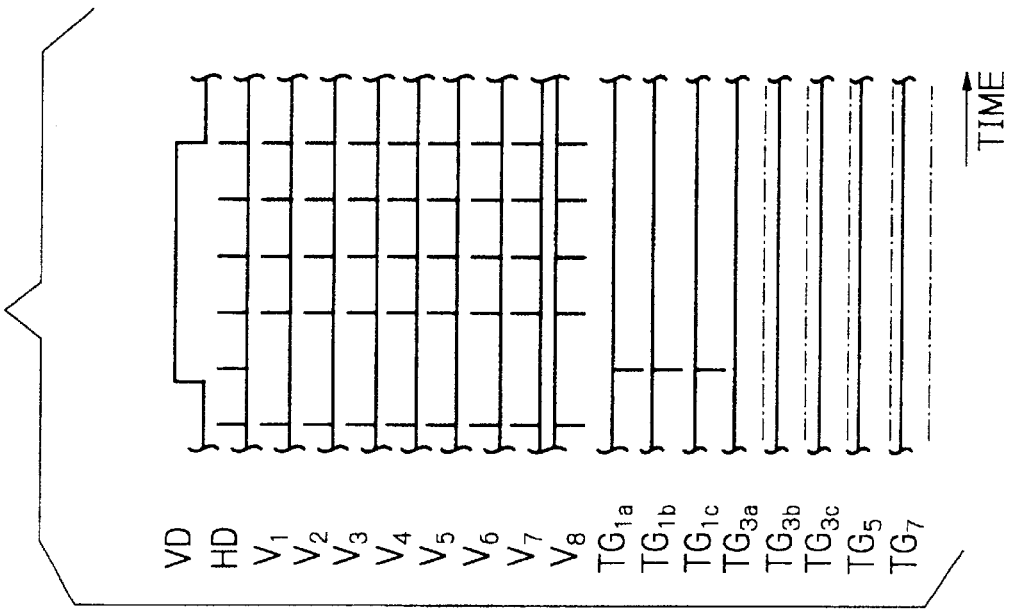
FIGS. 45A and 45B are timing charts showing part of FIG. 41 relating to a third and a fourth field, respectively.
Figure 45B:
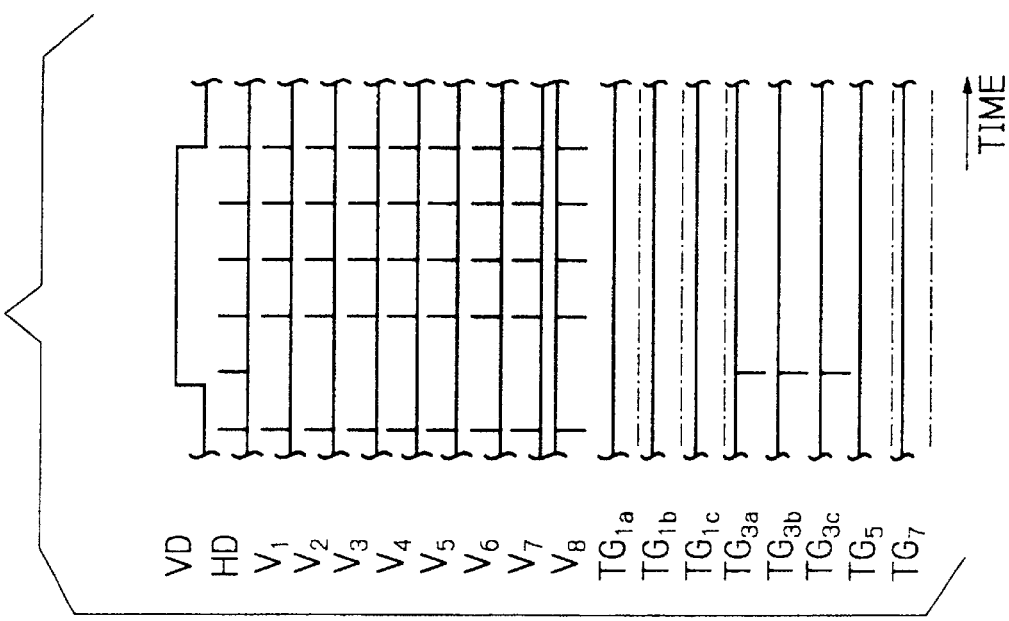
Figure 46A:
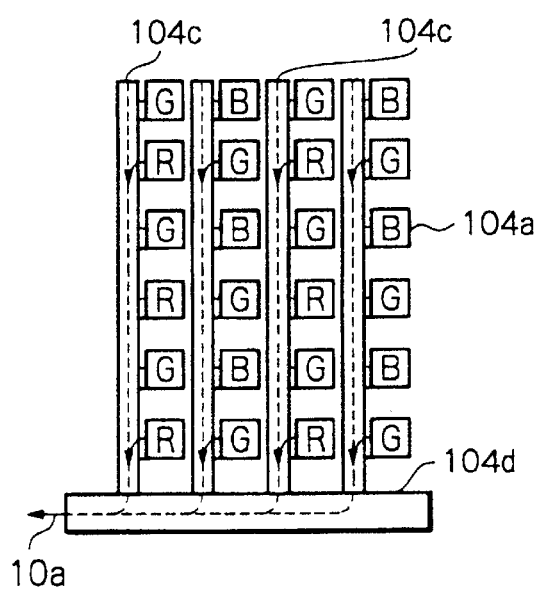
FIGS. 46A and 46B are diagrams showing part of FIG. 39 and demonstrating signal read-out based on 2:1 interlacing.
Figure 46B:
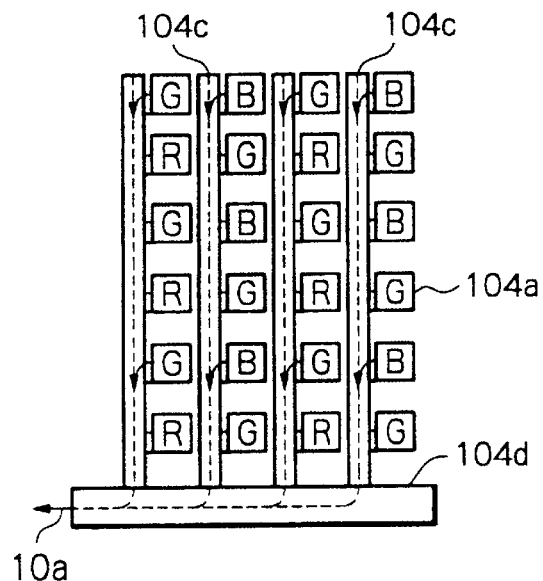

The above relation is also true with the second field. Specifically, as shown in FIG. 44, when the transfer gate pulse TG$_5$ applied to the driver 122 goes low in synchronism with the horizontal synchronizing signal HD, the vertical drive signal $\phi V_5$ is fed to the image pickup 104 in order to read signal charges out of the photosensitive cells 104$a$. FIGS. 45A and 45B respectively show the transfer gate pulses TG$_n$ fed in the third field and the transfer gate pulses TG$_n$ fed in the fourth field. By feeding the transfer gate pulses as stated above, it is possible to start executing one-fourth interlacing at any desired position in the conventional manner despite the connection of signal lines particular to the illustrative embodiment.

Figure 47:
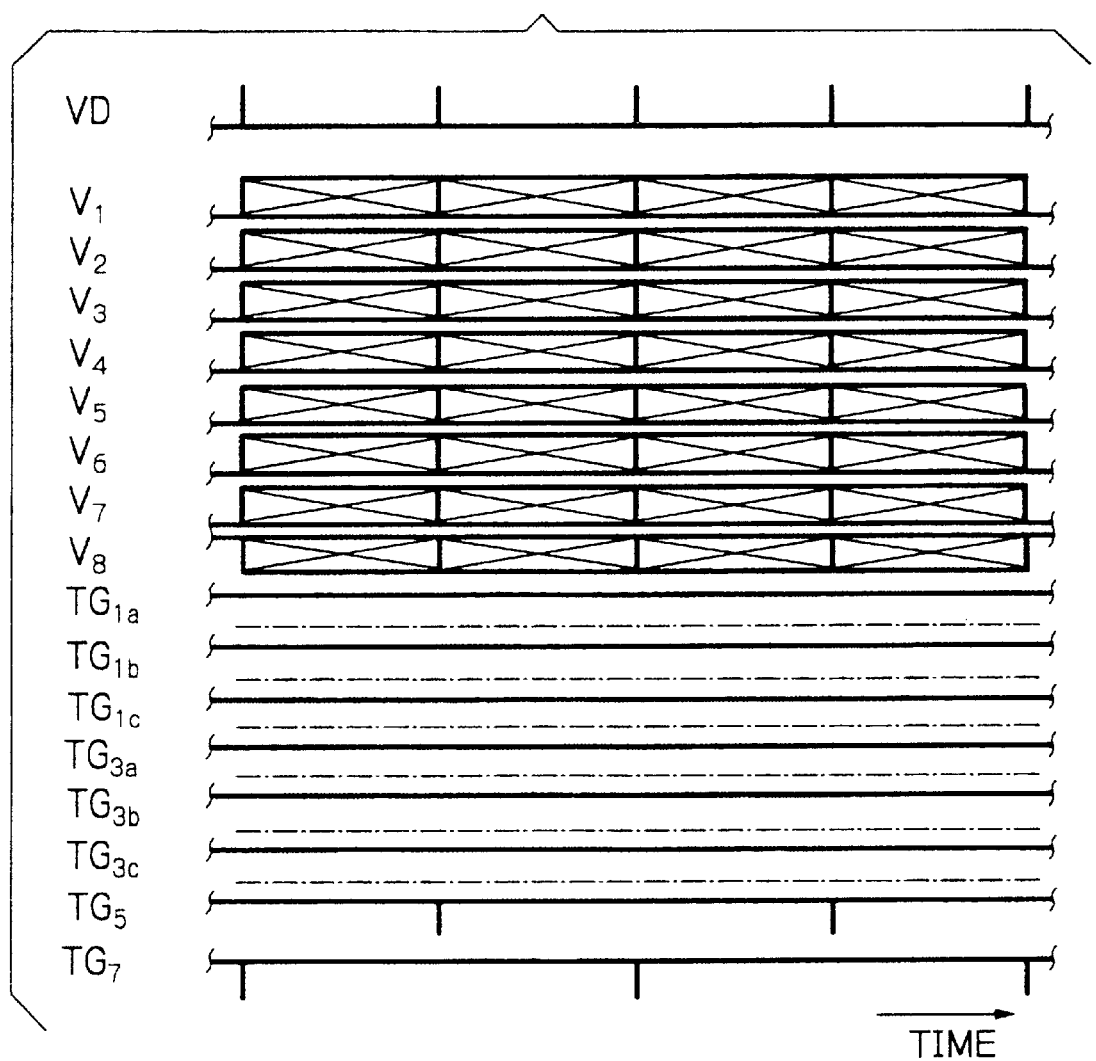
FIG. 47 is a timing chart showing the vertical drive timing signals and transfer gate pulses fed to the vertical synchronizing signal for effecting the procedure of FIGS. 46A and 46B.

FIGS. 46A through 49 demonstrate specific methods of reading the pixels of the image pickup 104 while subsampling them to one-half and available with the connection of the illustrative embodiment. As shown, assuming that four lines constitute a single group, the illustrative embodiment reads two lines of signal charges out of the image pickup 104 during the period of two fields and thereby effects subsampling to one-half. Because the color filter segments are arranged in the Bayer pattern, the GB and RG lines or the RG and GB lines are alternately read out in this order field by field. In the specific method shown in FIGS. 46A and 46B, the RG and GB lines are alternately read out. For this purpose, the transfer gate pulses TG$_7$ and TG$_5$ are fed to the driver 122 field by field, as shown in FIG. 47.

Figure 48A:
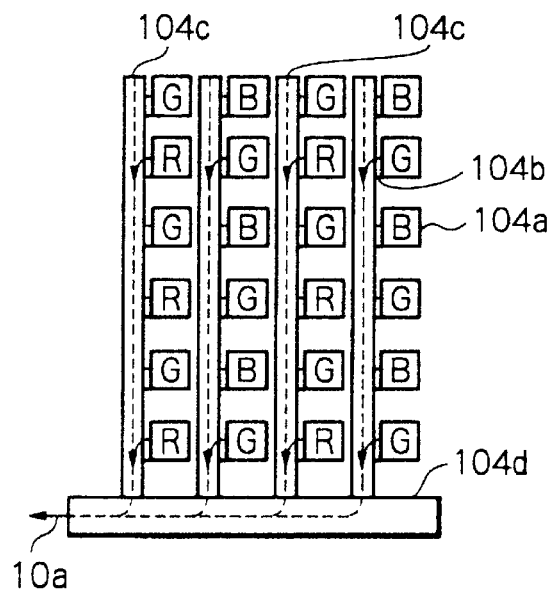
FIGS. 48A and 48B are diagrams similar to FIGS. 46A and 46B, but demonstrating another specific signal reading procedure.
Figure 48B:
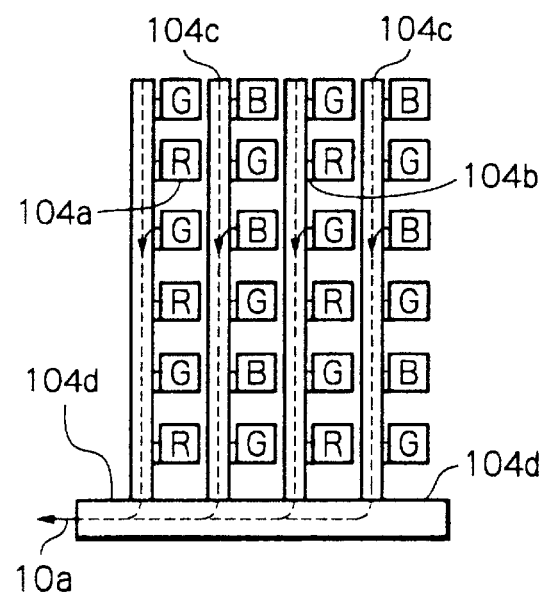
Figure 49:
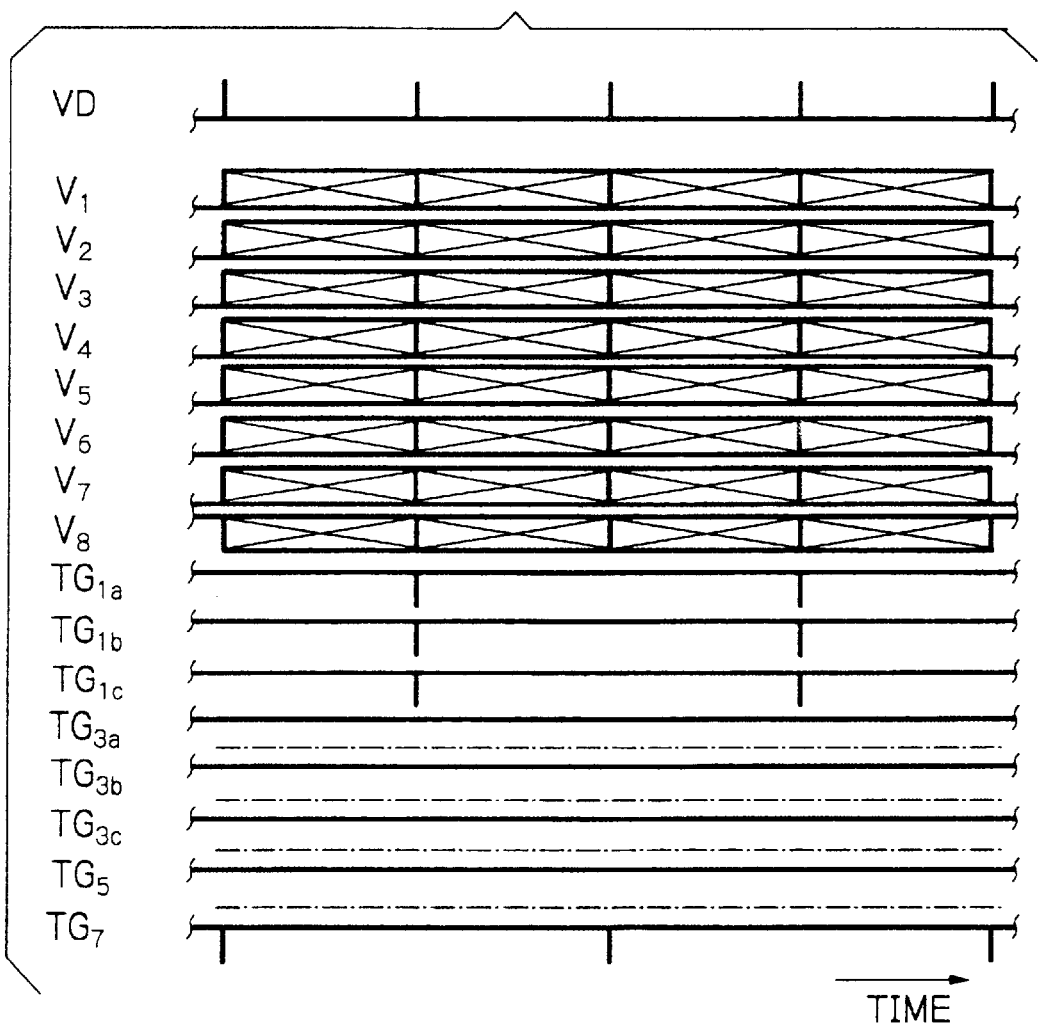
FIG. 49 a timing chart showing the vertical drive timing signals and transfer gate pulses fed to the vertical synchronizing signal for effecting the procedure of FIGS. 48A and 48B.

FIGS. 48A and 48B show another specific method of reading a signal while subsampling it to one-half vertically, such that all of the three primary colors R, G and B appear together. As shown in FIG. 49, three transfer gate pulses TG$_{1a}$, TG$_{1b}$ and TG$_{1c}$ are fed at the same time, and another transfer gate pulse TG$_7$ is used. As FIGS. 48A and 48B indicate, signals to be read out by this specific method are next to each other. Further, even when the transfer gate pulse TG$_5$ and the transfer gate pulses TG$_{3a}$, TG$_{3b}$ and TG$_{3c}$ are alternately fed field by field, subsampling to one-half is achievable in the whole frame if subsampling to one-fourth is repeated twice in each field, although not shown specifically.

Referring to FIGS. 50A trough 50C, some specific patterns in which the transfer gate pulses are fed for further increasing the degree of subsampling are listed. In the Bayer arrangement, all the rows contain the color G. The following description will therefore concentrate on the other colors R and B. In FIGS. 50A trough 50C, a column "COLOR" and columns "POSITION" respectively indicate the colors R and B and the labels attached to the vertical transfer devices to which the transfer gate pulses are applied. Columns "A" through "K" are respectively representative of patterns A through K in which the transfer gate pulses are fed; letters R and B are representative of positions where the transfer gate pulses are applied to read out signals.

Figure 51:
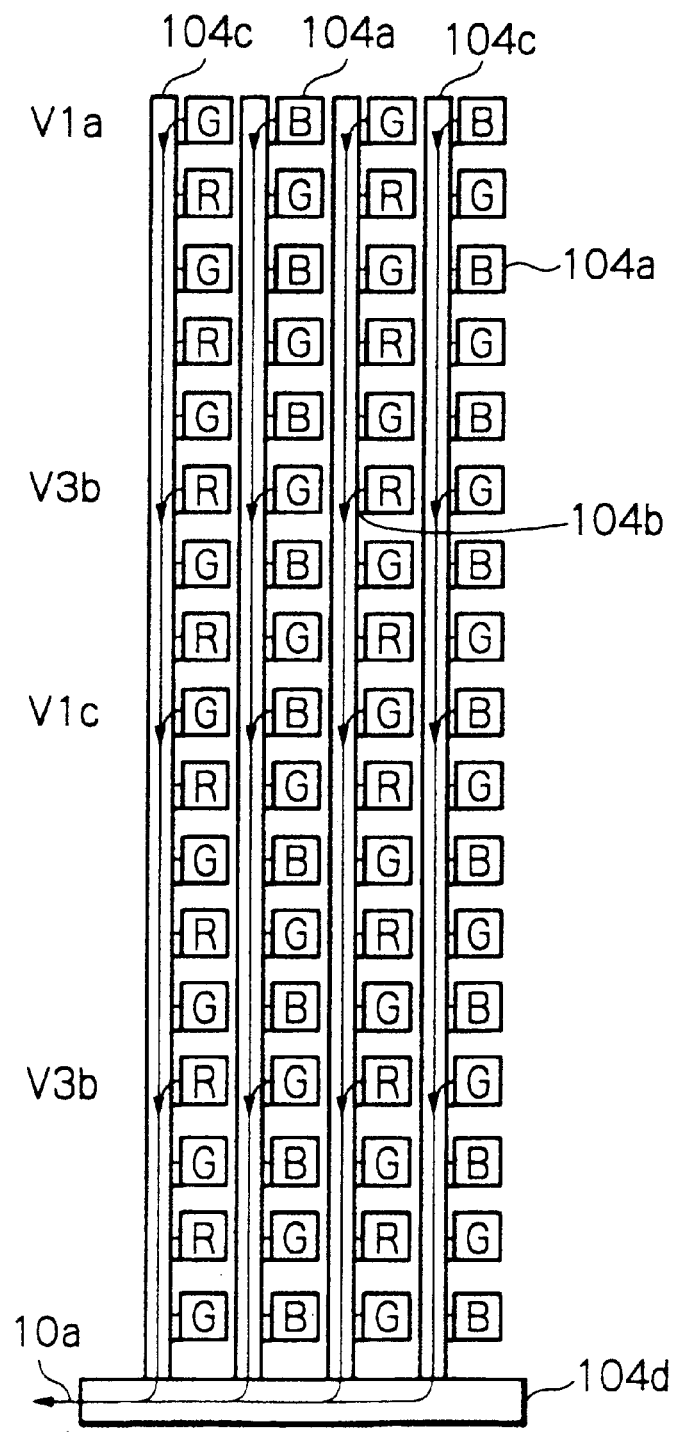
FIG. 51 is a diagram representative of a pattern A shown in FIG. 50A.
Figure 52:
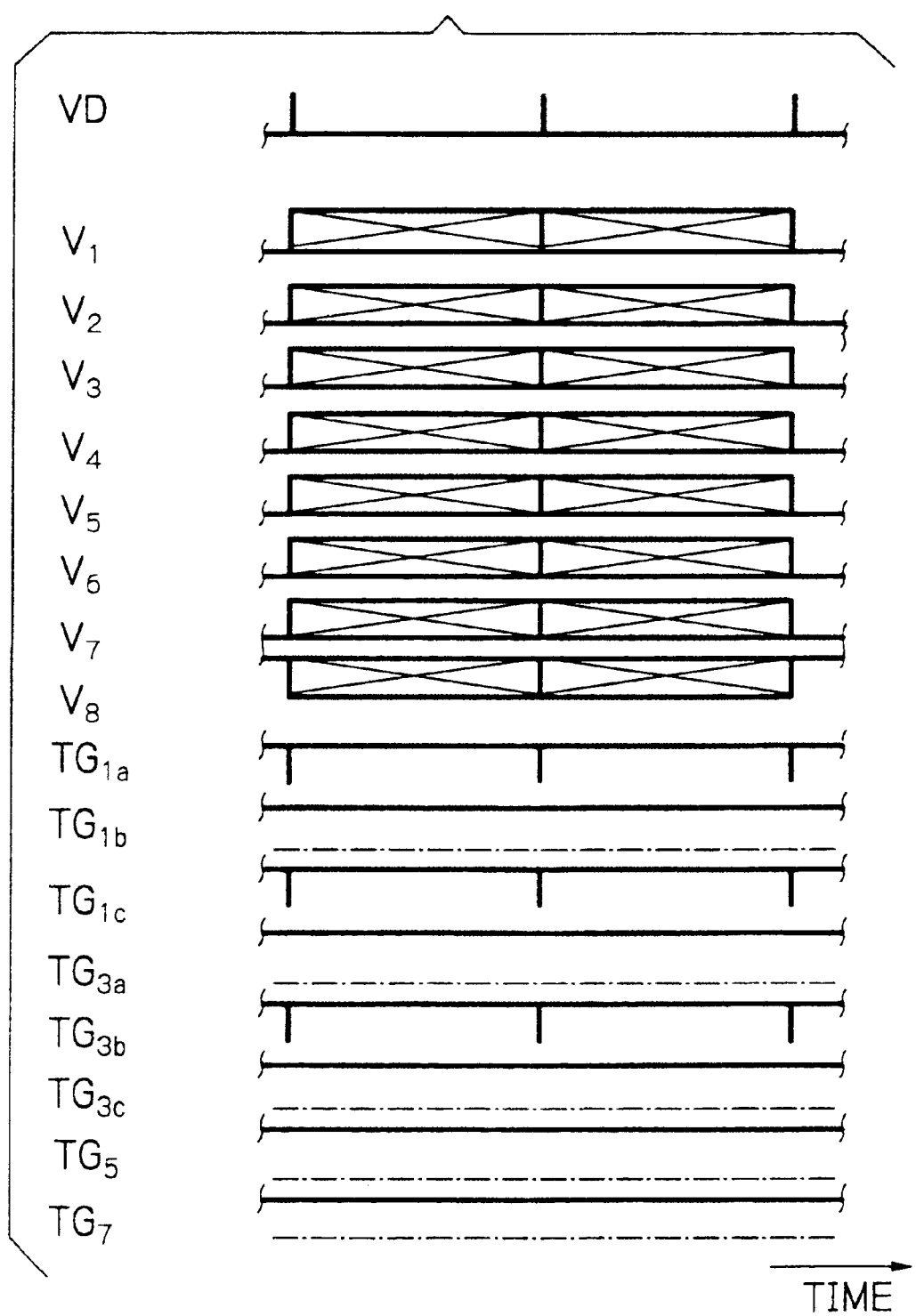
FIG. 52 is a timing chart showing the vertical drive timing signals and transfer gate pulses fed for the vertical synchronizing signal for effecting the procedure of FIG. 51.

In the pattern A, signal charges are read of the vertical transfer devices V1$a$, V1$c$ and V3$b$. Specifically, the color B is read out of the devices V1$a$ and V1$c$ while the color R is read out of the devices V3$b$. The same color is read out every eighth row. When signal charges are read out in the pattern A, the spatial distance between the colors R and B is only two rows. FIG. 51 demonstrates this signal reading procedure. As shown in FIG. 52, the transfer gate pulses $TG_{1a}$, $TG_{1c}$ and $TG_{3b}$ are fed to the driver 122 in synchronism with the vertical synchronizing signal VD. In response, the driver 122 delivers the vertical drive signals $\phi V_{1a}$, $\phi V_{1c}$ and $\phi V_{3b}$ to the image pickup 104 so as to effect desired subsampling to one-fourth.

Figure 53:
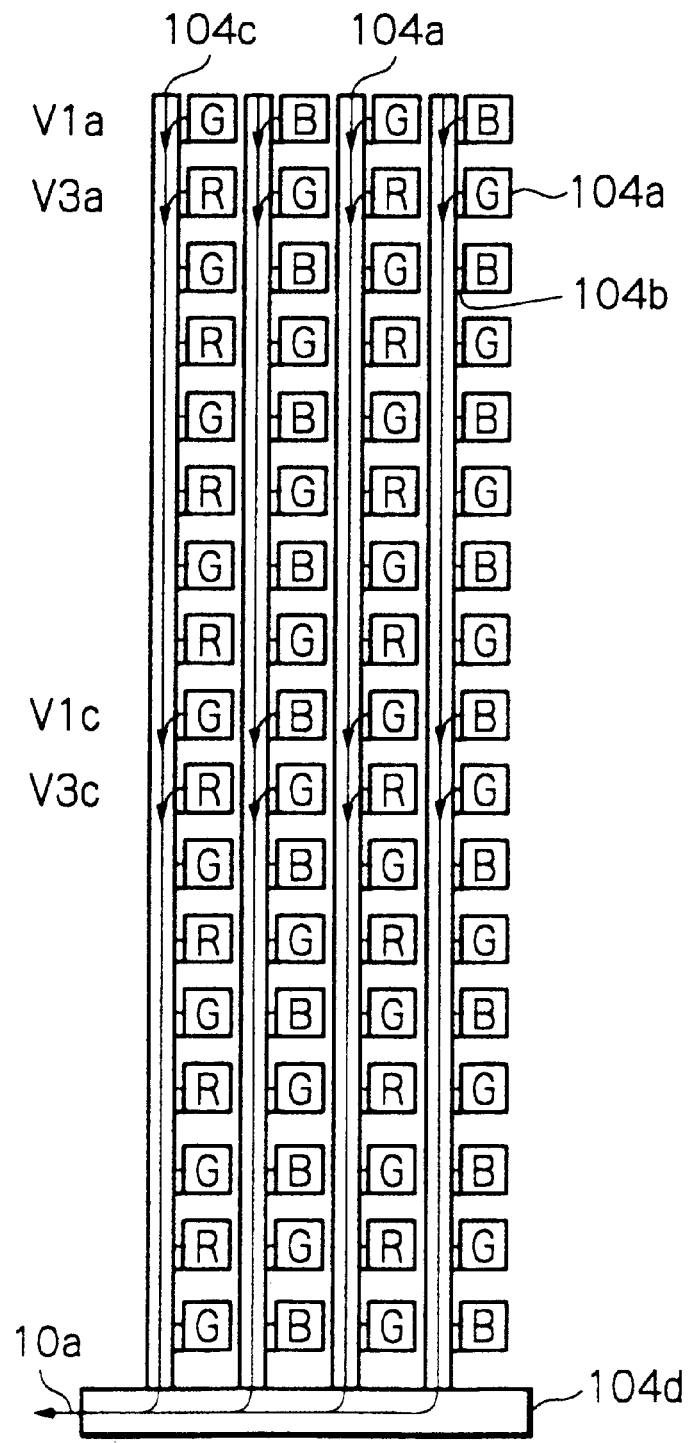
FIG. 53 is diagram representative of a pattern B shown in FIG. 50A.
Figure 54:
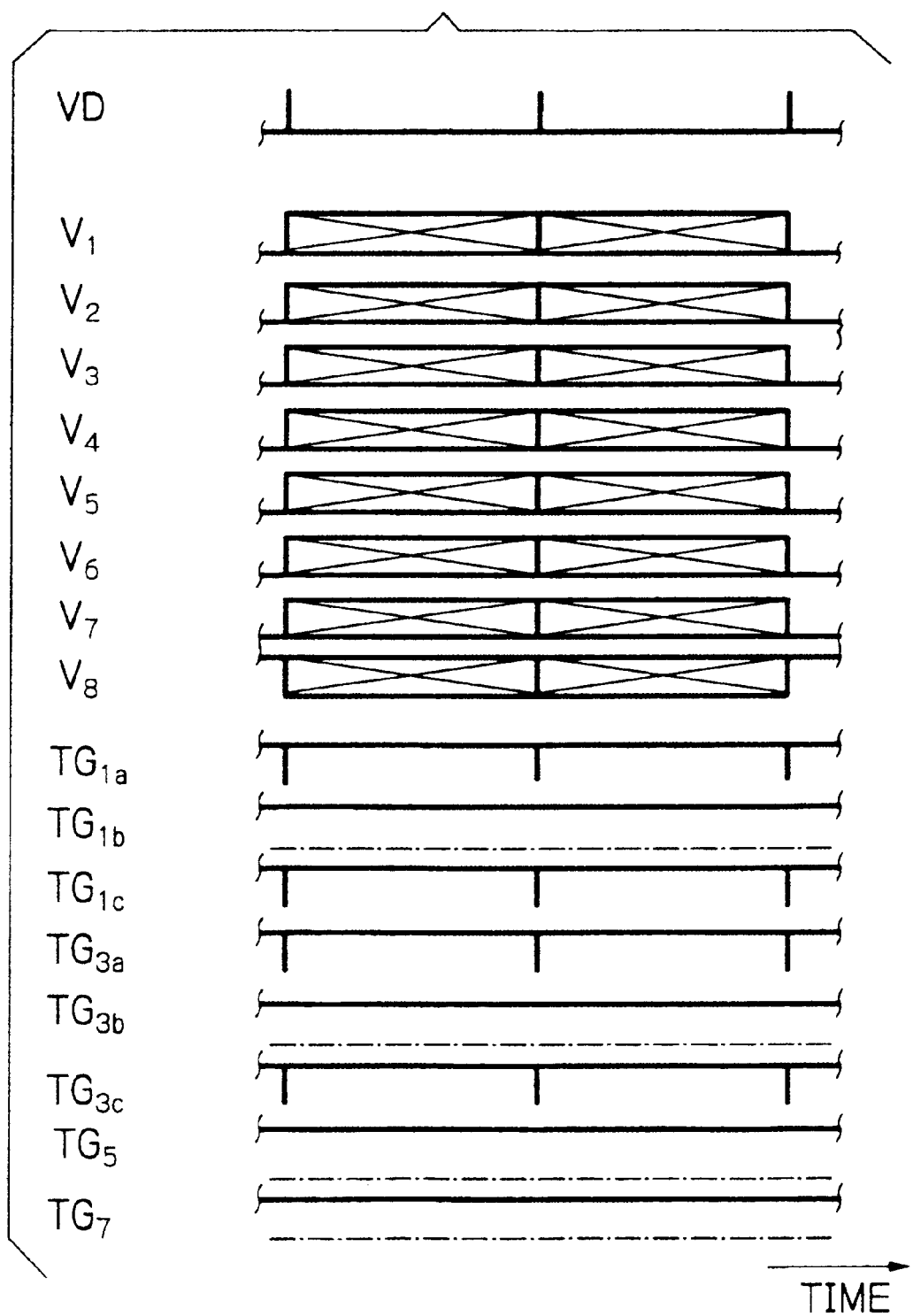
FIG. 54 is a timing chart showing the vertical drive timing signals and transfer gate pulses fed to the vertical synchronizing is signal for effecting the procedure of FIG. 53.

In the pattern B, signal charges are read out of the vertical transfer devices V1c, V1c, V3a and V3c. Specifically, the color B is read out of the devices V1a and V1c in the same manner as in the pattern A. The color R is read out of the elements V3a and V3c. Again, the same color is read out every eighth row. This is because when the variable i is 2, the read-out interval is represented by $2^{i+1}-1=2^3-1=7$. It follows that when the variant i is 2, subsampling to one-fourth ($\frac{1}{2}^2$) is effected. With the pattern B, it is possible to read signal charges without any spatial distance between the colors R and B. FIG. 53 demonstrates the signal reading procedure based on the pattern B. As shown in FIG. 54, the transfer gate pulses $TG_{1a}$, $TG_{1c}$, $TG_{3a}$ and $TG_{3c}$ are fed to the driver 122 in synchronism with the vertical synchronizing signal VD. In response, the driver 122 delivers the vertical drive signals $\phi V_{1a}$, $\phi V_{1c}$, $\phi V_{3a}$ and $\phi V_{3c}$ to the image pickup 104 so as to effect desired subsampling to one-fourth.

Figure 55:
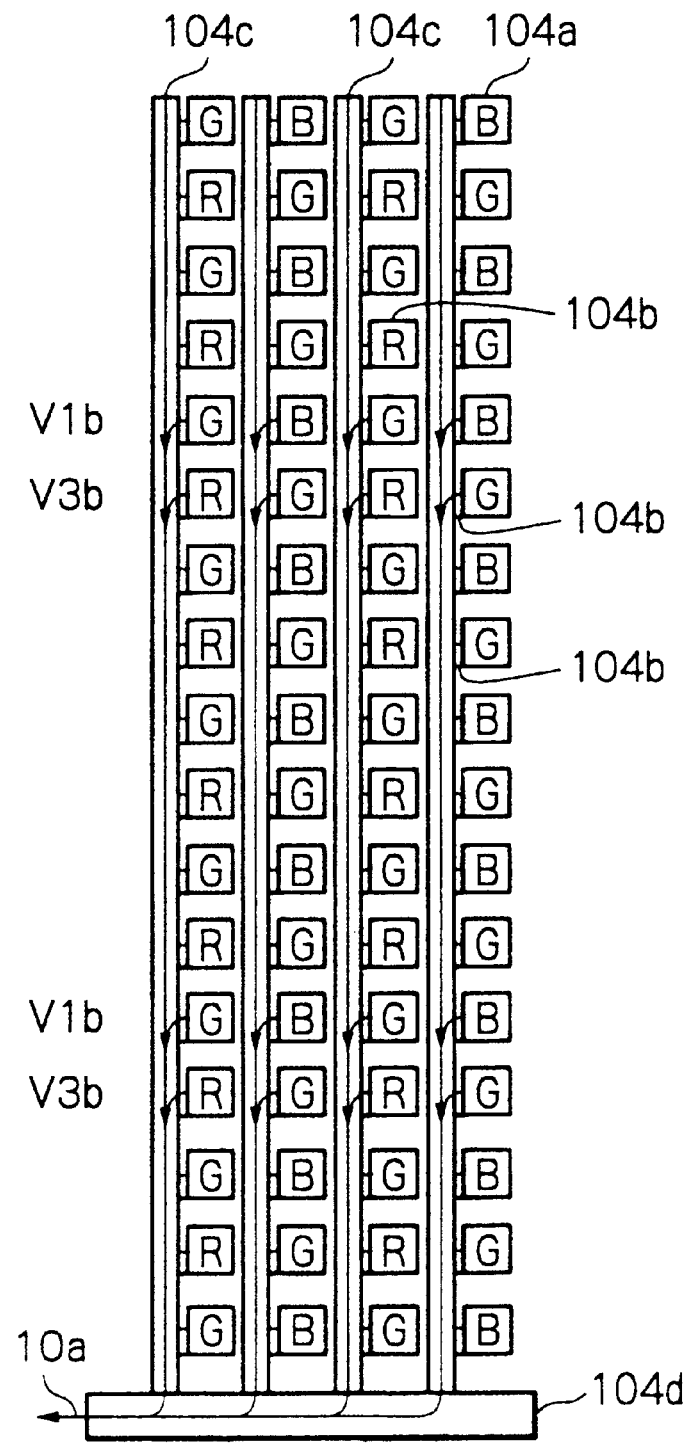
FIG. 55 is a diagram representative of a pattern C shown in FIG. 50A.
Figure 56:
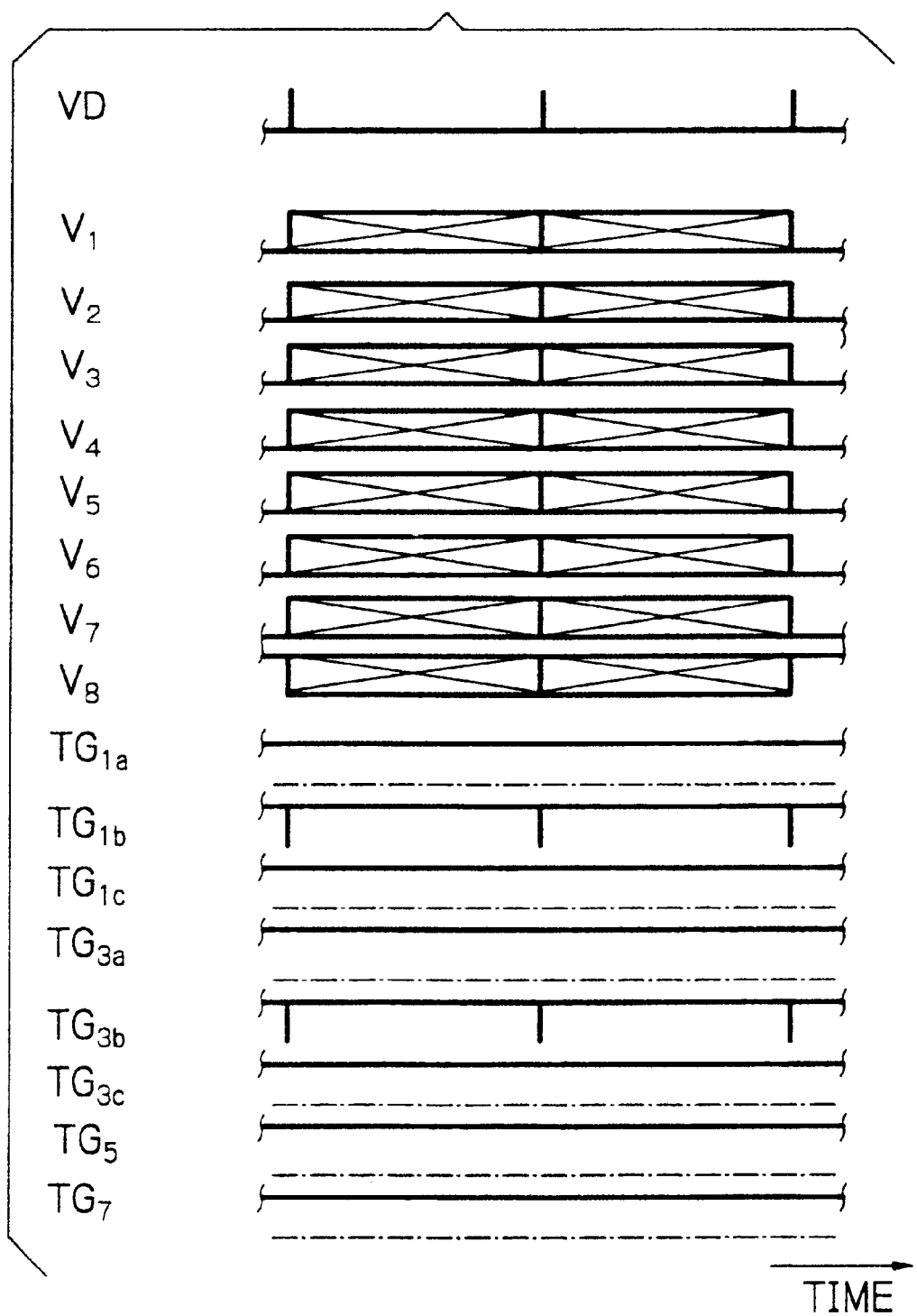
FIG. 56 is a timing chart showing the vertical drive timing signals and transfer gate pulses fed to the vertical synchronizing signal for effecting the procedure of FIG. 55.

In the pattern C, signal charges are read out of the vertical transfer devices V1b and Vs.b. Specifically, the color B is read out of the devices V1b in the same manner as in the pattern A. The color R is read out of the devices V3b. The same color is also read out every eighth row. The pattern C is therefore identical with the pattern B except that the read start point is lowered by four lines. FIG. 55 demonstrates the signal reading procedure based on the pattern C. As shown in FIG. 56, the transfer gate pulses $TG_{1b}$ and $TG_{3b}$ are fed to the driver 122 in synchronism with the vertical synchronizing signal VD. In response, the driver 122 delivers the vertical drive signals $\phi V_{1b}$ and $\phi V_{3b}$ to the image pickup 104 so as to effect desired reduction to one-fourth.

Figure 57A:
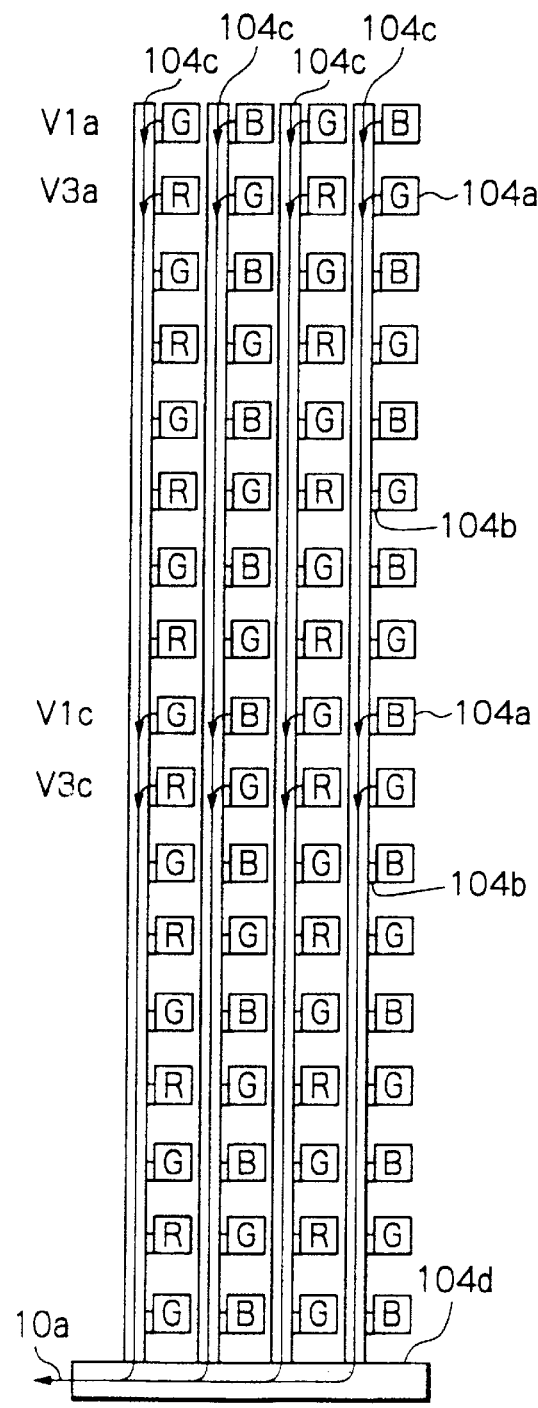
FIGS. 57A and 57B are diagrams showing how the patterns B and C are alternatively used field by field for effecting 2:1 interlacing.
Figure 57B:
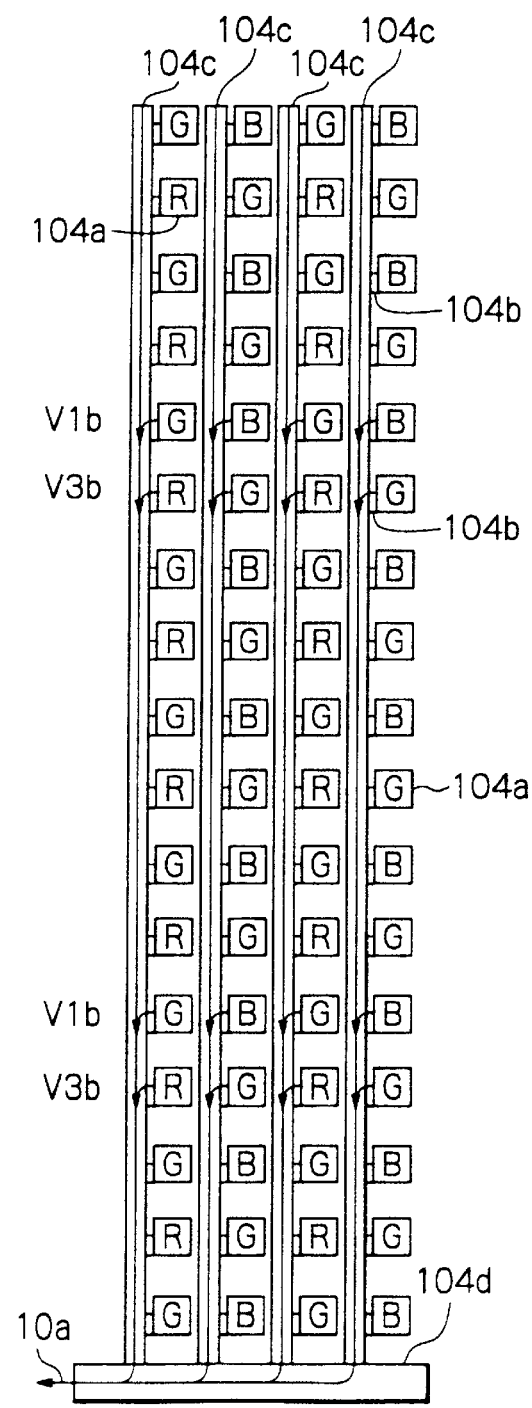
Figure 58:
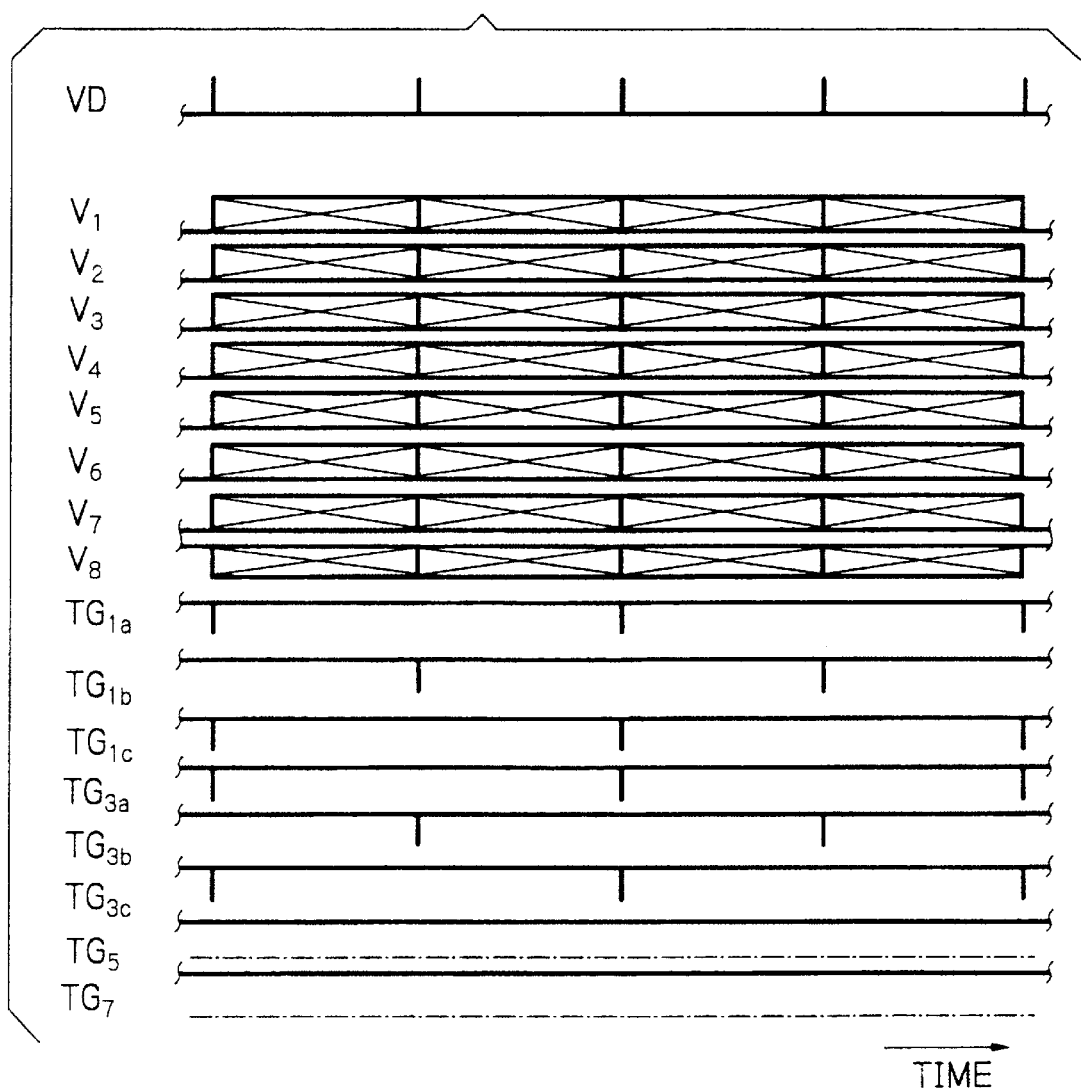
FIG. 58 is a timing chart showing the vertical drive timing signals and transfer gate pulses fed to the vertical synchronizing signal for effecting the procedure of FIGS. 57A and 57B.
Figure 59:
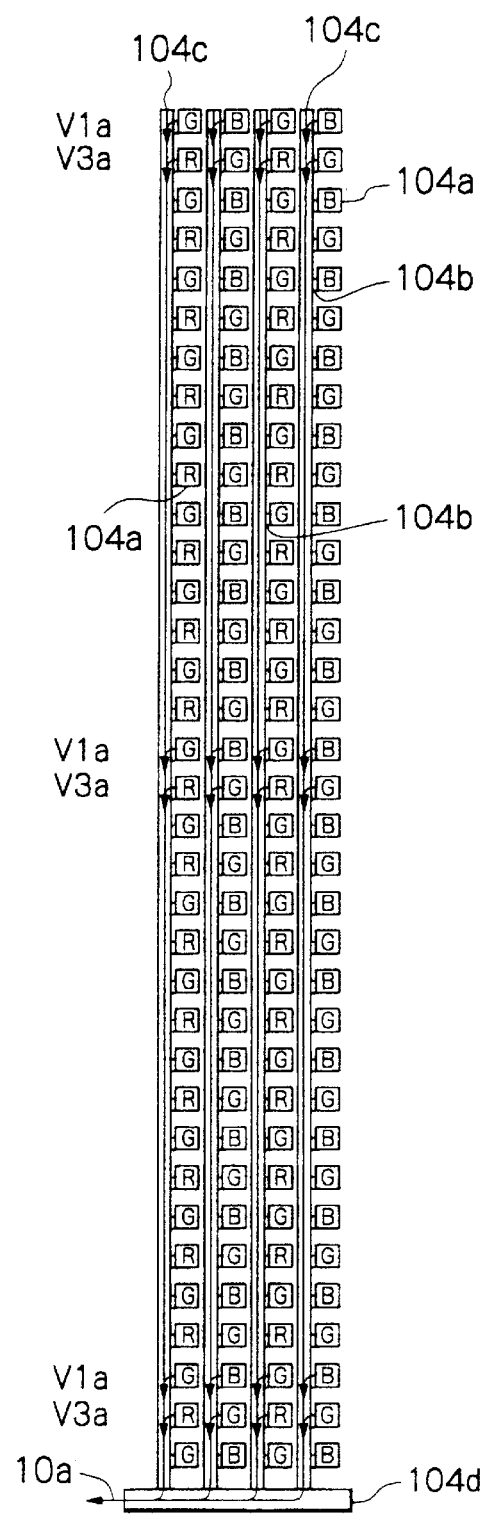
FIG. 59 is a diagram representative of a pattern D shown in FIG. 50A.

The above patterns B and C may be effected in combination, if desired. Specifically, the patterns B and C shown in FIGS. 57A and 57B may be alternately effected field by field. As shown, signal charges are read out of two adjoining lines in each of the patterns B and C. After signal charges have been read out of two lines in one field, signal charges are read out of two lines positioned at the center of the previous field in the next field (2:1 interlacing). This relation is clearly shown in FIG. 58. Subsampling to one-fourth is executed in each of the two fields, as stated earlier. While 2:1 interlacing halves the number of lines that can be read out, compared to four-field interlacing stated previously, it is successful to halve the reading time. This kind of scanning is achievable with the connection of signal lines corresponding to the patterns B and C.

Figure 60:
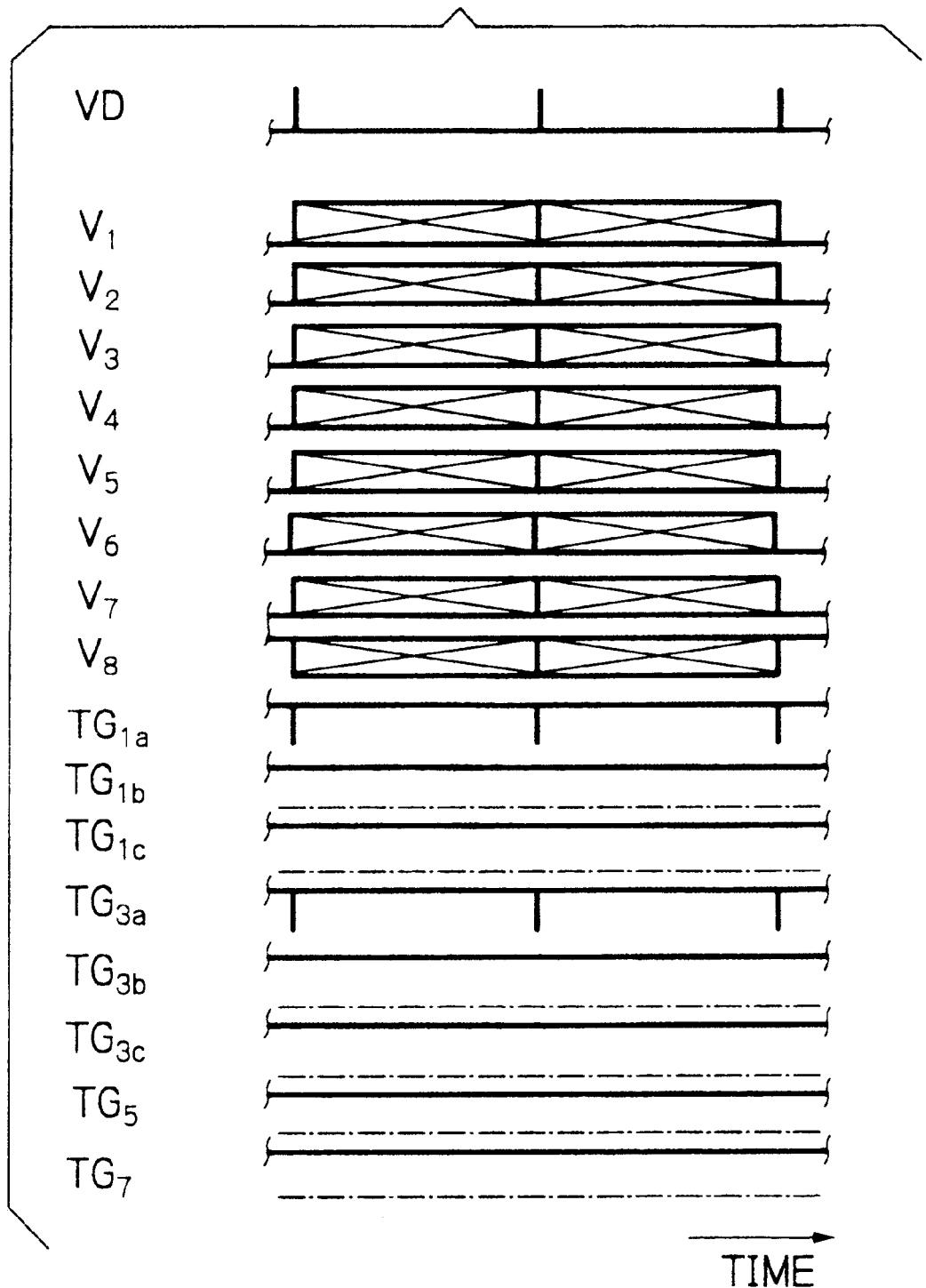
FIG. 60 is a timing chart showing the vertical drive timing is signals and transfer gate pulses fed to the vertical synchronizing signal for effecting the procedure of FIG. 59.

In the pattern D, signal charges are read out of the vertical transfer devices V1a and V3a. Specifically, the color B is read out of the devices V1a while the color R is read out of the devices V3a. In this case, the same color is read out every sixteenth row. This is because when the variable i is 3, the read-out interval is represented by $2^{i+1}-1=2^4-1=15$. It follows that when the variable i is 3, subsampling to one-eighth ($\frac{1}{2}^3$) is effected. With the pattern D as stated the previous embodiment, it is possible to produce the colors R and B from adjoining rows. Because two of sixteen lines are read out during the period of a single field, one-eighth of the total number of pixels is read out (subsampling to one-eighth) This is not practicable with the conventional image pickup. As shown in FIG. 60, the transfer gate pulses $TG_{1a}$ and $TG_{3a}$ are fed to the driver 122 in synchronism with the vertical synchronizing signal VD. In response, the driver 122 delivers the vertical drive signals $\phi V_{1a}$ and $\phi V_{3a}$ to the image pickup 104 so as to effect desired subsampling to one-eighth.

Figure 61:
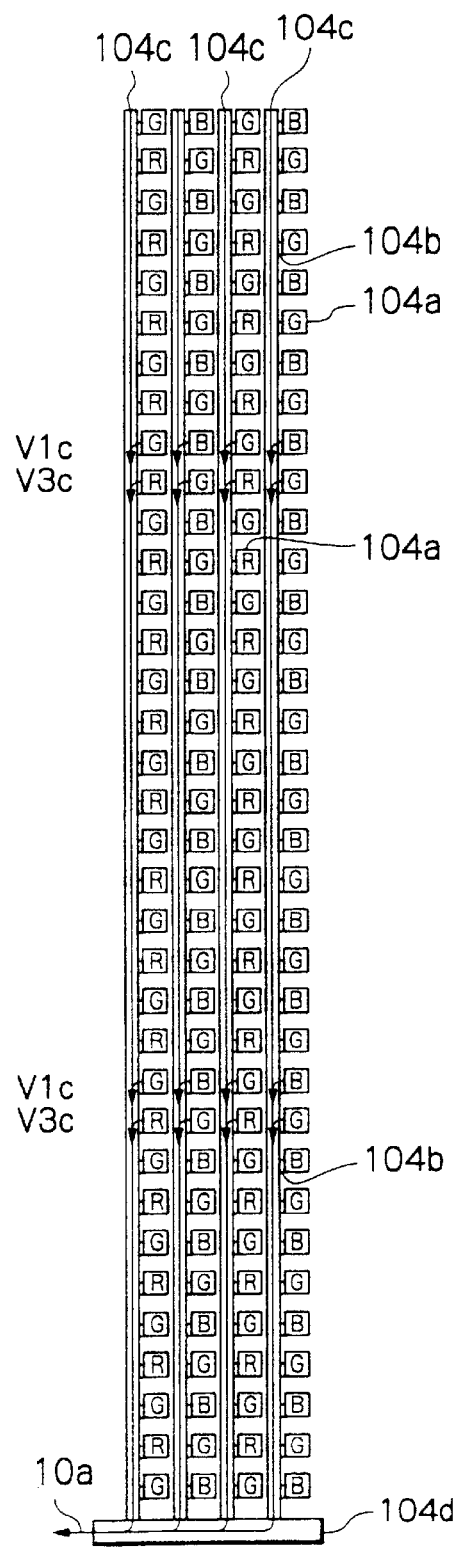
FIG. 61 is a diagram representative of a pattern E shown in FIG. 50A.
Figure 62:
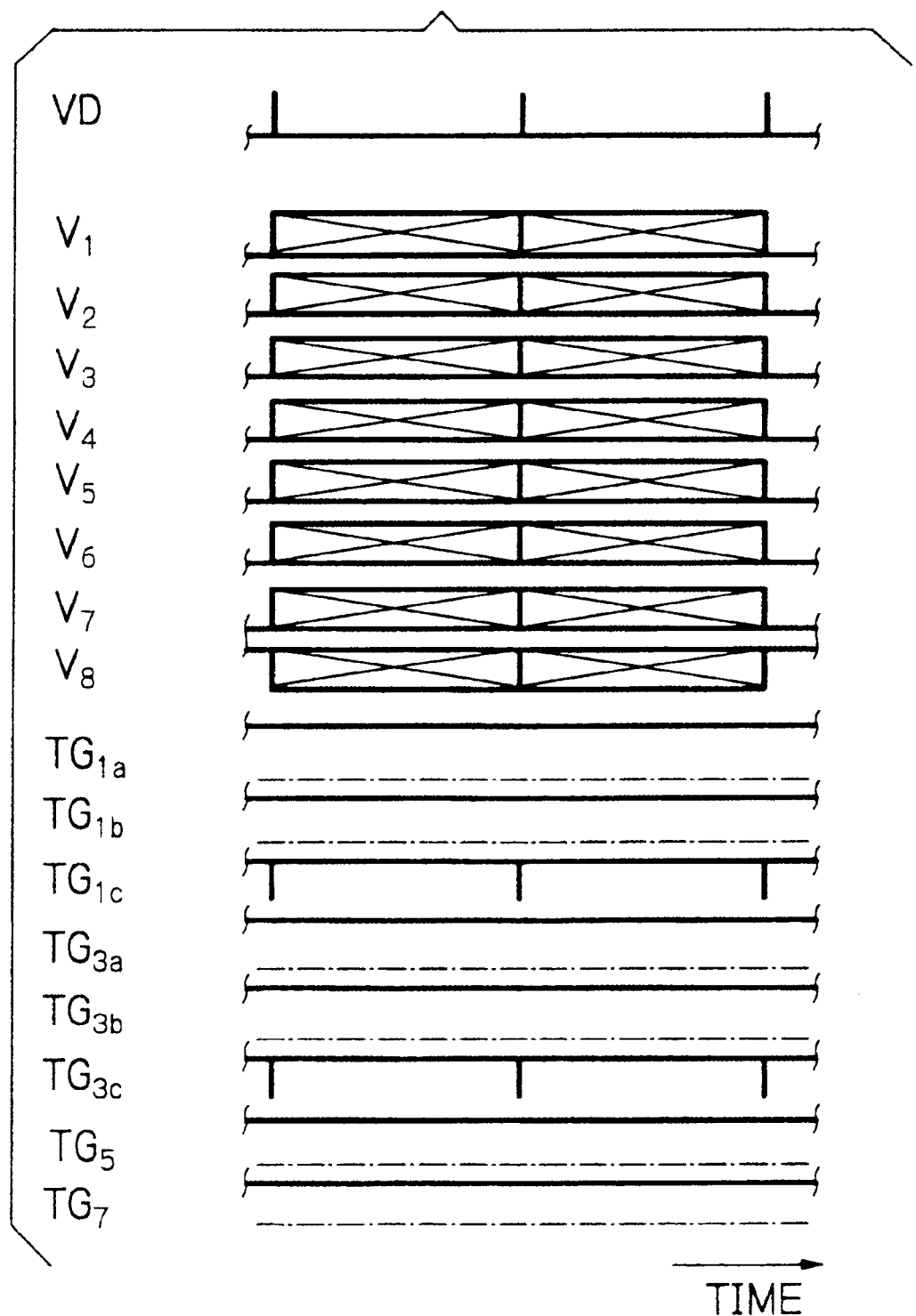
FIG. 62 is a timing chart showing the vertical drive timing signals and transfer gate pulses fed to the vertical synchronizing signal for effecting the procedure of FIG. 61.

The pattern E is an alternative to the above pattern D for subsampling to one-eighth and causes signal charges to be read out of the vertical transfer devices V1c and V3c. As shown in FIG. 61, in the pattern E, the same color appears every sixteenth row. The transfer gate pulses $TG_{1c}$ and $TG_{3c}$ are fed to the driver 122 in synchronism with the vertical synchronizing signal VD, as shown in FIG. 62. In response, the driver 122 delivers the vertical drive signals $\phi V_{1c}$ and $\phi V_{3c}$ to the image pickup 104 so as to execute subsampling to one-eighth.

Figure 63:
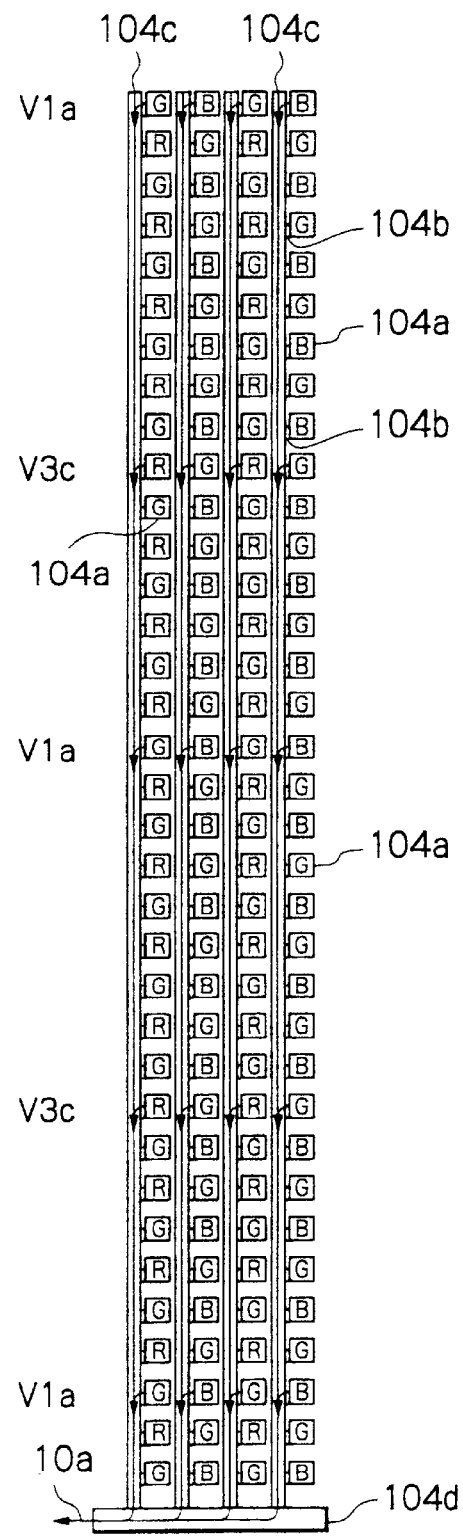
FIG. 63 is a diagram representative of a pattern F shown in FIG. 50A.
Figure 64:
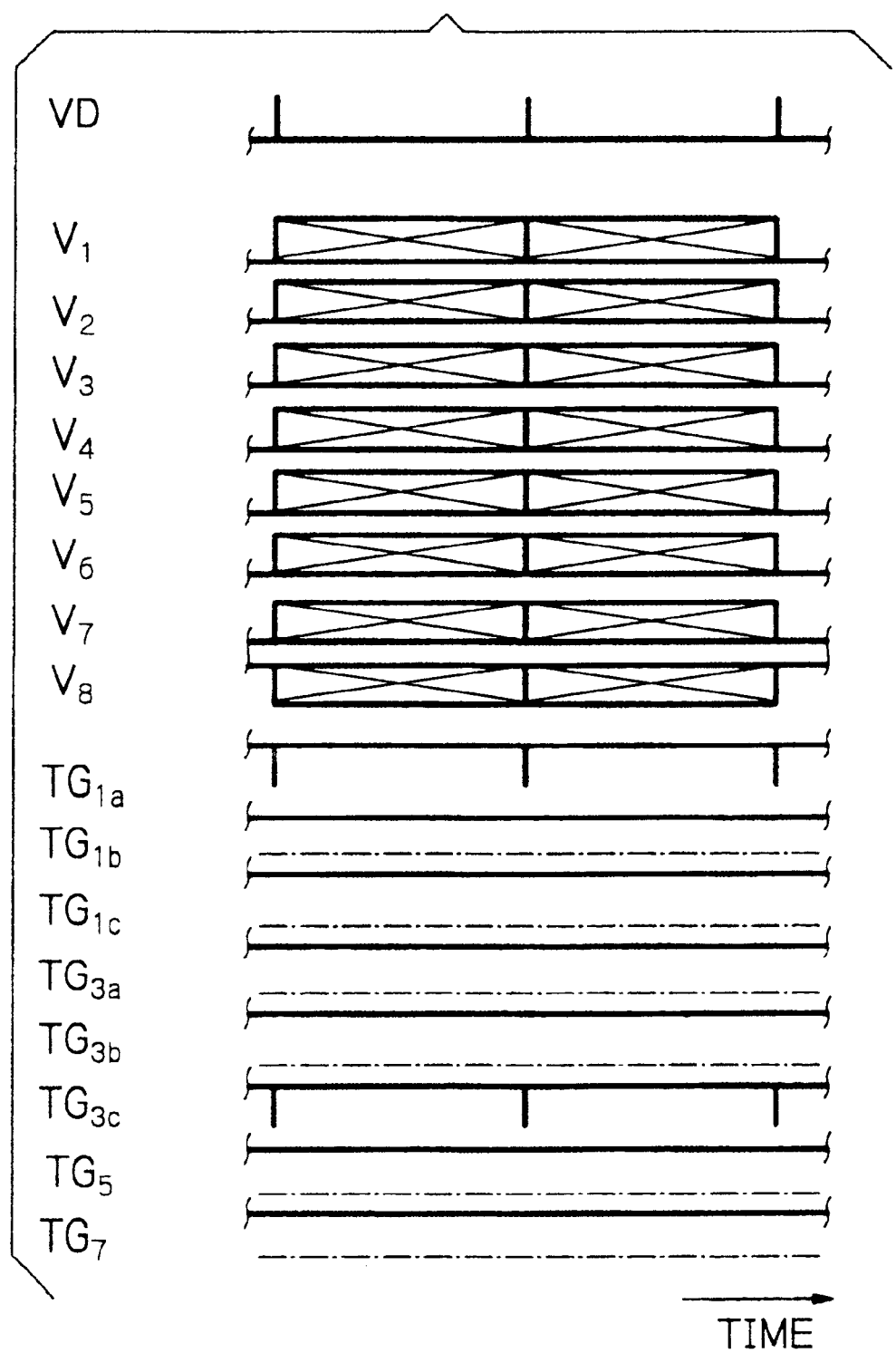
FIG. 64 is a timing chart showing the vertical drive timing signals and transfer gate pulses fed to the vertical synchronizing signal for effecting the procedure of FIG. 63.

The pattern F is another alternative to the pattern D for subsampling to one-eighth. FIG. 63 shows lines to be read and corresponding to the positions of FIG. 50A where the transfer gate pulses are fed. Specifically, as shown in FIG. 64, the transfer gate pulses $TG_{1a}$ and $TG_{3c}$ are fed to the driver 122. Among the vertical drive signals $\phi V_n$ derived from the above signals and vertical drive timing signal $V_n$, the vertical drive signals $\phi V^{1a}$ and $\phi V_{3c}$ each contain a signal for enabling the read-out of signal charges. In this manner, the pattern F also implements subsampling to one-eighth.

Figure 65A:
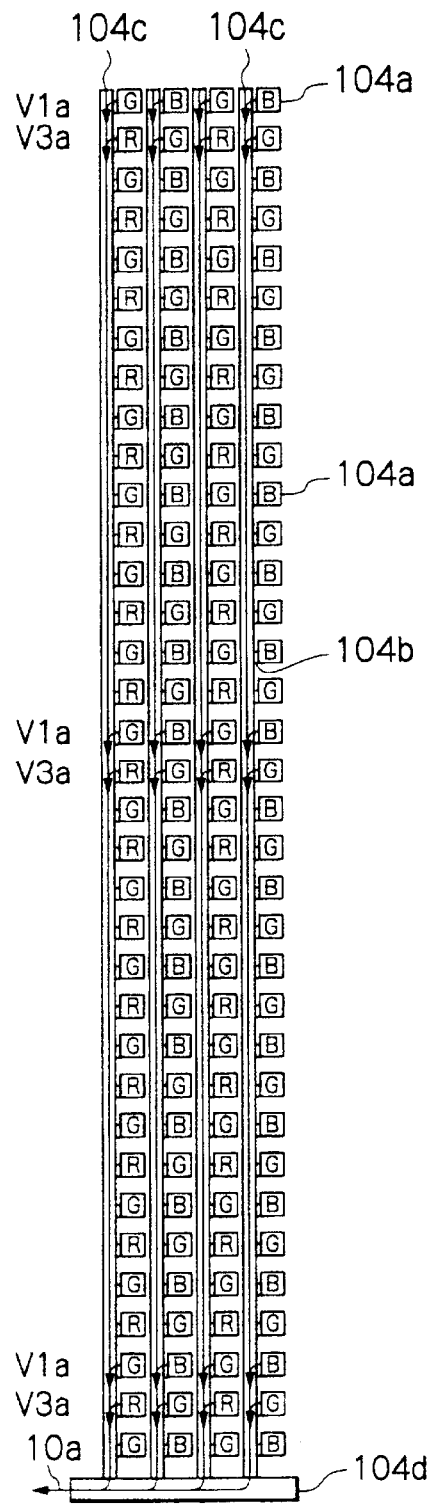
FIGS. 65A and 65B are diagrams showing how the patterns E and F are alternatively used field by field for effecting 2:1 interlacing.
Figure 65B:
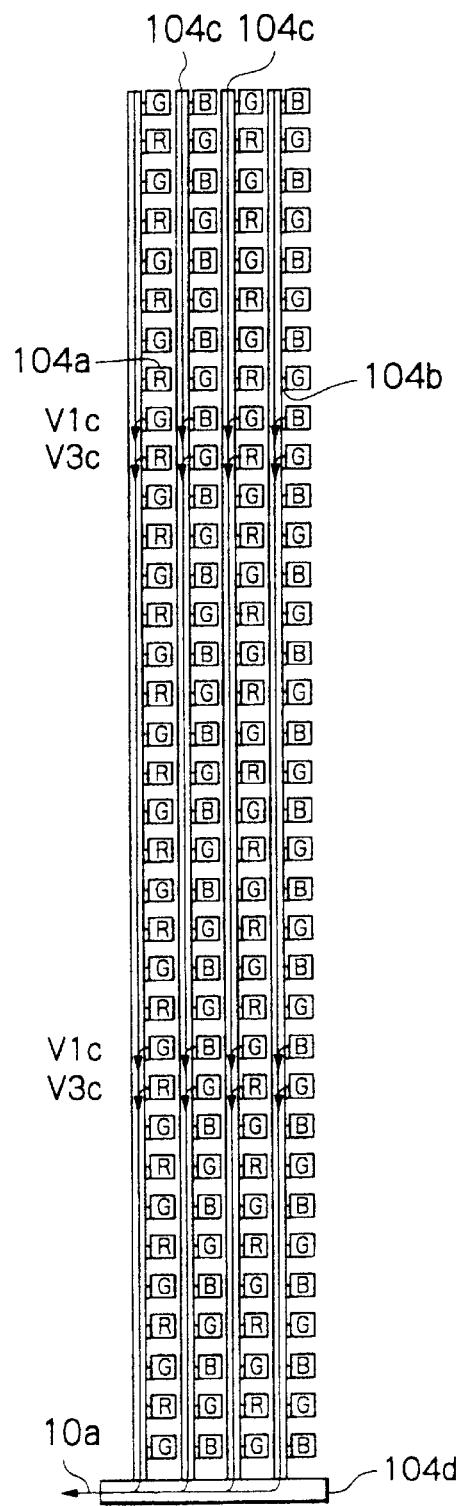
Figure 66:
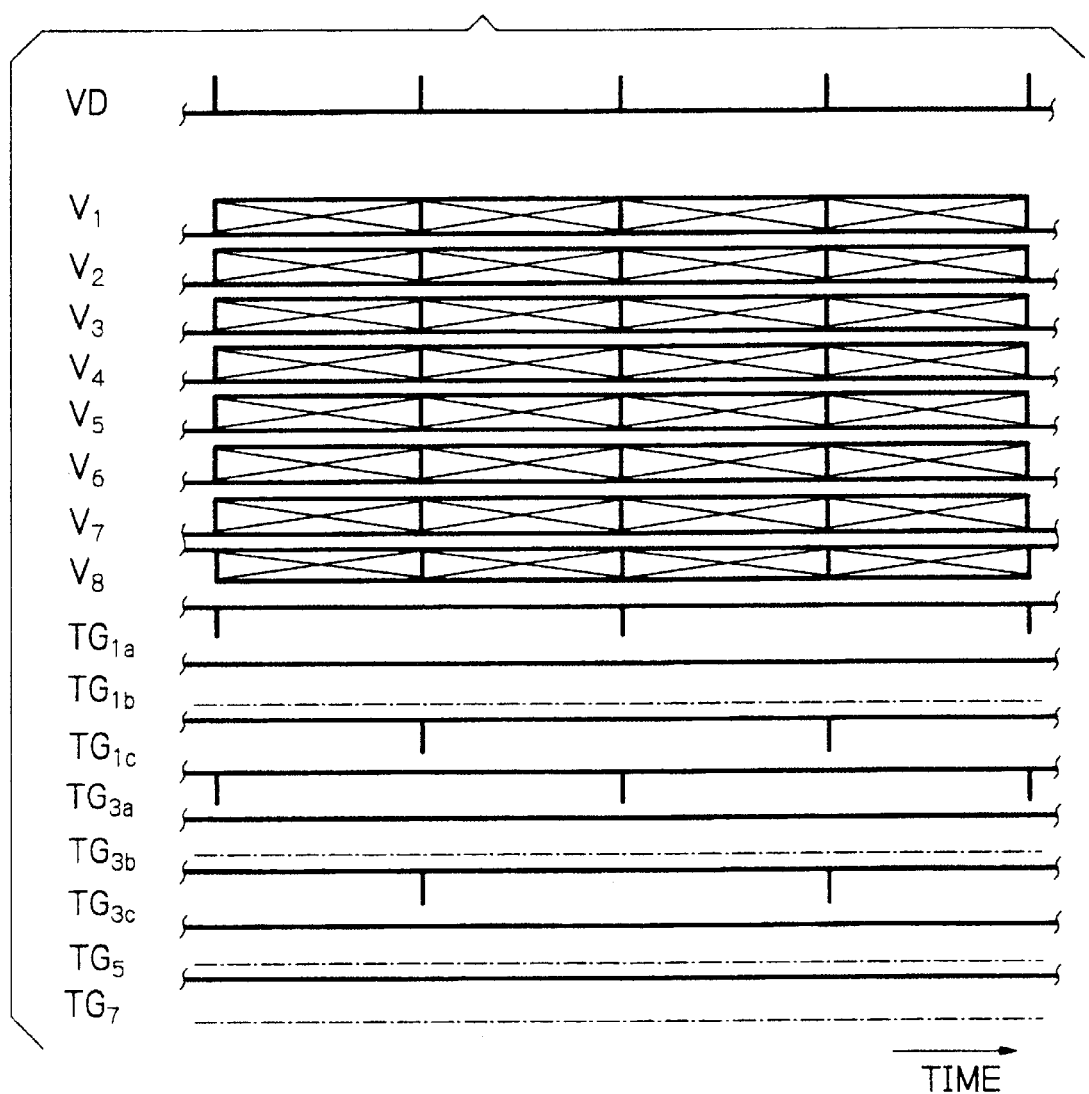
FIG. 66 a timing chart showing the vertical drive timing signals and transfer gate pulses fed to the vertical synchronizing signal for effecting the procedure of FIGS. 65A and 65B.

If desired, the patterns D and E may be combined to execute the previously stated 2:1 interlacing for subsampling to one-eighth. In this case, the patterns D and E are respectively assigned to the first field and second field, as shown in FIGS. 65A and 65B. For this purpose, as shown in FIG. 66, the transfer gate pulses $TG_{1a}$ and $TG_{3a}$ and transfer gate pulses $TG_{1c}$ and $TG_{3c}$ are fed to the driver 122. In response, the driver 122 delivers the vertical drive signals $\phi V_{1a}$ and $\phi V_{3a}$ and vertical drive signals $\phi V_{1c}$ and $\phi V_{3c}$ each containing particular one of the above transfer gate pulses alternatively field by field in synchronism with the vertical synchronizing signal VD.

As stated above, by executing vertical drive in consideration of the relation between the vertical drive signals $\phi V_n$ and the connection of signal lines, it is possible to effect not only subsampling to one-half and to one-fourth, but also subsampling to one-eighth.

Modifications of the illustrative embodiment will be described hereinafter. The illustrative embodiment includes twelve electrodes each being as signed to a particular kind of vertical drive signals to be fed to the image pickup 104, as stated earlier. This, however, requires the driver 122 to include a number of V drivers for generating the vertical drive signals. A number of V drivers would occupy a substantial mounting area and would thereby make the driver 122 and therefore the entire digital still camera 10 bulky. A first modification of the illustrative embodiment realizes smooth subsampling with a minimum number of V drivers, as will be described with reference to FIG. 67.

Figure 67:
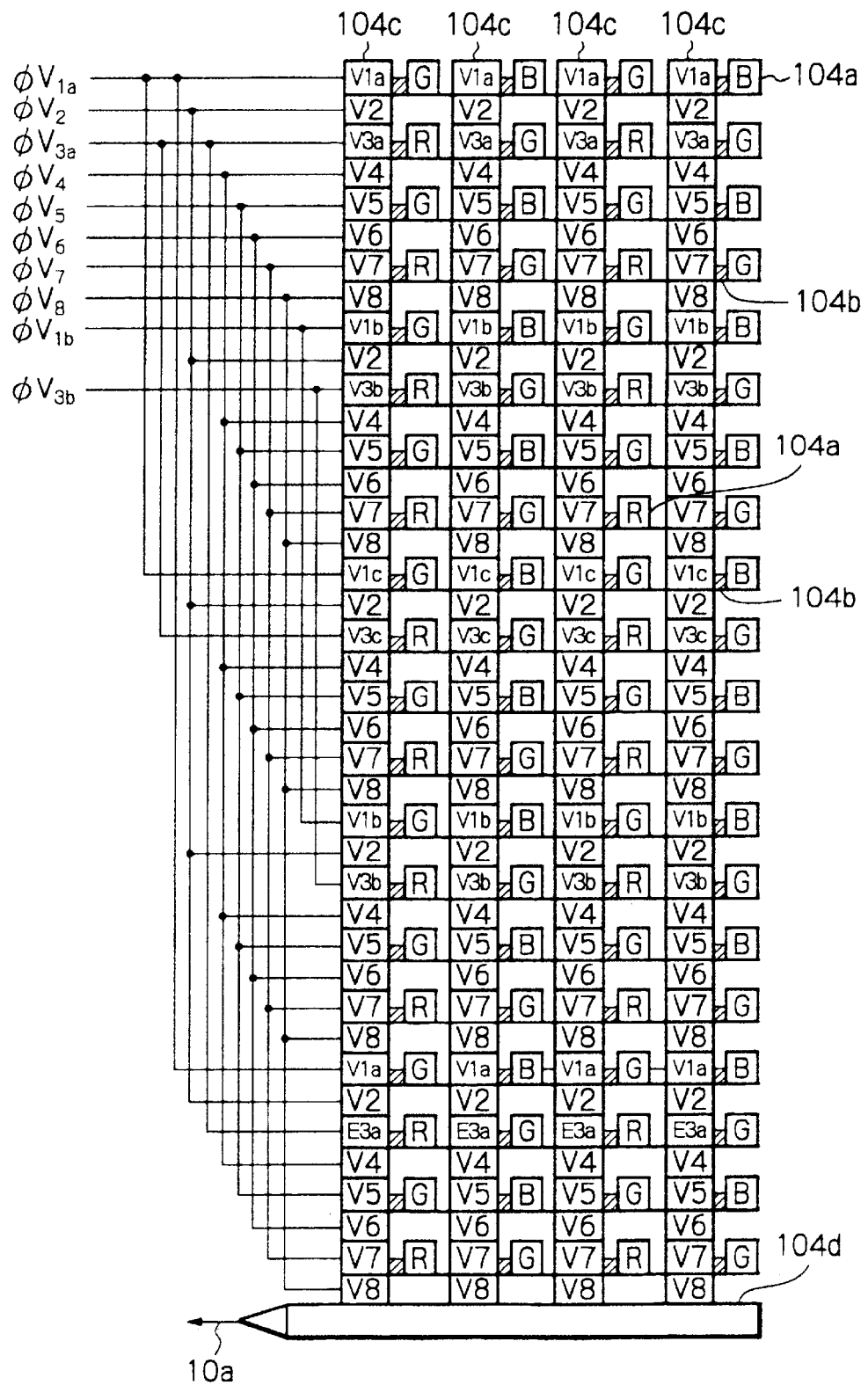
FIGS. 67 through 69 are diagrams respectively showing a first to a third modification of the alternative embodiment.

As shown in FIG. 67, the vertical drive electrodes V1a and V1c of the image pickup 104 are connected together while the vertical electrodes V3a and V3c are connected together. This connection is added to the connection of the illustrative embodiment and may be effected at the out side of the image pickup 104, if desired. The modification therefore reduces the number of the kinds of vertical pulses to ten. Because a particular kind of vertical drive signals are applied to each electrodes connected together, the vertical drive signals $\phi V_{1c}$ and $\phi V_{3c}$ applied to the vertical drive electrodes V1c and V3c in the illustrative embodiment are not necessary. This, however, prevents the electrodes V1c and Vs.c from being driven individually and makes subsampling to one-eight impracticable. Any one of the drive patterns G, H and I shown in FIG. 50B and corresponding to the patterns A, B and C, respectively, is applicable to this modification. While the connection shown in FIG. 67 limits the field-by-field subsampling to one-fourth, it successfully reduces the overall size of the camera 10 and allows the camera 10 to readily effect subsampling up to one-fourth.

Figure 68:
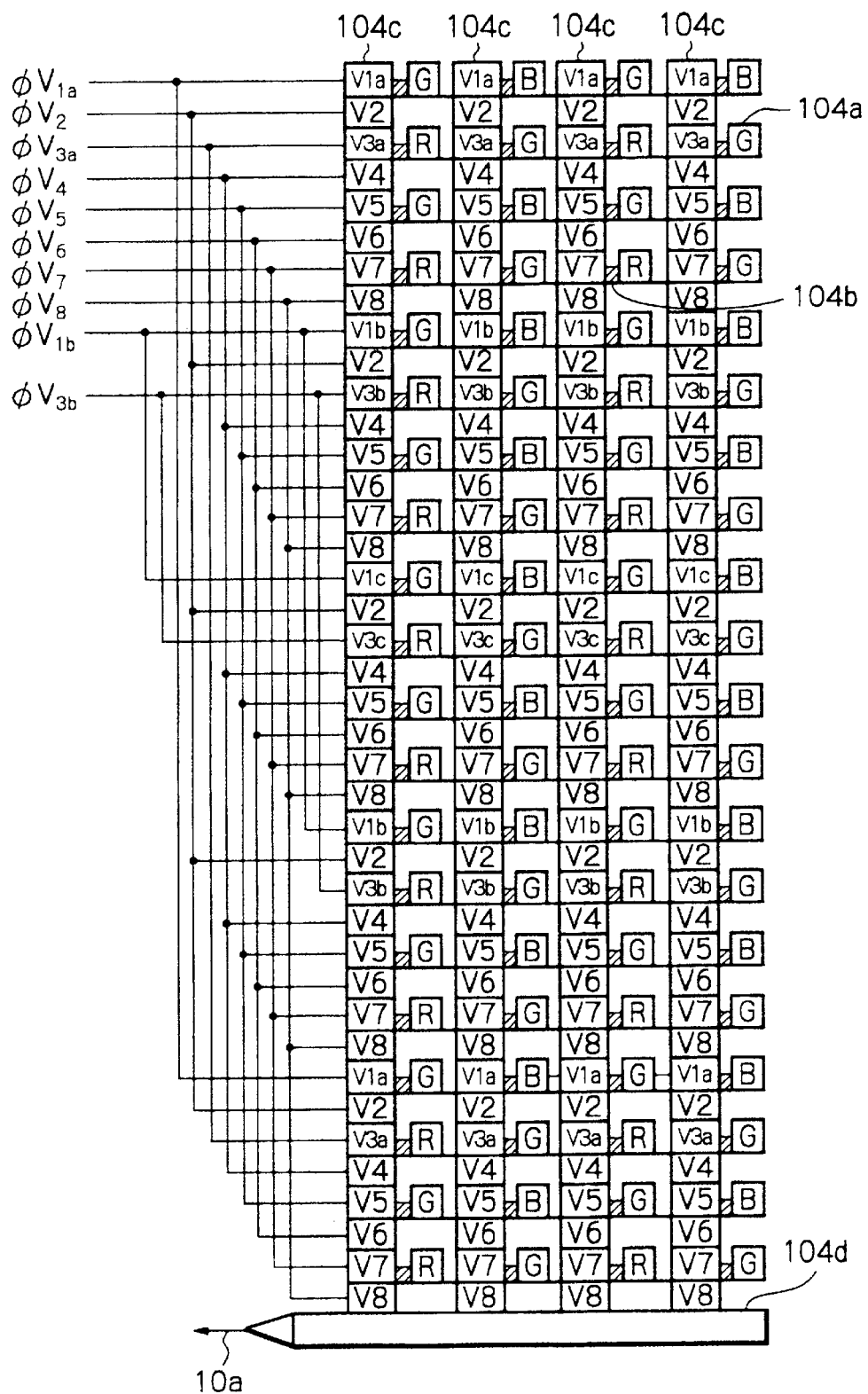

FIG. 68 shows a second modification of the illustrative embodiment. As shown, the vertical drive electrodes V1b and V1c and the vertical drive electrodes V3b and V3c each are connected together. This connection is also added to the connection of the illustrative embodiment and may be effected at the out side of the image pickup 104, if desired. This modification, like the first modification, reduces the number of the kinds of vertical pulses to ten. The pattern J shown in FIG. 50C is applied to this modification and corresponds to the pattern D. It follows that only the vertical drive signals $\phi V_{1a}$ and $\phi V_{3a}$ fed to the vertical drive electrodes V1a and V3a include transfer gate pulses. While the configuration shown in FIG. 68 executes only subsampling to one-eighth, it also reduces the overall size of the camera 10.

Figure 69:
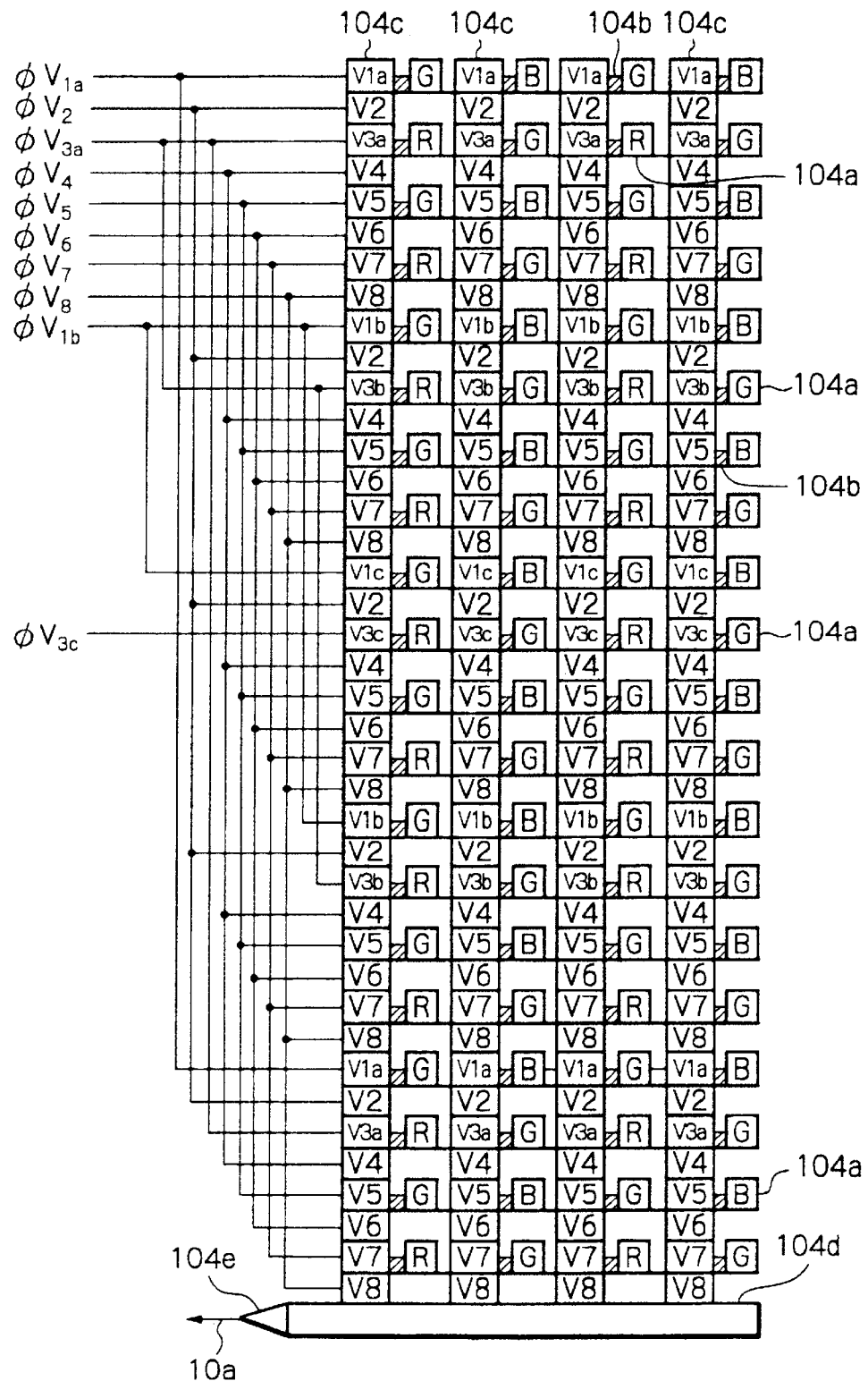

FIG. 69 shows a third modification of the illustrative embodiment. As shown, the vertical drive electrodes V1b and V1c and the vertical drive electrodes V3a and V3b each are connected together. This connection is added to the connection of the illustrative embodiment and may also be effected at the out side of the image pickup 104. This modification, like the previous modifications, successfully reduces the number of kinds of vertical drive signals to ten. The previous modifications each feed the transfer gate pulses to the vertical drive signals used to read signal charges via the common connection. By contrast, in this modification, the transfer gate pulses are fed only to the vertical drive signals to be delivered to a single electrode alone. The pattern K shown in FIG. 50C is applied to this modification and corresponds to the pattern F. More specifically, only the vertical drive signals $\phi V_{1a}$ and $\phi V_{3a}$ fed to the vertical drive electrodes V1a and V3c include the transfer gate pulses.

While the third modification implements only subsampling to one-eighth, it makes the camera 10 miniature and allows the camera 10 to readily execute subsampling to one-eighth. Image quality achievable with this modification is lower than image quality available with the previous modifications because the spatial distance between signal charges read out is comparatively great and limits correlation between, e.g., the colors.

In summary, a solid-state image sensing device of the present invention includes a first to a sixth group of transfer gates and has each group of transfer gates connected together via a signal line to which gate pulses are applied. A particular kind of gate pulses is applied to each group of transfer gates in order to read out signal charges out of desired photosensitive cells. With this configuration, the image sensing device can execute not only the conventional subsampling to one-half or to one-fourth, but also subsampling to one-eighth impracticable with conventional image sensing devices. It follows that a digital still camera loaded with such an image sensing device can pickup high quality images even if it has several millions of pixels or more. Further, the camera can read out signal charges while subsampling them vertically in a desired mode so as to maintain the conventional shooting period and refreshing rate. This makes it needless to change or modify the other circuitry of the camera and thereby promotes efficient designing. In addition, the camera can output an image in a particular manner matching with a display mode or a record mode.

The entire disclosure of Japanese patent application Nos. 15138/1999 and 131856/1999 filed Jan. 25 and May 12, 1999, respectively, including the specification, claims, accompanying drawings and abstract of the disclosure is incorporated herein by reference in its entirely.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A solid-state electronic image sensing device comprising:

a plurality of photosensitive cells arranged in a row direction and a column direction;

vertical transfer paths adjoining the photosensitive cells arranged in the row direction and having vertical transfer electrodes formed thereon;

transfer gates each intervening between a respective photosensitive cell and a respective vertical transfer path for transferring a signal charge accumulated in said respective photosensitive cell to said respective vertical transfer path;

said transfer gates comprising:

a first group of transfer gates adjoining the photosensitive cells arranged on an "N+1" row, an "N+5" row and an "N+13" row (N being a positive integer);

a second group of transfer gates adjoining the photosensitive cells arranged on an "N+2" row;

a third group of transfer gates adjoining the photosensitive cells arranged on an "N+3" row, an "N+7" row, an "N+11" row and an "N+15" row;

a fourth group of transfer gates adjoining the photosensitive cells arranged on an "N+4" row, an "N+8" row, an "N+12" row and an "N+16" row;

a fifth group of transfer gates adjoining the photosensitive cells arranged on an "N+6" row, an "N+10" row and an "N+14" row; and a sixth group of transfer gates adjoining the photosensitive cells arranged on an "N+9" row;

wherein a particular gate pulse is simultaneously applied to each of said first group of transfer gates to said sixth group of transfer gates via a respective signal line.

2. A device in accordance with claim 1, further comprising a first gate pulse output circuit for outputting gate pulses such that gate pulses for the transfer gates adjoining the photosensitive cells arranged on odd rows and gate pulses for the transfer gates adjoining the photosensitive cells arranged on even rows each are applied in a particular field.

3. A device in accordance with claim 1, further comprising a second gate pulse output circuit for simultaneously delivering the gates pulses to the transfer gates, wherein said second gate pulse output circuit simultaneously delivers, in an odd field, the gate pulses to the transfer gates adjoining the photosensitive cells arranged on two of an "m+1" row, an "m+2" row, an "m+3" row and an "m+4" row (m being an integer) and simultaneously delivers, in an even field, the gate pulses to the transfer gates adjoining the photosensitive cells arranged on the other two rows.

4. A device in accordance with claim 1, further comprising a third gate pulse output circuit for applying the gate pulses to the transfer gates arranged on a single row or simultaneously applying the gate pulses to a plurality of rows, and wherein said third gate pulse output circuit applies, in each field, the gate pulses to the transfer gates adjoining the photosensitive cells arranged on four consecutive rows.

5. A device in accordance with claim 1, further comprising a fourth gate pulse output circuit for simultaneously applying the gate pulses to the transfer gates adjoining the photosensitive cells arranged on the "N+2" and "N+9" rows.

6. A method of reading out signal charges out of a solid-state electronic image sensing device including a plurality of photosensitive cells arranged in a row direction and a column direction, vertical transfer paths adjoining the photosensitive cells arranged in the row direction and having vertical transfer electrodes formed thereon, and transfer gates each intervening between a respective photosensitive cell and a respective vertical transfer path for transferring a signal charged accumulated in said respective photosensitive cell to said respective vertical transfer path, said method comprising the steps of:

simultaneously applying gate pulses to a first group of transfer gates adjoining the photosensitive cells arranged on an "N+1" row, an "N+5" row and an "N+13" row;

simultaneously applying gate pulses to a second group of transfer gates adjoining the photosensitive cells arranged on an "N+2" row;

simultaneously applying gate pulses to a third group of transfer gates adjoining the photosensitive cells arranged on an "N+3" row, an "N+7" row, an "N+11" row and an "N+15" row;

simultaneously applying gate pulses to a fourth group of transfer gates adjoining the photosensitive cells arranged on an "N+4" row, an "N+8" row, an "N+12" row and an "N+16" row;

simultaneously applying gate pulses to a fifth group of transfer gates adjoining the photosensitive cells arranged on an "N+6" row, an "N+10" row and an "N+14" row; and simultaneously applying gate pulses to a sixth group of transfer gates adjoining the photo sensitive cells arranged on an "N+9" row, whereby signal charges are sequentially read out of said first group of transfer gates to said sixth group of transfer gates.

7. A solid-state electronic image sensing device for picking up a scene, comprising:

a plurality of photosensitive cells arranged in a row direction and a column direction each for transforming incident light to a corresponding electric signal by photoelectric transduction;

vertical transfer paths adjoining said plurality of photosensitive cells for transferring in a vertical direction signal charges read out of said plurality of photosensitive cells;

transfer gates each intervening between a respective photosensitive cell and a respective vertical transfer path for transferring a signal charge accumulated in said respective photosensitive cell to said respective vertical transfer path at a preselected timing;

a horizontal transfer path for sequentially transferring the signal charges in a horizontal direction; and a drive signal generating circuit for feeding vertical drive signals, which include transfer gate pulses for driving said transfer gate at a preselected timing, to said transfer gates to thereby transfer the signal charges from said vertical transfer paths to said horizontal transfer path;

said vertical transfer paths each comprising vertical transfer devices each two of which are as signed to a single photosensitive cell for thereby preventing the signal charges read out of the photosensitive cells from being mixed together;

said drive signal generating circuit generating the vertical drive signals regularly for reading out the signal charges out of the photosensitive cells at an interval of $2^{i+1}-1$ rows (a variable i being a natural number) from preselected photosensitive cells of a same color as a first color, which is a characteristic as seen in the row direction, and reading out the signal charges out of the photosensitive cells at an interval of $2^{i+1}-1$ rows from preselected photosensitive cells of a same color as a second color, which is a characteristic as seen in the row direction;

wherein said vertical drive signals are fed at said intervals via signal lines arranged in said electronic image sensing device and said drive signal generating circuit executes a vertical transfer with eight phases and generates twelve kinds of vertical drive signals in consideration of positions of the transfer gates to which the transfer gate pulses are to be applied.

8. A device as claimed in claim 7, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have signal level indicative of an input of said transfer gate pulses, wherein the signal lines on "1+16$j$" rows (a variable $j$ being a positive integer) to which said first vertical drive signal is fed are connected together, wherein the signal lines on "6+8$j$" rows to which said sixth vertical drive signal is fed are connected together, and wherein the signal lines on "9+16$j$" rows to which said third vertical drive signal is applied are connected together.

9. A device in accordance with claim 8 wherein the signal lines on the "1+16$j$" rows are connected together, wherein the signal lines on the "9+16$j$" rows are connected together, wherein the signal lines on "2 +16j" rows to which the fifth vertical drive signal is fed are connected together, and wherein the signal lines on "10+16$j$" rows to which the seventh vertical drive signal is fed are connected together.

10. A device in accordance with claim 8, wherein the signal lines on "1+16$j$" rows and the signal lines on "9+16$j$" rows are connected together, wherein the signal lines on "6+16$j$" rows and the signal lines on "10+16$j$" rows to which said vertical drive signal is applied are connected together.

11. A device in accordance with claim 9, wherein the signal lines on "1+16$j$" rows and the signal lines on "9+16$j$" rows to which said vertical drive signal is fed are connected together, wherein the signal lines on "6+16$j$" rows and the signal lines on "10+16$j$" rows to which said vertical drive signal is fed are connected together.

12. A device in accordance with claim 7, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have signal level indicative of an input of said transfer gate pulses, wherein the signal lines on "5+8*j*" rows to which said second vertical drive signal is fed are connected together, and wherein the signal lines on "6+8*j*" rows to which said sixth vertical drive signal is fed are connected together.

13. A device in accordance with claim 12, wherein the signal lines on "1+16*j*" rows to which said first vertical drive signal is fed and the signal lines on "9+16*j*" rows to which said vertical drive signal is fed are connected together, wherein the signal lines on "6+16*j*" rows to which said sixth vertical drive signal is fed and the signal lines on "10+16*j*" rows to which said vertical drive signal is applied are connected together.

14. A device in accordance with claim 7, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have signal level indicative of an input of said transfer gate pulses, wherein the signal lines on the "1+16*j*" rows are connected together, wherein the signal lines on the "9+16*j*" rows are connected together, wherein the signal lines on "2+16*j*" rows to which the fifth vertical drive signal is fed are connected together, and wherein the signal lines on "10+16*j*" rows to which the seventh vertical drive signal is fed are connected together, wherein the signal lines on "5+8*j*" rows to which said second vertical drive signal is fed are connected together, and wherein the signal lines on "6+8*j*" rows to which said sixth vertical drive signal is fed are connected together, and
wherein said first, third, fifth and seventh vertical drive signals and said second and sixth vertical drive signals are alternately applied field by field.

15. A device in accordance with claim 7, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have signal level indicative of an input of said transfer gate pulses, wherein the signal lines on "1+16*j*" rows to which said first vertical drive signal is fed are connected together, and wherein the signal lines on "2+16*j*" rows to which said fifth vertical drive signal is fed are connected together, respectively.

16. A device in accordance with claim 15, wherein the signal lines on "2+16*j*" rows and the signal lines on "9+16*j*" rows to which said third vertical drive signal is applied are connected together, wherein the signal lines on "6+16*j*" rows to which said sixth vertical drive signal is applied and the signal lines on "10+16*j*" rows to which said seventh vertical drive signal is applied are connected together.

17. A device in accordance with claim 7, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have signal level indicative of an input of said transfer gate pulses, wherein the signal lines on the "9+16*j*" rows to which the third vertical drive signal is fed are connected together, and wherein the signal lines on "10+16*j*" rows to which the seventh vertical drive signal is fed are connected together.

18. A device in accordance with claim 7, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have signal level indicative of an input of said transfer gate pulses, wherein the signal lines on "1+16*j*" rows to which said first vertical drive signal is fed are connected together, and wherein the signal lines on "10+16*j*" rows to which said seventh vertical drive signal is fed are connected together.

19. A device in accordance with claim 18, wherein the signal lines on "5+8j" rows to which said second vertical drive signal is applied and the signal lines on "9+16*j*" rows to which said third vertical drive signal is applied are connected together, wherein the signal lines on "2+16*j*" rows to which said fifth vertical drive signal is applied and the signal lines on "6+8*j*" rows to which said sixth vertical drive signal is applied are connected together.

20. A device in accordance with claim 7, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have signal level indicative of an input of said transfer gate pulses, wherein the signal lines on "1+16*j*" rows to which said first vertical drive signal is fed are connected together, wherein the signal lines on "9+16*j*" rows to which said third vertical drive signal is applied are connected together, wherein the signal lines on "2+16*j*" rows to which said fifth vertical drive signal is fed are connected together, and wherein the signal lines on "10+16*j*" rows to which said seventh vertical drive signal is applied are connected together, and wherein said first: and fifth vertical drive signals and said third and seventh vertical drive signals are alternately applied field by field.

21. A device in accordance with claim 7, wherein said drive signal generating circuit executes subsampling to $2^{-i}$ when the variable i is 1 or above, and feeds the vertical drive signals by regarding minimum $2^{i+1}$ photosensitive cells, including a total increment to be driven in distinction from a number of drive phases, as a group.

22. A method of reading signal charges representative of a scene picked up out of a solid-state electronic image sensing device comprising a plurality of photosensitive cells arranged in a row direction and a column direction each for transforming incident light to a corresponding electric signal by photoelectric transduction, vertical transfer paths adjoining said plurality of photosensitive cells for transferring in a vertical direction signal charges read out of said plurality of photosensitive cells, transfer gates each intervening between a respective photosensitive cell and a respective vertical transfer path for transferring a signal charged accumulated in said respective photosensitive cell to said respective vertical transfer path at a preselected timing, a horizontal transfer path for sequentially transferring the signal charges in a horizontal direction, and a drive signal generating circuit for feeding vertical drive signals, which include transfer gate pulses for driving said transfer gate at a preselected timing, to said transfer gates to thereby transfer the signal charges from said vertical transfer paths to said horizontal transfer path, said method comprising the steps of:

forming on each of said vertical transfer paths vertical transfer devices each two of which are assigned to a single photosensitive cell for thereby preventing the signal charges read out of the photosensitive cells from being mixed together;

causing said drive signal generating circuit to generate the vertical drive signals regularly for reading out the signal charges out of the photosensitive cells at an interval of $2^{i+1}-1$ rows from preselected photosensitive cells of a same color as a first color, which is a characteristic as seen in the row direction; and reading out the signal charges out of the photosensitive cells at an interval of $2^{i+1}-1$ rows from preselected photosensitive cells of a same color as a second color, which is a characteristic as seen in the row direction, wherein said vertical drive signals are fed at said intervals via signal lines arranged in said solid-state electronic image sensing device.

wherein the drive signal generating circuit executes a vertical transfer with eight phases and generates twelve kinds of vertical drive signals in consideration of positions of the transfer gates to which the transfer gate pulses are to be applied.

23. A method in accordance with claim 22, wherein the transfer gate pulses are fed to the signal lines at a preselected timing for, among the twelve kinds of vertical drive signals to be output from said drive signal generating circuit, a first to a third vertical drive signal, a fifth to a-seventh vertical drive signal, a ninth vertical drive signal and an eleventh vertical drive signal to thereby cause said vertical drive signals to have a signal level indicative of an input of said transfer gate pulses, wherein said first vertical drive signal is fed the signal lines on "1+16j" rows (a variable j being a positive integer) which are connected together, wherein said third vertical drive signal is fed the signal lines on "9+16j" rows which are connected together, and wherein said sixth vertical drive signal is applied the signal lines on "6+8j" rows which are connected together, and the first, the third and the sixth vertical drive signals are simultaneously applied field by field.

24. A method in accordance with claim 23, wherein said first and said third vertical drive signals are assumed to be identical with each other and fed to the signal lines on 1+16j rows and the signal lines on 9+16j rows, and wherein said fifth and said seventh vertical drive signals are assumed to be identical with each other and fed to the signal lines on 2+16j rows and the signal lines on 10+16j rows, respectively.

25. A method in accordance with claim 22, wherein the transfer gate pulses are fed to the signal lines at a reselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have a signal level indicative of an input of said transfer gate pulses, wherein said first vertical drive signal is fed the signal lines on "1+16j" rows (a variable j being a positive integer) which are connected together, wherein said third vertical drive signal is fed the signal lines on "9+16j" rows which are connected together, wherein said fifth vertical drive signal is fed the signal lines on "2+16j" rows which are connected together, and wherein said seventh vertical drive signal is applied the signal lines on "10+16j" rows which are connected together, and the first, the third, the fifth and the seventh vertical drive signals are simultaneously applied field by field.

26. A method in accordance with claim 25, wherein said first and said third vertical drive signals are assumed to be identical with each other and fed to the signal lines on 1+16j rows and the signal lines on 9+163' rows, and wherein said fifth and said seventh vertical drive signals are assumed to be identical with each other and fed to the signal lines on 2+16j rows and the signal lines on 10+16j rows, respectively.

27. A method in accordance with claim 22, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have a signal level indicative of an input of said transfer gate pulses, wherein said second vertical drive signal is fed the signal lines on "5+8j" rows (a variable j being a positive integer) which are connected together, and wherein said sixth vertical drive signal is applied the signal lines on "6+8j" rows which are connected together, and the second and the sixth vertical drive signals are simultaneously applied field by field.

28. A method in accordance with claim 27, wherein said first and said third vertical drive signals are assumed to be identical with each other and fed to the signal lines on 1+16j rows and the signal lines on 9+16j rows, and wherein said fifth and said seventh vertical drive signals are assumed to be identical with each other and fed to the signal lines on 2+16j rows and the signal lines on 10+163' rows, respectively.

29. A method in accordance with claim 22, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have a signal level indicative of an input of said transfer gate pulses, wherein said first vertical drive signal is fed the signal lines on "1+16j" rows (a variable j being a positive integer) which are connected together, wherein said second vertical drive signal is fed the signal lines on "5+8j" rows which are connected together, wherein said third vertical drive signal is fed the signal lines on "9+16j" rows which are connected together, wherein said fifth vertical drive signal is fed the signal lines on "2+16j" rows which are connected together, wherein said sixth vertical drive signal is fed the signal lines on "6+8j" rows which are connected together, and wherein said seventh vertical drive signal is applied the signal lines on "10+16j" rows which are connected together, and the first, the third, the fifth and the seventh vertical drive signals and the second and the sixth vertical drive signals are alternatively applied field by field.

30. A method in accordance with claim 22, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have a signal level indicative of an input of said transfer gate pulses, wherein said first vertical drive signal is fed the signal lines on "1+16j" rows (a variable j being a positive integer) which are connected together, and wherein said fifth vertical drive signal is fed the signal lines on "2+16j" rows which are connected together, and the first and the fifth vertical drive signals are simultaneously applied field by field.

31. A method in accordance with claim 30, wherein said third and said fifth vertical drive signals are assumed to be identical with each other and fed to the signal lines on 9+16*j* rows and the signal lines on 2+16*j* rows, and wherein said sixth and said seventh vertical drive signals are assumed to be identical with each other and fed to the signal lines on 6+16*j* rows and the signal lines on 10+16*j* rows, respectively.

32. A method in accordance with claim 22, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have a signal level indicative of an input of said transfer gate pulses, wherein said third vertical drive signal is fed the signal lines on "9+16*j*" rows (a variable j being a positive integer) which are connected together, and wherein said seventh vertical drive signal is fed the signal lines on "10+16*j*" rows which are connected together, and the third and the seventh vertical drive signals are simultaneously applied field by field.

33. A method in accordance with claim 22, wherein the transfer gate pulses are fed to the signal lines at a preselected timing for, among the twelve kinds of vertical drive signals to be output from said drive signal generating circuit, a first to a third vertical drive signal, a fifth to a seventh vertical drive signal, a ninth vertical drive signal and an eleventh vertical drive signal to thereby cause said vertical drive signals to have a signal level indicative of an input of said transfer gate pulses, wherein said first vertical drive signal is fed the signal lines on "1+16*j*" rows (a variable j being a positive integer) which are connected together, and wherein said seventh vertical drive signal is fed the signal lines on "10+16*j*" rows which are connected together, and the first and the seventh vertical drive signals are simultaneously applied field by field.

34. A method in accordance with claim 33, wherein said second and third vertical drive signals are assumed to be identical with each other and fed to the signal lines on "5+8*j*" rows and the signal lines on "9+16*j*" rows, respectively, and wherein said fifth and sixth vertical drive signals are assumed to be identical with each other and fed to the signal lines on "2+16*j*" rows and "6+8*j*" rows, respectively.

35. A method in accordance with claim 22, wherein the transfer gate pulses are fed to the signal lines at a reselected timing for, among the twelve kinds of vertical rive signals to be output from said drive signal generating circuit, a first to a third vertical drive signal, a fifth to a seventh vertical drive signal, a ninth vertical drive signal and an eleventh vertical drive signal to thereby cause said vertical drive signals to have a signal level indicative of an input of said transfer gate pulses, wherein said first vertical drive signal is fed the signal lines on "1+16*j*" rows (a variable j being a positive integer) which are connected together, wherein said third vertical drive signal is fed the signal lines on "9+16*j*" rows which are connected together, wherein said fifth vertical drive signal is fed the signal lines on "2+16*j*" rows which are connected together, and wherein said seventh vertical drive signal is fed the signal lines on "10+16*j*" rows which are connected together, and the first and the fifth vertical drive signals and the third and the seventh vertical drive signals are alternatively applied field by field.

\* \* \* \* \*